United States Patent
Itoi et al.

(10) Patent No.: US 10,986,273 B2
(45) Date of Patent: Apr. 20, 2021

(54) IMAGE PICKUP APPARATUS AND LENS DEVICE THAT HAVE IMAGE BLUR CORRECTION FUNCTION

(71) Applicant: CANON KABUSHIKI KAISHA, Tokyo (JP)

(72) Inventors: Yudai Itoi, Tokyo (JP); Shunichiro Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 270 days.

(21) Appl. No.: 15/949,123

(22) Filed: Apr. 10, 2018

(65) Prior Publication Data
US 2018/0302563 A1    Oct. 18, 2018

(30) Foreign Application Priority Data

Apr. 13, 2017  (JP) .............................. JP2017-079687
Nov. 20, 2017  (JP) .............................. JP2017-222895

(51) Int. Cl.
H04N 5/232    (2006.01)

(52) U.S. Cl.
CPC ..... *H04N 5/23287* (2013.01); *H04N 5/23258* (2013.01)

(58) Field of Classification Search
CPC ............. H04N 5/2328; H04N 5/23251; H04N 5/23254; H04N 5/23258; H04N 5/23261; H04N 5/23264; H04N 5/23267; H04N 5/23287; H04N 5/23245; G03B 2205/0007; G03B 2205/0015; G03B 2205/0023; G03B 2205/003
See application file for complete search history.

(56) References Cited

U.S. PATENT DOCUMENTS

| 9,838,605 | B2  |  12/2017 | Tsuchiya |              |
|-----------|-----|----------|----------|--------------|
| 2005/0140793 | A1* | 6/2005 | Kojima .............. | H04N 5/23287 |
|           |     |          |          | 348/208.99   |
| 2016/0330378 | A1* | 11/2016 | Tsuchiya ............ | H04N 5/23258 |

FOREIGN PATENT DOCUMENTS

| JP | H1138461    | A | 2/1999  |
| JP | 2006126668  | A | 5/2006  |
| JP | 2010147761  | A | 7/2010  |
| JP | 2011209451  | A | 10/2011 |
| JP | 2015141391  | A | 8/2015  |

OTHER PUBLICATIONS

Office Action issued in Japanese Appln. No. 2017-079687 dated Feb. 9, 2021.

* cited by examiner

*Primary Examiner* — Nelson D. Hernández Hernández
(74) *Attorney, Agent, or Firm* — Rossi, Kimms & McDowell LLP

(57) ABSTRACT

An image pickup apparatus and a lens device which are capable of preventing an unnatural image from being photographed when both of an image pickup apparatus body and an interchangeable lens are each equipped with an image blur correction function. A system controller of a camera body sets an image blur correction mode of an image processor of the camera body. When a lens device including a lens driving section which optically performs image blur correction by driving a lens is attached to the camera body, the system controller changes the image blur correction mode of the image processor according to an image blur correction mode of the lens device.

17 Claims, 39 Drawing Sheets

IMAGE PICKUP APPARATUS AND LENS DEVICE THAT HAVE IMAGE BLUR CORRECTION FUNCTION

BACKGROUND OF THE INVENTION

Field of the Invention

The present invention relates to an image pickup apparatus and a lens device, and more particularly to an image pickup apparatus and a lens device that perform image blur correction based on detection of image blur.

Description of the Related Art

In general, an image pickup apparatus having an image blur correction function includes e.g. a gyro sensor as a shake detection section, and performs image blur correction on an image formation surface based on a shake of the image pickup apparatus, which is detected by the shake detection section.

Incidentally, when the image pickup apparatus is in a state not requiring image blur correction (e.g. a state fixed to a tripod), image blur correction is sometimes performed due to reaction of the shake detection section to noise or the like. In such a case, there is a possibility that an unnatural image is photographed.

To solve this problem, some conventional image pickup apparatuses determine whether or not image blur correction is required, and inhibit image blur correction if it is determined that image blur correction is not required. For example, there has been proposed an image pickup apparatus that compares a shake amount of the image pickup apparatus, detected by a shake detection section, with a predetermined threshold value, and determines whether or not image blur correction is required according to the result of the comparison (Japanese Laid-Open Patent Publication (Kokai) No. 2010-147761).

In general, a vibration compensation mechanism is used in the image pickup apparatus to reduce (correct) image blur caused by shake, such as hand shake. In this vibration compensation mechanism, so-called optical vibration compensation is performed in a lens device (referred to as the lens unit), and further, the optical vibration compensation or so-called electronic vibration compensation is also performed in an image pickup apparatus body (camera body). In this case, to increase the vibration compensation effect, it is desirable that the lens unit and the camera body communicate with each other, and cooperatively perform vibration compensation control.

Further, in the image pickup apparatus having the image blur correction function, to correct image blur caused by hand shake or vibrations having a frequency distribution similar to that of the hand shake, a camera shake detection sensor and an image blur correction optical system are selected, and settings are made for the selected camera shake detection sensor and a drive mechanism for driving the selected image blur correction optical system, in a response frequency band. On the other hand, signals output from the camera shake detection sensor include a low-frequency drift signal (fluctuation). Therefore, when the image pickup apparatus having the image blur correction function is used in a state fixed to the tripod or the like, image blur correction is sometimes performed by the image blur correction function regardless of shake of the image pickup apparatus, and as a result, image blur may be promoted.

Incidentally, there has been proposed a camera system in which in a case where both of a lens unit and a camera body of an image pickup apparatus have the image blur correction function, the camera body performs image blur correction according to a shake correction ratio set for the camera body, and the lens unit performs shake correction according to a shake correction ratio set for the lens unit (Japanese Laid-Open Patent Publication (Kokai) No. 2015-141391).

Further, there has been proposed an image blur correction device that determines, in a case where a signal output from a shake detection sensor is minute, that an image pickup apparatus is fixed to a tripod or the like and inhibits execution of image blur correction (Japanese Laid-Open Patent Publication (Kokai) No. H11-38461).

However, in the image pickup apparatus described in Japanese Laid-Open Patent Publication (Kokai) No. 2010-147761, in a case where both of an image pickup apparatus body and an interchangeable lens are equipped with the image blur correction function, the result of determination of whether or not image blur correction is required is sometimes different between the image pickup apparatus body and the interchangeable lens. In such a case, image blur correction is performed only in one of the image pickup apparatus body and the interchangeable lens, which has determined that image blur correction is required. That is, in the image pickup apparatus having the image pickup apparatus body and the interchangeable lens, both equipped with the image blur correction function, image blur correction is assumed to be performed by combining the image blur correction functions of the image pickup apparatus body and the interchangeable lens. Therefore, if image blur correction is performed only in one of the image pickup apparatus body and the interchangeable lens, an unnatural image may be photographed.

Incidentally, in a case where the lens unit and the camera body both have the shake detection sensor and the image blur correction function, the lens unit and the camera body each determine a supported state thereof, and are controlled to inhibit image blur correction from being performed when the supported state is determined to be a fixedly supported state. That is, since the lens unit and the camera body determine respective supported states, there can be a discrepancy between respective determination times of the lens unit and the camera body. This discrepancy between the determination times causes inconsistency of the image blur correction control in the fixedly supported state between the lens unit and the camera body.

In the camera system disclosed in Japanese Laid-Open Patent Publication (Kokai) No. 2015-141391, the lens unit and the camera body both have the blur correction function, and if there is a discrepancy between the determination times of the two as described above, consistency of the image blur correction control between the lens unit and the camera body is sometimes lost. Similarly, also in the image blur correction device described in Japanese Laid-Open Patent Publication (Kokai) No. H11-38461, in a case where a discrepancy between the determination times occurs, consistency of the image blur correction control is sometimes lost.

SUMMARY OF THE INVENTION

The present invention provides an image pickup apparatus and a lens device which are capable of preventing an unnatural image from being photographed when both of an image pickup apparatus body and an interchangeable lens are each equipped with an image blur correction function.

The present invention provides an image pickup apparatus and a lens device which are capable of avoiding inconsistency of image blur correction control due to a discrepancy between determination times of the image pickup apparatus and the lens device.

In a first aspect of the present invention, there is provided an image pickup apparatus to which a lens device can be removably attached, comprising at least one processor that executes programs stored in a memory to function as a first image blur correction unit, and a setting unit configured to set an image blur correction mode of the first image blur correction unit, wherein in a case where a lens device that includes a second image blur correction unit configured to optically perform image blur correction by driving a lens is attached to the image pickup apparatus, the setting unit changes the image blur correction mode of the first image blur correction unit according to an image blur correction mode of the second image blur correction unit.

In a second aspect of the present invention, there is provided an image pickup apparatus to which a lens device can be removably attached, comprising a first shake detection sensor; and at least one processor that executes programs stored in a memory to function as a first image blur correction unit, and a setting unit configured to set an image blur correction mode of the first image blur correction unit, wherein in a case where a lens device that includes a second shake detection sensor and a second image blur correction unit configured to optically perform image blur correction by driving a lens is attached to the image pickup apparatus, the setting unit changes the image blur correction mode of the first image blur correction unit according to a result of detection by one of the first shake detection sensor and the second shake detection sensor, which is higher in reliability.

In a third aspect of the present invention, there is provided an image pickup apparatus to which a lens device can be removably attached, comprising at least one processor that executes programs stored in a memory to function as a first image blur correction unit, and a setting unit configured to set an image blur correction mode of the first image blur correction unit, wherein in a case where a lens device that includes a second image blur correction unit configured to optically perform image blur correction by driving a lens is attached to the image pickup apparatus, the setting unit changes the image blur correction mode of the first image blur correction unit according to an image blur correction mode of the second image blur correction unit, when the lens device is a master device for the image blur correction.

In a fourth aspect of the present invention, there is provided a lens device which can be removably attached to an image pickup apparatus, comprising at least one processor that executes programs stored in a memory to function as a first image blur correction unit, and a setting unit configured to set an image blur correction mode of the first image blur correction unit, wherein in a case where the lens device is attached to an image pickup apparatus including a second image blur correction unit configured to electronically or optically perform image blur correction, the setting unit changes the image blur correction mode of the first image blur correction unit according to an image blur correction mode of the second image blur correction unit.

In a fifth aspect of the present invention, there is provided a lens device which can be removably attached to an image pickup apparatus, comprising at least one processor that executes programs stored in a memory to function as a first image blur correction unit, and a setting unit configured to set an image blur correction mode of the first image blur correction unit, wherein in a case where the lens device is attached to an image pickup apparatus including a second image blur correction unit configured to electronically or optically perform image blur correction, the setting unit changes the image blur correction mode of the first image blur correction unit according to an image blur correction mode of the second image blur correction unit when the image pickup apparatus is a master device for the image blur correction.

According to the present invention, when the image pickup apparatus and the lens device are each equipped with the image blur correction function, the image pickup apparatus and the lens device refer to each other's operation of the image blur correction function, and hence it is possible to prevent an unnatural image from being photographed.

According to the present invention, it is possible to avoid inconsistency of the image blur correction control due to discrepancy between the respective determination times of the image pickup apparatus and the lens device.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
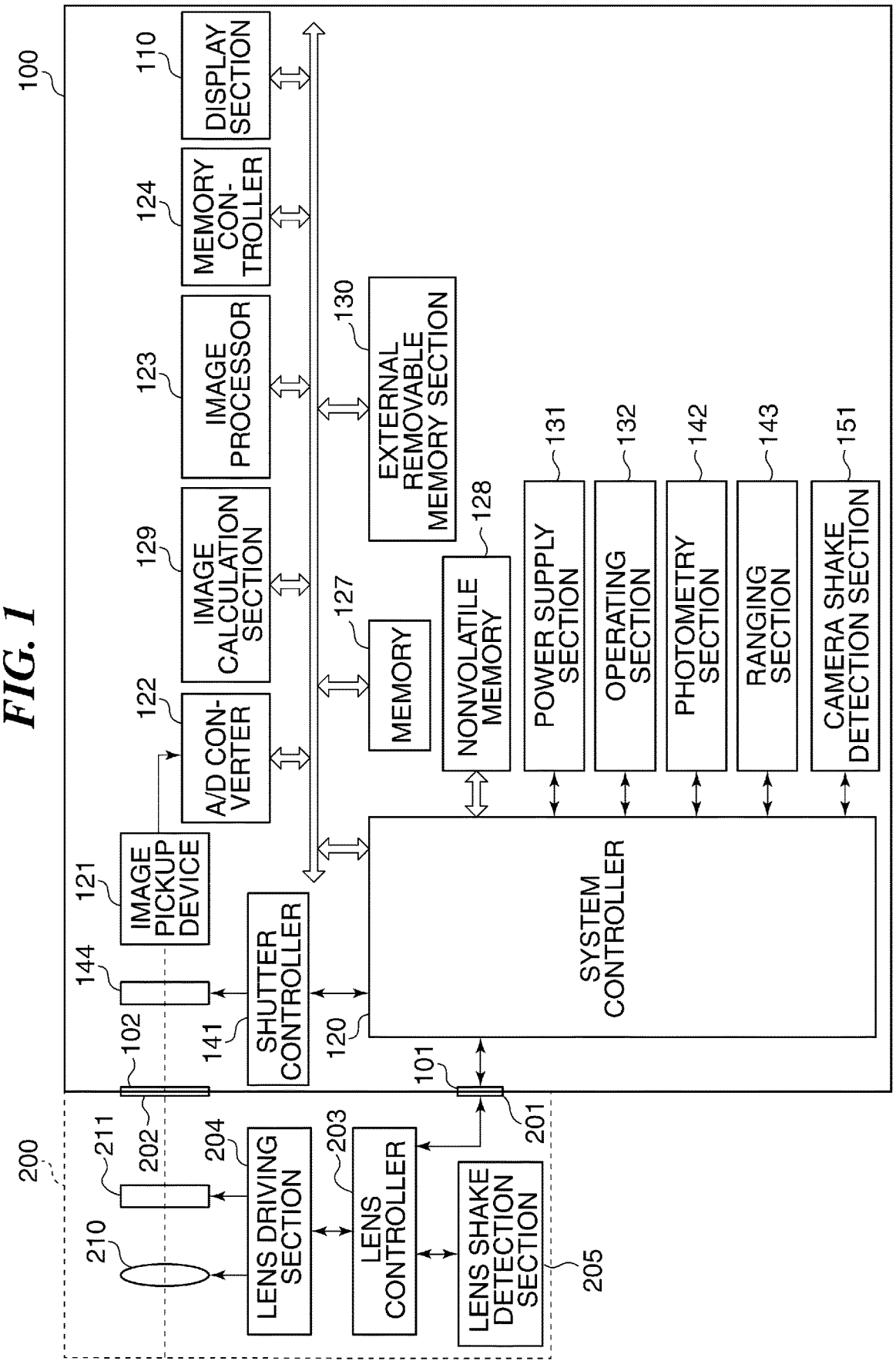
FIG. 1 is a block diagram of a digital camera as an image pickup apparatus according to a first embodiment of the present invention.

FIG. 1 is a block diagram of an image pickup apparatus according to a first embodiment of the present invention.

The illustrated image pickup apparatus is e.g. a digital camera (hereinafter simply referred to as the camera), and includes a camera body 100 and a lens unit 200. The lens unit 200 can be attached to and removed from the camera body 100. That is, the lens unit 200 is an interchangeable lens unit.

The lens unit 200 is attached to the camera body 100 via lens mounts 102 and 202. The camera body 100 is provided with an image pickup device 121, such as a CMOS image sensor, and an optical image (object image) is formed on the image pickup device 121 via the lens unit 200 and a shutter 144. The lens unit 200 is provided with a photographic lens 210 and a diaphragm 211.

The image pickup device 121 outputs electrical signals (analog signals) corresponding to the optical image. An analog-to-digital converter 122 converts the analog signals output from the image pickup device 121 to digital signals by analog-to-digital conversion. Then, the digital signals are stored in a memory 127 by a memory controller 124 as image data under the control of a system controller 120.

An image processor 123 performs predetermined image processing, such as pixel interpolation processing and color conversion processing, on the digital signals output from the analog-to-digital converter 122 or the image data read out from the memory 127 by the memory controller 124. Note that the image processor 123 is provided with a compression/decompression circuit that compresses and decompresses image data by adaptive discrete cosine transform (ADCT) or the like.

The image processor 123 reads image data stored in the memory 127, performs compression or decompression processing on the read image data, and writes the processed image data into the memory 127. Further, the image processor 123 electronically corrects image blur according to a camera shake amount (amount of shake of the camera) detected by a camera shake detection section 151 under the control of the system controller 120.

An image calculation section 129 calculates a contrast value of image data, and determines a state of focus of the image data according to the calculated contrast value. Further, the image calculation section 129 calculates a correlation value between the image data stored in the memory 127 and the image data obtained by the image pickup device 121, and searches for a region which is highest in correlation between these items of the image data.

The memory controller 124 controls transmission and reception of image data between the analog-to-digital converter 122, the image processor 123, a display section 110, and an external removable memory section 130, and the memory 127. Note that the digital signals output from the analog-to-digital converter 122 are written into the memory 127 via the image processor 123 and the memory controller 124, or directly via the memory controller 124.

The display section 110 includes a liquid crystal panel display section and a backlight illumination section, and sequentially displays images based on image data formed according to the output from the image pickup device 121 as through images on a real-time basis. This enables a user to perform so-called live view photographing. When performing live view photographing, an AF (auto-focus) frame indicative of an AF area is displayed on the display section 110 in a state superimposed on an image so as to enable the user to recognize the position of an object as an AF target. At this time, if a touch panel is provided in the display section 110, the user can perform a so-called touch AF operation for designating the position of an object as an AF target.

The system controller 120 controls the overall operation of the camera. Note that the system controller 120 also controls the lens unit 200.

The memory 127 stores still images and moving images which are obtained through photographing, and further stores image data items to be reproduced. The memory 127 has a sufficient storage capacity to store a predetermined number of still images and a predetermined amount of moving image data. Note that the memory 127 is allocated as a program stack area for the system controller 120, a status storage area, a calculation area, a work area, and an image display data area. Various kinds of calculation are performed by the system controller 120 using the calculation area of the memory 127.

A nonvolatile memory 128 is an electrically erasable and recordable memory, and for example, a flash memory or an EEPROM is used for the nonvolatile memory 128. The nonvolatile memory 128 stores a photographing state, and further stores programs for controlling the camera.

The external removable memory section 130 includes a recording medium, such as a Compact Flash (registered trademark) or an SD card, which can be attached to and removed from the camera body 100. Image files are recorded in the external removable memory section 130.

A power supply section 131 includes a battery which is removable, a battery detection circuit, a DC-DC converter, a switch circuit for switching between blocks to be energized, and so on. The power supply section 131 detects whether or not the battery is attached, a type of the battery, and remaining charge of the battery. Further, the power supply section 131 controls the DC-DC converter based on results of the above-mentioned detection and an instruction from the system controller 120, and applies a necessary voltage to each block for a required time period.

A shutter controller 141 controls the shutter 144 based on photometric results obtained by a photometry section 142 under the control of the system controller 120, while cooperating with a lens controller 203 that controls the diaphragm 211.

The photometry section 142 is a block for performing AE (auto exposure) processing. An optical image incident through the photographic lens 210 enters the photometry section 142 via the diaphragm 211, the lens mounts 202 and 102, and a photometric lens (not shown). The photometry section 142 obtains the photometric results from the optical image by measuring a state of exposure thereof.

A ranging section 143 is a block for performing AF processing. An optical image incident through the photographic lens 210 enters the ranging section 143 via the diaphragm 211, the lens mounts 202 and 102, and a ranging mirror (not shown). The ranging section 143 obtains results of ranging (distance measurement) by measuring a state of focus based on the optical image.

Note that during live view photographing, the system controller 120 measures the state of focus of the image data according to a contrast value calculated by the image calculation section 129.

The shutter 144 is arranged in front of the image pickup device 121, and shields the image pickup device 121 from light when photographing is not performed. When photographing is performed, the shutter controller 141 opens the shutter 144 to cause an optical image to be formed on the image pickup device 121 under the control of the system controller 120.

An operating section 132 is operated by a user, whereby various operation instructions are given to the system controller 120. The operating section 132 includes switches and a dial, a device for pointing by sight line detection, a voice recognition device, and so forth. Note that the operating section 132 is only required to have at least one of the above-mentioned switches and dial, device for pointing by sight line detection, and voice recognition device. The camera shake detection section 151 is e.g. a gyro sensor provided for camera shake detection.

Figure 2:
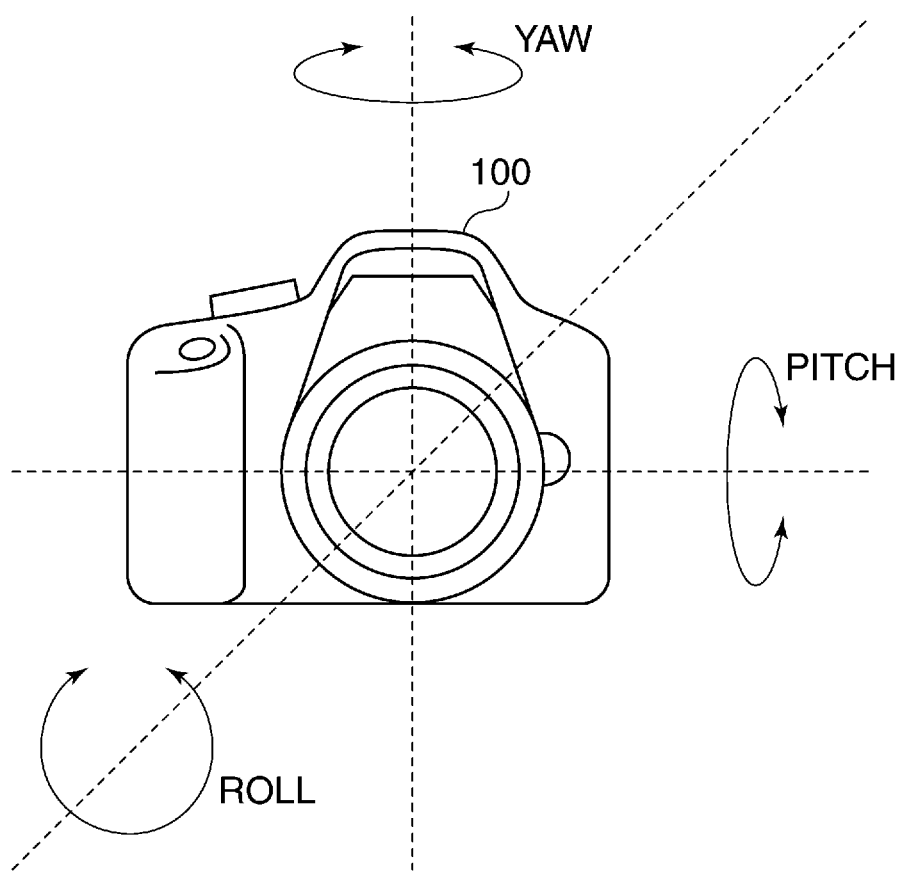
FIG. 2 is a diagram useful in explaining detection of a shake amount by a camera shake detection section appearing in FIG. 1.

FIG. 2 is a diagram useful in explaining detection of shake by the camera shake detection section 151 appearing in FIG. 1.

The camera shake detection section 151 detects amounts of shake of the camera body 100 in the three axial directions of a pitch direction, a yaw direction, and a roll direction of the camera body 100.

Referring again to FIG. 1, the lens mount 102 is provided on the camera body 100, and the lens mount 202 is provided on the lens unit 200. The lens unit 200 is connected to the camera body 100 via the lens mounts 102 and 202. At this time, the camera body 100 is electrically connected to the lens unit 200 by connectors 101 and 201. The system controller 120 detects attachment of the lens unit 200 and communicates with the lens controller 203, via the connectors 101 and 201.

As described above, the lens unit 200 is provided with the photographic lens 210 and the diaphragm 211. The lens controller 203 controls the overall operation of the lens unit 200. The lens controller 203 is provided with a memory storing constants, variables, software programs, and so forth. Further, the lens controller 203 is provided with a nonvolatile memory holding identification information, such as a number unique to the lens unit 200, management information, functional information, such as an opening aperture value and a minimum aperture value, and a focal length, current and past set values, and so forth.

The lens controller 203 controls focusing of the photographic lens 210 based on results of distance measurement performed by the ranging section 143 or the image processor 123. With this, the position where an optical image entering the image pickup device 121 is formed is changed, whereby the AF operation is performed. Note that the lens controller 203 controls the diaphragm 211 and zooming of the photographic lens 210.

A lens driving section 204 controls driving of the photographic lens 210 and the diaphragm 211 under the control of the lens controller 203. For example, the lens driving section 204 drives the photographic lens 210 based on a focusing control signal, a zooming control signal, and an image blur correction control signal, which are sent from the lens controller 203. Further, the lens driving section 204 drives the diaphragm 211 according to a diaphragm control signal sent from the lens controller 203.

Note that the lens driving section 204 is provided with a focusing control mechanism, a zooming control mechanism, an image blur correction control mechanism, and a diaphragm control mechanism.

A lens shake detection section 205 is e.g. a gyro sensor provided for detection of shake of the lens unit 200. The lens shake detection section 205 detects amounts of shake of the lens unit 200 in the two axial directions of the pitch direction and the yaw direction, out of the pitch direction, the yaw direction, and the roll direction, shown in FIG. 2.

In the camera shown in FIG. 1, the lens controller 203 controls the photographic lens 210 according to the amounts of shake detected by the lens shake detection section 205 to optically perform image blur correction. Further, the image processor 123 electronically performs image blur correction for correcting an image according to the amounts of shake detected by the camera shake detection section 151 under the control of the system controller 120.

Figure 3:
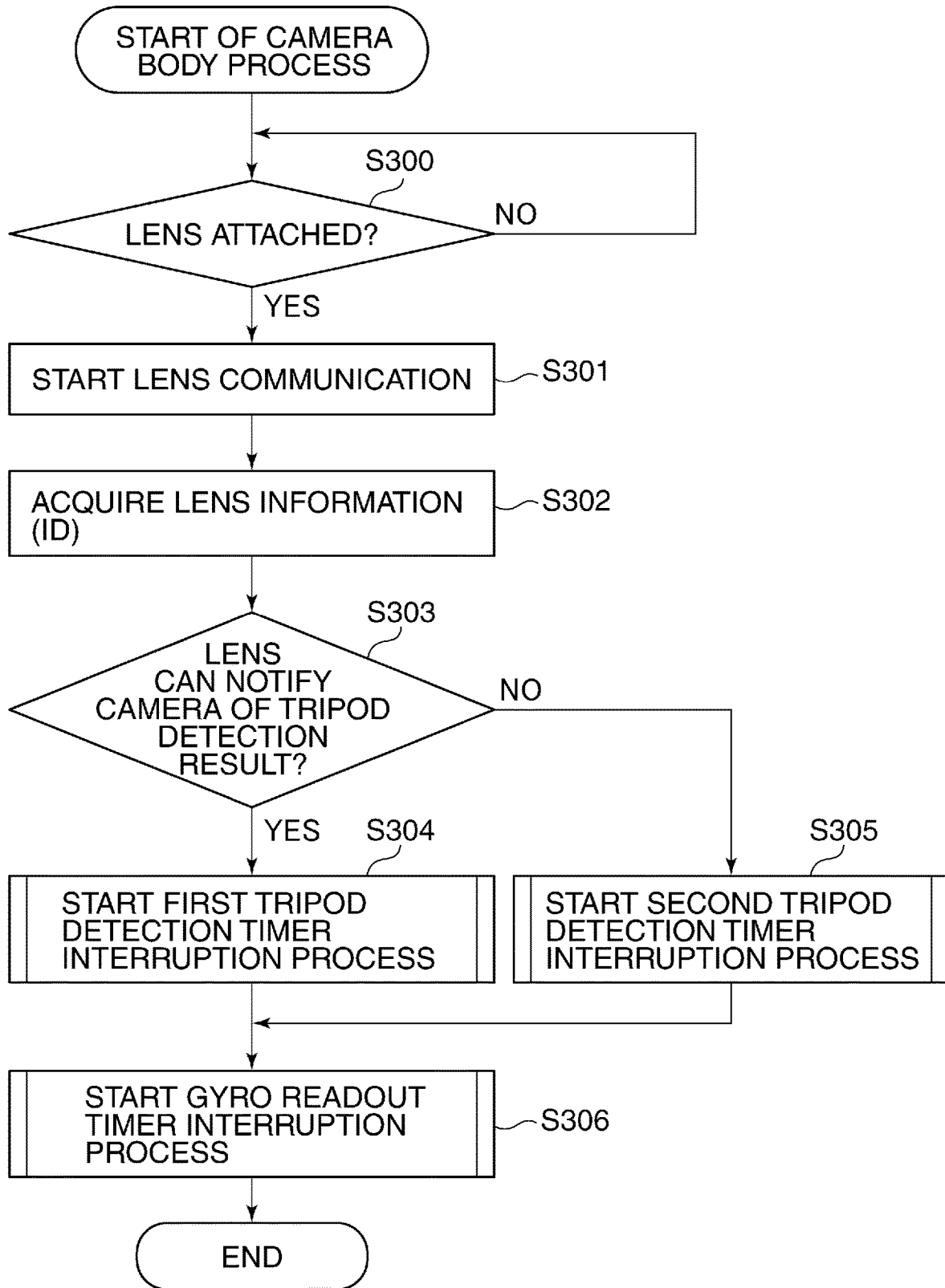
FIG. 3 is a flowchart of a camera body process performed by a camera body appearing in FIG. 1.

FIG. 3 is a flowchart of a process performed by the camera body 100 appearing in FIG. 1 (hereinafter referred to as the "camera body process"). The camera body process in FIG. 3 is performed under the control of the system controller 120.

When the camera body process is started according to a user's operation of the operating section 132, the system controller 120 determines whether or not the lens unit 200 is attached to the camera body 100 (step S300). If the lens unit 200 is not attached to the camera body 100 (NO to the step S300), the system controller 120 waits.

If the lens unit 200 is attached to the camera body 100 (YES to the step S300), the system controller 120 starts communication with the lens controller 203 (step S301: lens communication). Then, the system controller 120 acquires lens information (ID) for identifying the type of the lens unit 200 from the lens controller 203 (step S302). Here, the system controller 120 acquires, for example, the lens ID and optical correction value information specific to the lens, as the lens information.

Then, the system controller 120 determines whether or not the lens unit 200 is capable of notifying the system controller 120 of a result of tripod detection (step S303). Note that the tripod detection refers to detection of whether or not the amounts of shake of the camera body 100 and the amounts of shake of the lens unit 200 are small enough to make it unnecessary to perform image blur correction. For example, when the camera is fixed to a tripod, the amounts of shake become small enough to make it unnecessary to perform image blur correction.

If the lens unit 200 is capable of notifying the system controller 120 of a result of tripod detection (YES to the step S303), the system controller 120 starts a first tripod detection timer interruption process, described hereinafter (step S304). After that, the first tripod detection timer interruption process is repeated executed at predetermined time intervals.

If the lens unit 200 is incapable of notifying the system controller 120 of a result of tripod detection (NO to the step S303), the system controller 120 starts a second tripod detection timer interruption process, described hereinafter (step S305). After that, the second tripod detection timer interruption process is repeatedly performed at predetermined time intervals.

After execution of the step S304 or S305, the system controller 120 starts a gyro readout timer interruption process, described hereinafter (step S306). After that, the gyro readout timer interruption process is repeatedly performed at predetermined time intervals, followed by the system controller 120 terminating the camera body process.

Figure 4:
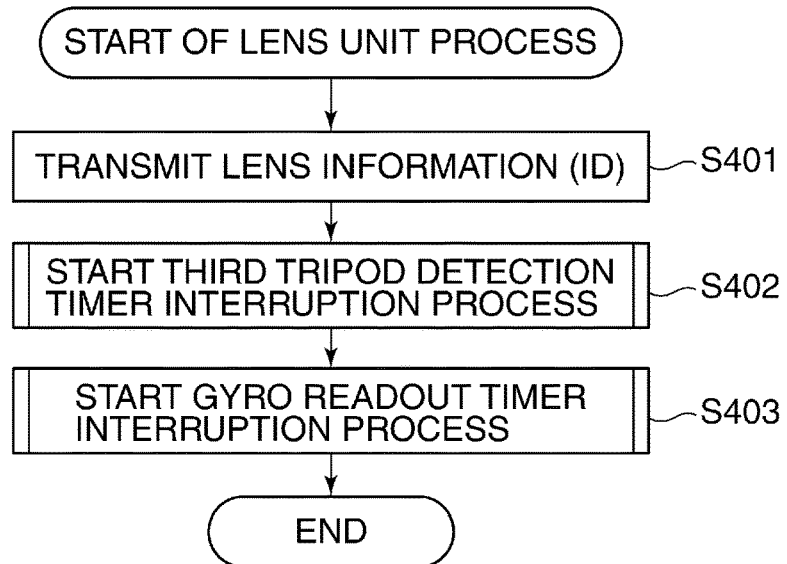
FIG. 4 is a flowchart of a lens unit process performed by a lens unit appearing in FIG. 1.

FIG. 4 is a flowchart of a process performed by a lens unit appearing in FIG. 1 (hereinafter referred to as the "lens unit process"). The lens unit process is performed under the control of the lens controller 203.

When the lens unit 200 is attached to the camera body 100 and lens communication is started, the lens controller 203 transmits the lens information to the system controller 120 (step S401). Then, the lens controller 203 starts a third tripod detection timer interruption process described hereinafter (step S402). After that, the third tripod detection timer interruption process is repeatedly performed at predetermined time intervals.

Next, the lens controller 203 starts a gyro readout timer interruption process, described hereinafter (step S403). After that, the gyro readout timer interruption process is repeatedly performed at predetermined time intervals. Then, the lens controller 203 terminates the present process.

Figure 5:
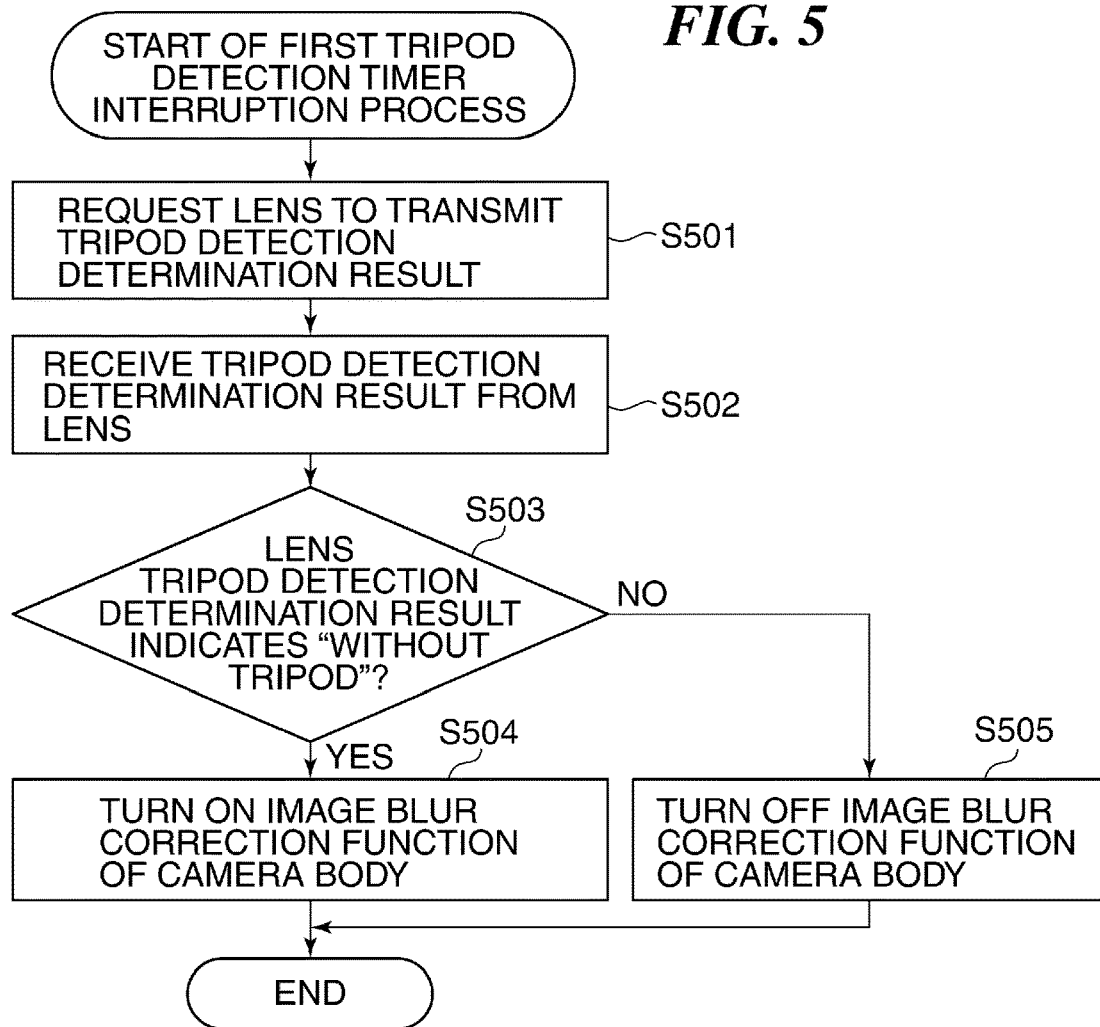
FIG. 5 is a flowchart of a first tripod detection timer interruption process performed in a step of the camera body process in FIG. 3.

FIG. 5 is a flowchart of the first tripod detection timer interruption process performed in the step S304 of the camera body process in FIG. 3.

When the first tripod detection timer interruption process is started, the system controller 120 requests the lens controller 203 to transmit a tripod detection determination result obtained by the lens unit 200 (step S501). As a response to this request, the system controller 120 receives the tripod detection determination result obtained by the lens unit 200, from the lens controller 203 (step S502).

The system controller 120 determines whether or not the received tripod detection determination result indicates "without tripod" (step S503). In this step, "without tripod" refers to a state in which the shake amount is so large as to make image blur correction necessary, whereas "with tripod" refers to a state in which the shake amount is small enough to make blur correction unnecessary. More specifically, "without tripod" refers to a state in which the shake amount is not smaller than a predetermined threshold value so that image blur correction is necessary, and "with tripod" refers to a state in which the shake amount is smaller than the predetermined threshold value, so that image blur correction is unnecessary.

If the received tripod detection determination result indicates "without tripod" (YES to the step S503), the system controller 120 turns on the image blur correction function of the camera body 100 (step S504). On the other hand, if the received tripod detection determination result indicates "with tripod" (NO to the step S503), the system controller 120 turns off the image blur correction function of the camera body 100 (step S505).

After execution of the step S504 or S505, the system controller 120 terminates the present process.

Figure 6:
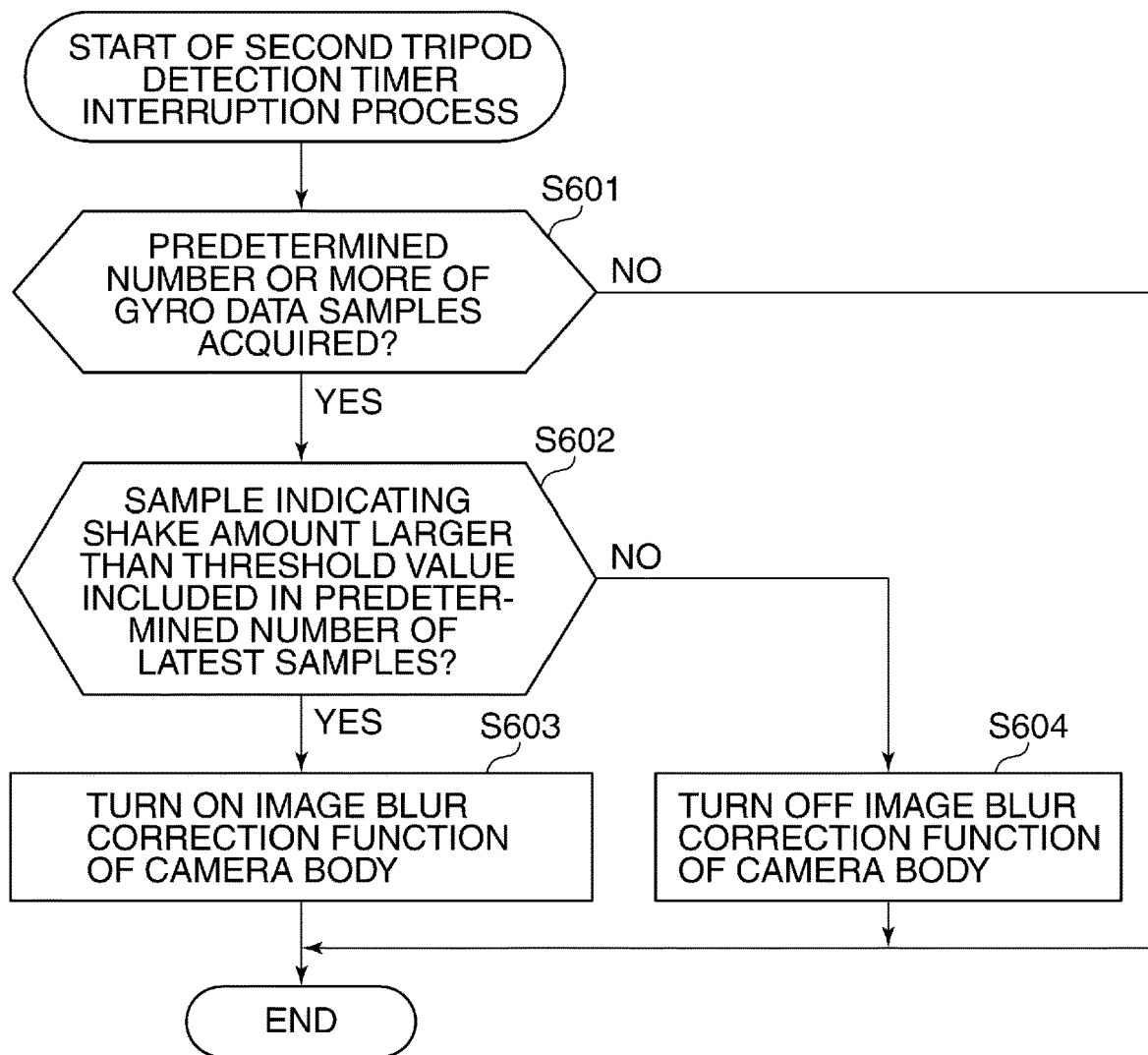
FIG. 6 is a flowchart of a second tripod detection timer interruption process performed in a step of the camera body process in FIG. 3.

FIG. 6 is a flowchart of the second tripod detection timer interruption process performed in the step S305 of the camera body process in FIG. 3.

When the second tripod detection timer interruption process is started, the system controller 120 determines whether or not the number of shake amount data (gyro data) samples acquired by the camera shake detection section 151 is not smaller than a predetermined number (e.g. 500) (step S601).

If the number of acquired shake amount data samples is smaller than the predetermined number (NO to the step S601), the system controller 120 terminates the present process. On the other hand, if the number of acquired shake amount data samples is not smaller than the predetermined number (YES to the step S601), the system controller 120 checks a predetermined number of latest ones of the shake amount data samples (e.g. 500 samples) acquired by the camera shake detection section 151. Then, the system controller 120 determines whether or not a sample indicating a shake amount larger than a predetermined threshold value is included in the checked samples (step S602).

If a sample indicating a shake amount larger than the predetermined threshold value is included (YES to the step S602), the system controller 120 determines the tripod detection result as "without tripod", and turns on the image blur correction function of the camera body 100 (step S603), followed by terminating the present process.

If no sample indicating a shake amount larger than the predetermined threshold value is included (NO to the step S602), the system controller 120 determines the tripod detection result as "with tripod", and turns off the image blur correction function of the camera body 100 (step S604), followed by terminating the present process.

Figure 7:
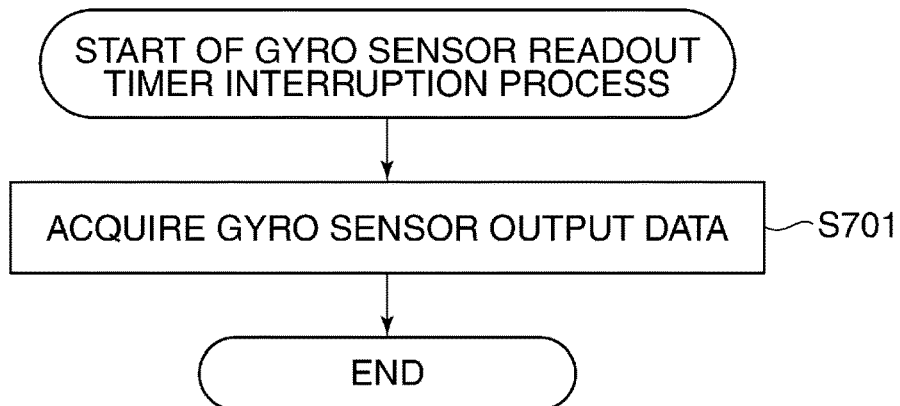
FIG. 7 is a flowchart of a gyro readout timer interruption process performed in a step of the camera body process in FIG. 3.

FIG. 7 is a flowchart of the gyro readout timer interruption process performed in the step S306 of the camera body process shown in FIG. 3. Note that a gyro readout timer interruption process performed by the lens controller 203 in the step S403 of the lens unit process shown in FIG. 4 is similar to the gyro readout timer interruption process described below with reference to FIG. 7, and hence description thereof with reference to a figure additionally shown is omitted.

When the gyro readout timer interruption process is started, the system controller 120 acquires gyro data detected by the camera shake detection section 151 (step S701), followed by terminating the present process. Note that in the gyro readout timer interruption process performed by the lens controller 203 in the lens unit 200, the lens controller 203 acquires gyro data detected by the lens shake detection section 205.

Figure 8:
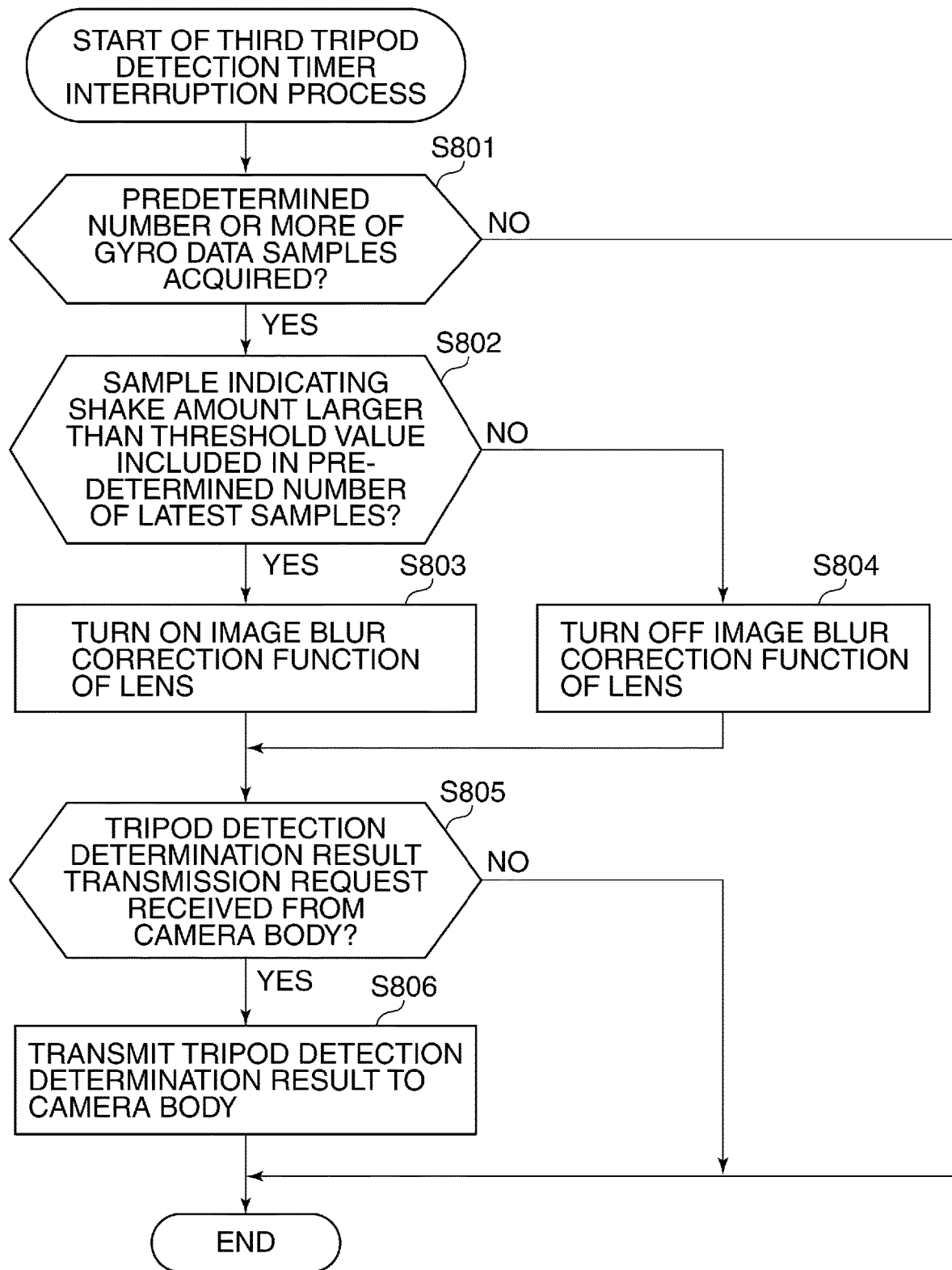
FIG. 8 is a flowchart of a third tripod detection timer interruption process performed in a step of the lens unit process in FIG. 4.

FIG. 8 is a flowchart of the third tripod detection timer interruption process performed in the step S402 of the lens unit process in FIG. 4.

When the third tripod detection timer interruption process is started, the lens controller 203 determines whether or not the number of shake amount data (gyro data) samples acquired by the lens shake detection section 205 is not smaller than a predetermined number (e.g. 500) (step S801).

If the number of acquired shake amount data samples is smaller than the predetermined number (NO to the step S801), the lens controller 203 terminates the present process. On the other hand, if the number of acquired shake amount data samples is not smaller than the predetermined number (YES to the step S801), the lens controller 203 checks a predetermined number of latest ones of the shake amount data samples (e.g. 500 samples) acquired by the lens shake detection section 205. Then, the lens controller 203 determines whether or not there is a sample indicating a shake amount larger than a predetermined threshold value is included in the checked samples (step S802).

If a sample indicating a shake amount larger than the predetermined threshold value is included (YES to the step S802), the lens controller 203 determines the tripod detection result as "without tripod", and turns on the image blur correction function of the lens unit 200 (step S803). On the other hand, if no sample indicating a shake amount larger than the predetermined threshold value is included (NO to the step S802), the lens controller 203 determines the tripod detection result as "with tripod", and turns off the image blur correction function of the lens unit 200 (step S804).

After execution of the step S803 or S804, the lens controller 203 determines whether or not a request for transmitting a tripod detection determination result has been received from the system controller 120 (step S805). If the transmission request has been received (YES to the step S805), the lens controller 203 transmits the tripod detection determination result to the system controller 120 (step S806), followed by terminating the present process.

On the other hand, if the transmission request has not been received (NO to the step S805), the lens controller 203 terminates the present process.

As described above, in the first embodiment of the present invention, the tripod detection determination result obtained by the lens unit 200 is prioritized, and the determination result of whether or not to perform image blur correction in the camera body 100 is caused to coincide with the determination result obtained by the lens unit 200. This makes it possible to prevent a situation in which the image blur correction function is turned on only by one of the camera body 100 and the lens unit 200 and an unnatural image is photographed.

Although in the above-described first embodiment, the priority is given to the tripod detection determination result obtained by the lens unit 200, the tripod detection determination result obtained by the camera body 100 may be prioritized.

Next, a description will be given of a second embodiment of the present invention. The camera as an image pickup apparatus according to the second embodiment has the same configuration as that of the camera shown in FIG. 1. Further, a camera body process, a lens unit process, a second tripod detection timer interruption process, and a gyro sensor readout timer interruption process in the second embodiment are the same as the corresponding processes in FIGS. 3, 4, 6, and 7, respectively.

Figure 9:
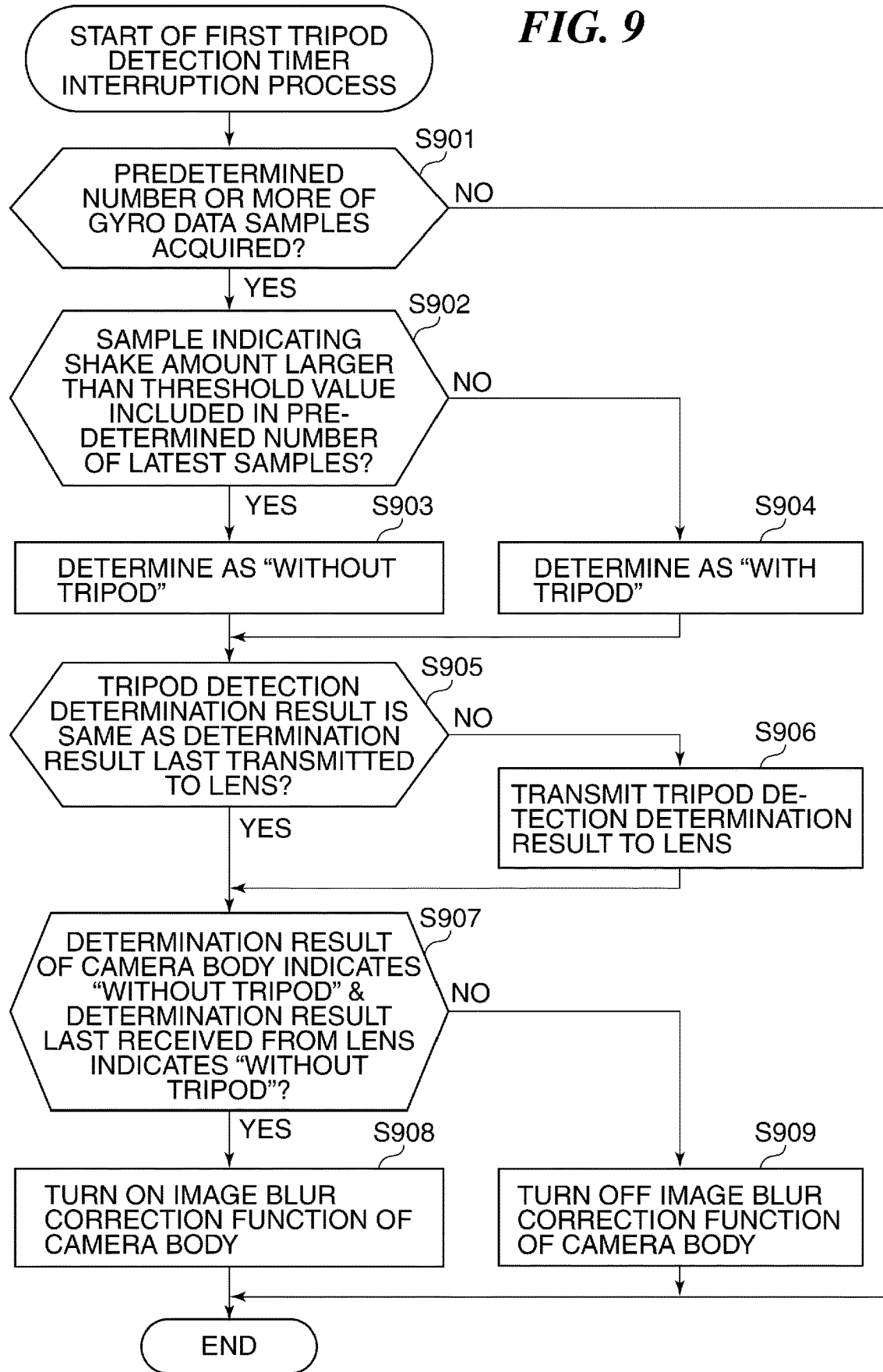
FIG. 9 is a flowchart of a first tripod detection timer interruption process performed by a camera body of a digital camera as an image pickup apparatus according to a second embodiment of the present invention.

FIG. 9 is a flowchart of a first tripod detection timer interruption process performed by the camera body 100 of the camera as the image pickup apparatus according to the second embodiment.

When the first tripod detection timer interruption process is started, the system controller 120 determines whether or not the number of shake amount data (gyro data) samples acquired by the camera shake detection section 151 is not smaller than a predetermined number (e.g. 500) (step S901).

If the number of acquired shake amount data samples is smaller than the predetermined number (NO to the step S901), the system controller 120 terminates the present process. On the other hand, if the number of acquired shake amount data samples is not smaller than the predetermined number (YES to the step S901), the system controller 120 checks a predetermined number of latest ones of the shake amount data samples (e.g. 500 samples) acquired by the camera shake detection section 151. Then, the system controller 120 determines whether or not a sample indicating a shake amount larger than a predetermined threshold value is included in the checked samples (step S902).

If a sample indicating a shake amount larger than the predetermined threshold value is included (YES to the step S902), the system controller 120 determines the tripod detection result as "without tripod" (step S903). On the other hand, if no sample indicating a shake amount larger than the predetermined threshold value is included (NO to the step S902), the system controller 120 determines the tripod detection result as "with tripod" (step S904).

After execution of the step S903 or S904, the system controller 120 determines whether or not the tripod detection determination result obtained by the camera body 100 is the same as a determination result transmitted to the lens unit 200 last time (step S905). If the tripod detection determination result obtained by the camera body 100 is different from the last transmitted determination result (NO to the step S905), the system controller 120 transmits the tripod detection determination result obtained by the camera body 100 to the lens controller 203 (step S906), and then proceeds to a step S907. Note that in a case where the tripod detection determination result obtained by the camera body 100 has not been transmitted to the lens unit 200 yet as well, the system controller 120 executes the step S906.

If the tripod detection determination result obtained by the camera body 100 is the same as the last transmitted determination result (YES to the step S905), the system controller 120 directly proceeds to the step S907. In the step S907, the system controller 120 checks the last tripod detection determination result received from the lens unit 200 to determine whether or not the tripod detection determination result obtained by the camera body 100 indicates "without tripod" and also the tripod detection determination result obtained by the lens unit 200 indicates "without tripod".

If the tripod detection determination results obtained in the camera body 100 and the lens unit 200 both indicate "without tripod" (YES to the step S907), the system controller 120 turns on the image blur correction function of the camera body 100 (step S908), followed by terminating the present process.

If at least one of the tripod detection determination results obtained in the camera body 100 and the lens unit 200 indicates "with tripod" (NO to the step S907), the system controller 120 turns off the image blur correction function of the camera body 100 (step S909), followed by terminating the present process.

Figure 10:
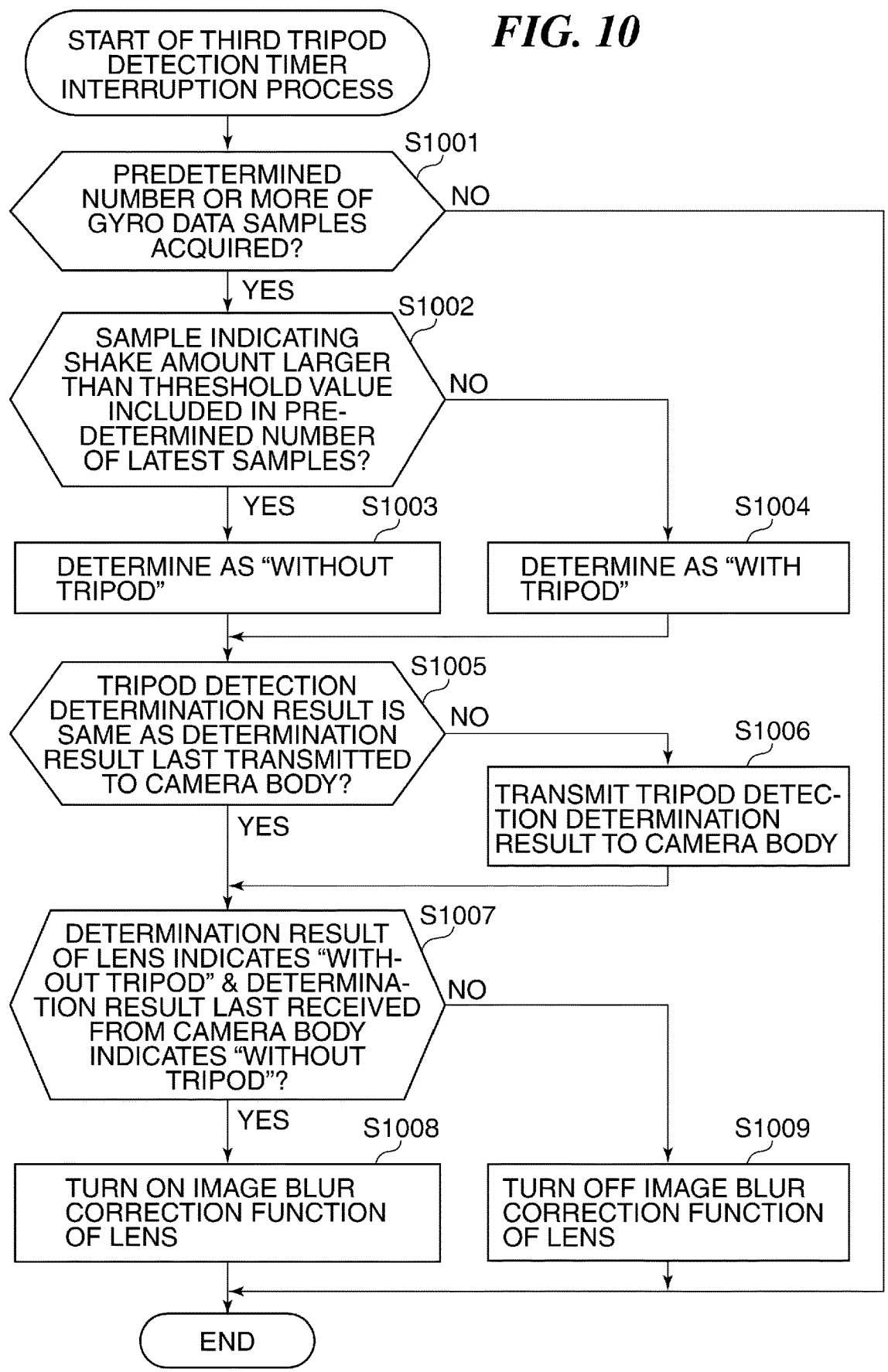
FIG. 10 is a flowchart of a third tripod detection timer interruption process performed by a lens unit of the digital camera as the image pickup apparatus according to the second embodiment.

FIG. 10 is a flowchart of a third tripod detection timer interruption process performed by the lens unit 200 of the camera as the image pickup apparatus according to the second embodiment.

When the third tripod detection timer interruption process is started, the lens controller 203 determines whether or not the number of shake amount data (gyro data) samples acquired by the lens shake detection section 205 is not smaller than a predetermined number (e.g. 500) (step S1001).

If the number of acquired shake amount data samples is smaller than the predetermined number (NO to the step S1001), the lens controller 203 terminates the present process. On the other hand, if the number of acquired shake amount data samples is not smaller than the predetermined number (YES to the step S1001), the lens controller 203 checks a predetermined number of latest ones of the shake amount data samples (e.g. 500 samples) acquired by the lens shake detection section 205 to determine whether or not a sample indicating a shake amount larger than a predetermined threshold value is included in the checked samples (step S1002).

If a sample indicating a shake amount larger than the predetermined threshold value is included (YES to the step S1002), the lens controller 203 determines the tripod detection result as "without tripod" (step S1003). On the other hand, if no sample indicating a shake amount larger than the predetermined threshold value is included (NO to the step S1002), the lens controller 203 determines the tripod detection result as "with tripod" (step S1004).

After execution of the step S1003 or S1004, the lens controller 203 determines whether or not the tripod detection determination result obtained by the lens unit 200 is the same as a determination result transmitted to the camera body 100 last time (step S1005). If the tripod detection determination result is different from the last transmitted determination result (NO to the step S1005), the lens controller 203 transmits the tripod detection determination result obtained by the lens unit 200 to the system controller 120 (step S1006), and then proceeds to a step S1007. Note that in a case where the tripod detection determination result obtained by the lens unit 200 has not been transmitted to the camera body 100 yet as well, the lens controller 203 executes the step S1006.

If the tripod detection determination result is the same as the last transmitted determination result (YES to the step S1005), the lens controller 203 directly proceeds to the step S1007. In the step S1007, the lens controller 203 checks the last tripod detection determination result received from the camera body 100 to determine whether or not the tripod detection determination result obtained by the lens unit 200 indicates "without tripod" and also the tripod detection determination result obtained by the camera body 100 indicates "without tripod".

If the tripod detection determination results obtained by the lens unit 200 and the camera body 100 both indicate "without tripod" (YES to the step S1007), the lens controller 203 turns on the image blur correction function of the lens unit 200 (step S1008), followed by terminating the present process.

If at least one of the tripod detection determination results obtained by the lens unit 200 and the camera body 100 indicates "with tripod" (NO to the step S1007), the lens controller 203 turns off the image blur correction function of the lens unit 200 (step S1009), followed by terminating the present process.

As described above, in the second embodiment, when the shake amount detected by at least one of the camera body 100 and the lens unit 200 is smaller than the threshold value, both of the camera body 100 and the lens unit 200 are inhibited from performing image blur correction. With this, when the shake amount is sufficiently small, even if an erroneous shake amount is detected by one of the camera body 100 and the lens unit 200, it is possible to prevent a situation in which the image blur correction function is turned on by the one of the camera body 100 and the lens unit 200 and an unnatural image is photographed.

Further, in the second embodiment, only when the tripod detection determination result is different from the immediately preceding determination result, the system controller 120 and the lens controller 203 transmit and receive the determination result. This makes it possible to reduce the frequency of communication between the camera body 100 and the lens unit 200.

Next, a description will be given of a third embodiment of the present invention. The camera as the image pickup apparatus according to the third embodiment has the same configuration as that of the camera shown in FIG. 1.

Figure 11:
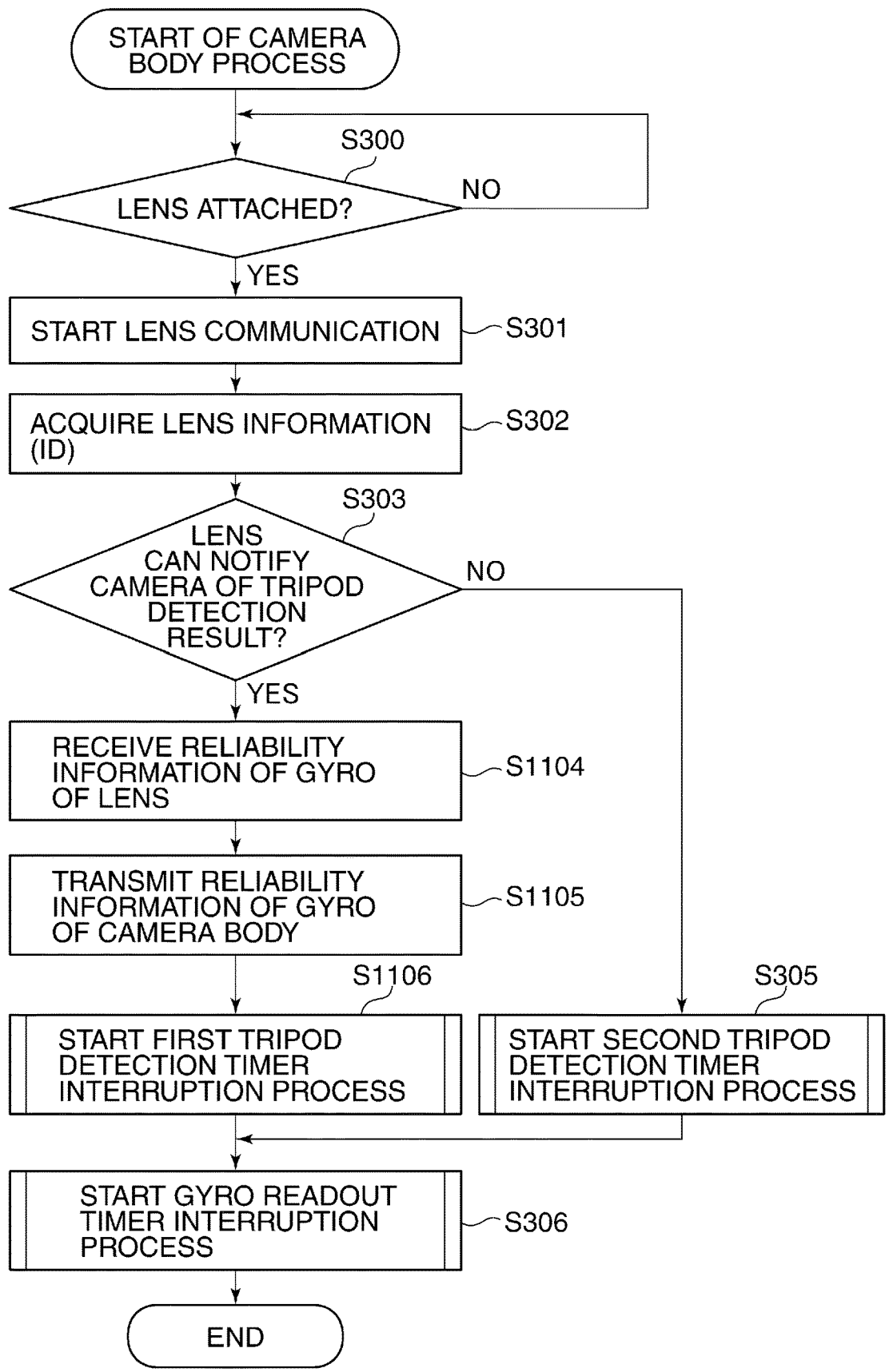
FIG. 11 is a flowchart of a camera body process performed by a camera body of a digital camera as an image pickup apparatus according to a third embodiment of the present invention.

FIG. 11 is a flowchart of a camera body process performed by the camera body 100 of the camera as the image pickup apparatus according to the third embodiment. Note that the same steps in the camera body process in FIG. 11 as those of the camera body process in FIG. 3 are denoted by the same step numbers, and description thereof is omitted.

If it is determined in the step S303 that the lens unit 200 is capable of notifying the system controller 120 of a tripod detection determination result (YES to the step S303), the system controller 120 receives information on reliability of the result of detection by the lens shake detection section 205 (reliability information) from the lens controller 203 (step S1104). Here, as the reliability information, the system controller 120 receives, for example, information on an S/N ratio of the result of detection by the lens shake detection section 205.

Then, the system controller 120 transmits information on reliability of the result of detection by the camera shake detection section 151 (reliability information) to the lens controller 203 (step S1105). Here, as the reliability information, the system controller 120 transmits, for example, information on an S/N ratio of the result of detection by the camera shake detection section 151. Then, the system controller 120 starts a first tripod detection timer interruption process (step S1106), described hereinafter. After that, the first tripod detection timer interruption process is repeatedly performed at predetermined time intervals. Then, the system controller 120 proceeds to the step S306.

Figure 12:
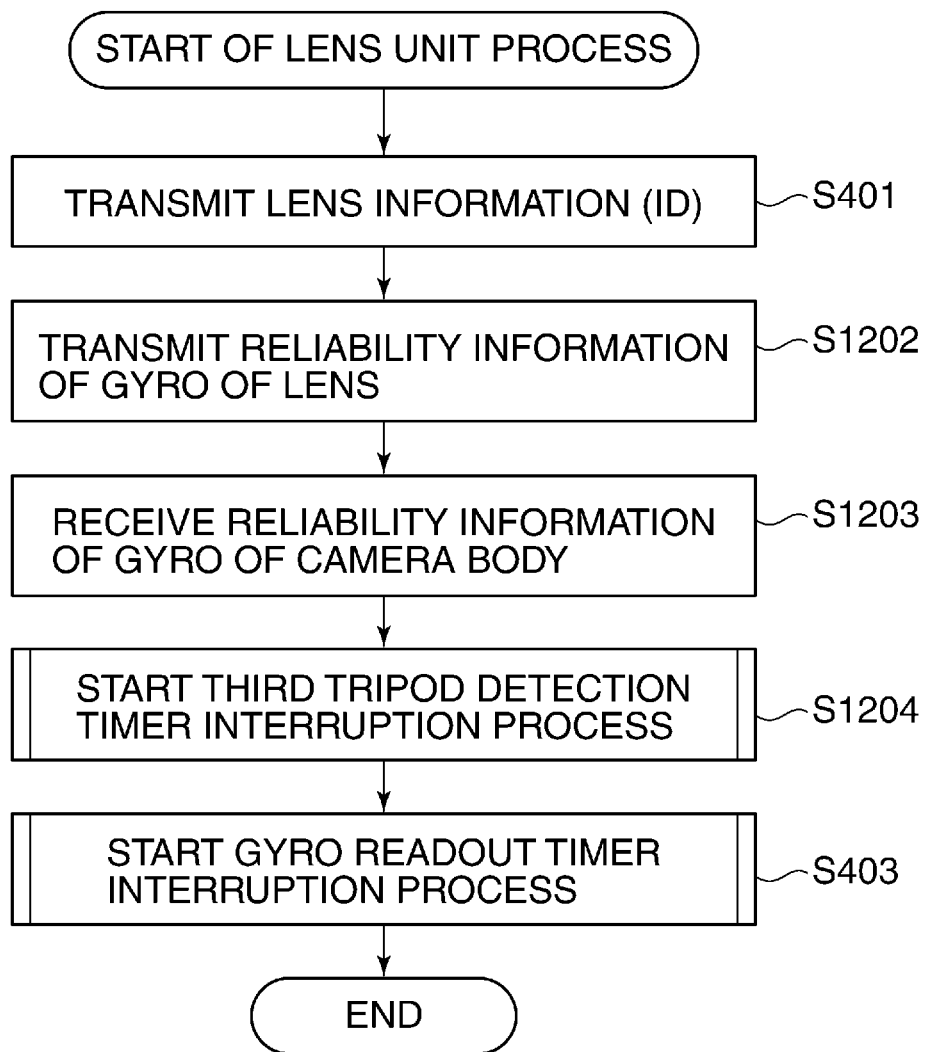
FIG. 12 is a flowchart of a lens unit process performed by a lens unit of the digital camera as the image pickup apparatus according to the third embodiment.

FIG. 12 is a flowchart of a lens unit process performed by the lens unit 200 of the camera as the image pickup apparatus according to the third embodiment. Note that the same steps in the lens unit process in FIG. 12 as those of the lens unit process in FIG. 4 are denoted by the same step numbers, and description thereof is omitted.

After execution of the step S401, the lens controller 203 transmits the reliability information concerning the result of detection by the lens shake detection section 205 to the system controller 120 (step S1202). Then, the lens controller 203 receives the reliability information concerning the result of detection by the camera shake detection section 151 from the system controller 120 (step S1203).

Then, the lens controller 203 starts a third tripod detection timer interruption process, described hereinafter (step S1204). After that, the third tripod detection timer interruption process is repeatedly performed at predetermined time intervals. Then, the lens controller 203 proceeds to the step S403.

Figure 13:
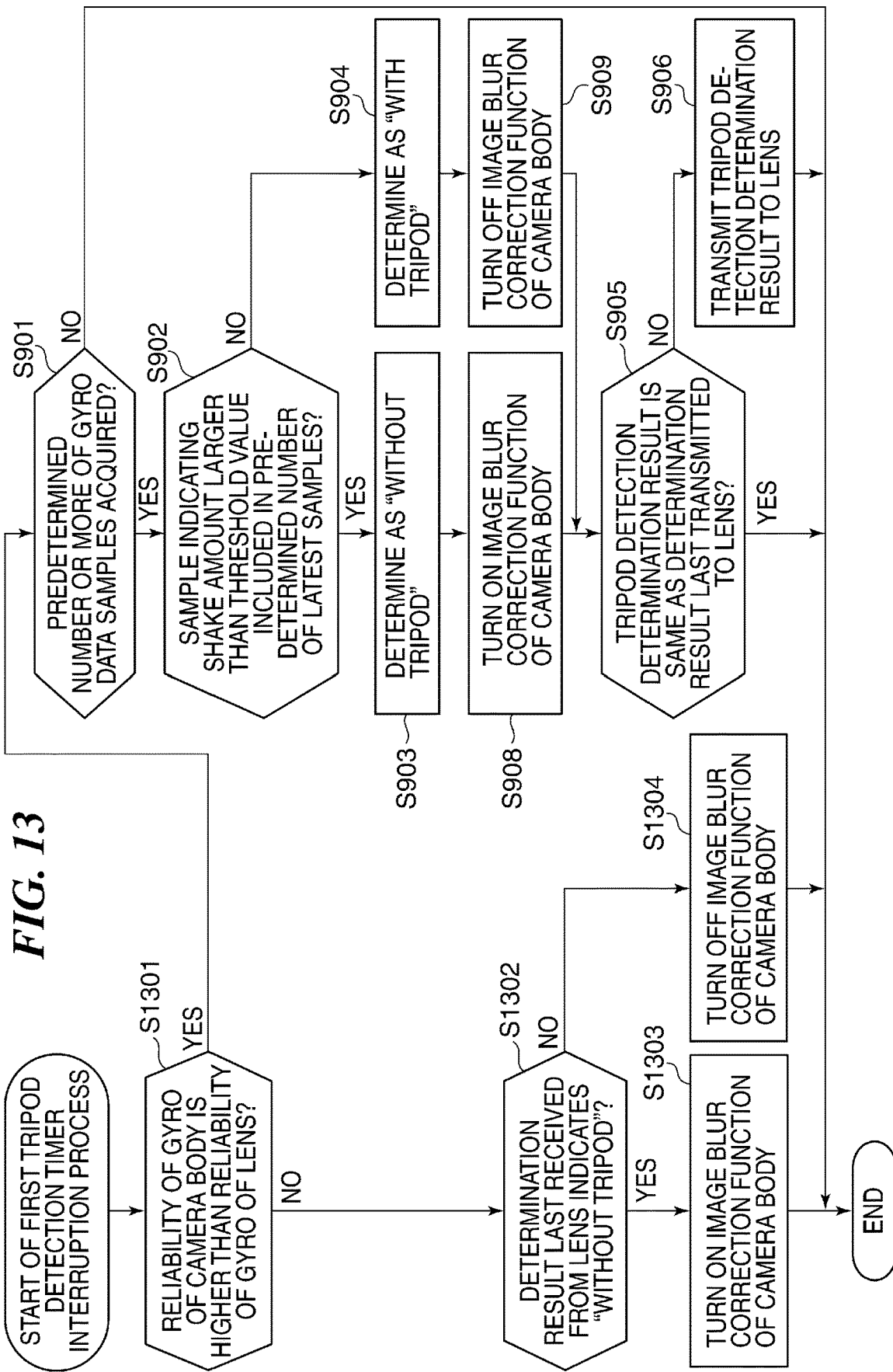
FIG. 13 is a flowchart of a first tripod detection timer interruption process performed in a step of the camera body process in FIG. 11.

FIG. 13 is a flowchart of the first tripod detection timer interruption process performed in the step S1106 of the camera body process in FIG. 11. Note that the same steps in the first tripod detection timer interruption process in FIG. 13 as those of the first tripod detection timer interruption process in FIG. 9 are denoted by the same step numbers, and description thereof is omitted.

When the first tripod detection timer interruption process is started, the system controller 120 determines, based on the reliability information, whether or not the reliability of the camera shake detection section 151 is higher than the reliability of the lens shake detection section 205 (step S1301). If the reliability of the camera shake detection section 151 is higher than the reliability of the lens shake detection section 205 (YES to the step S1301), the system controller 120 proceeds to the step S901.

In FIG. 13, after execution of the step S903, the step S908 is executed. Further, after execution of the step S904, the step S909 is executed. Then, after execution of the step S908 or S909, the system controller 120 executes the step S905. If the tripod detection determination result obtained by the camera body 100 is different from the last transmitted determination result (NO to the step S905), the system controller 120 executes the step S906, followed by terminating the present process. If the tripod detection determination result obtained by the camera body 100 is the same as the last transmitted determination result (YES to the step S905), the system controller 120 terminates the present process.

If the reliability of the camera shake detection section 151 is not higher than the reliability of the lens shake detection section 205 (NO to the step S1301), the system controller 120 checks the tripod detection determination result received from the lens unit 200 last time. Then, the system controller 120 determines whether or not the last received tripod detection determination result indicates "without tripod" (step S1302).

If the last received tripod detection determination result indicates "without tripod" (YES to the step S1302), the system controller 120 turns on the image blur correction function of the camera body 100 (step S1303), followed by terminating the present process.

On the other hand, if the last received tripod detection determination result indicates "with tripod" (NO to the step S1302), the system controller 120 turns off the image blur correction function of the camera body 100 (step S1304), followed by terminating the present process.

Figure 14:
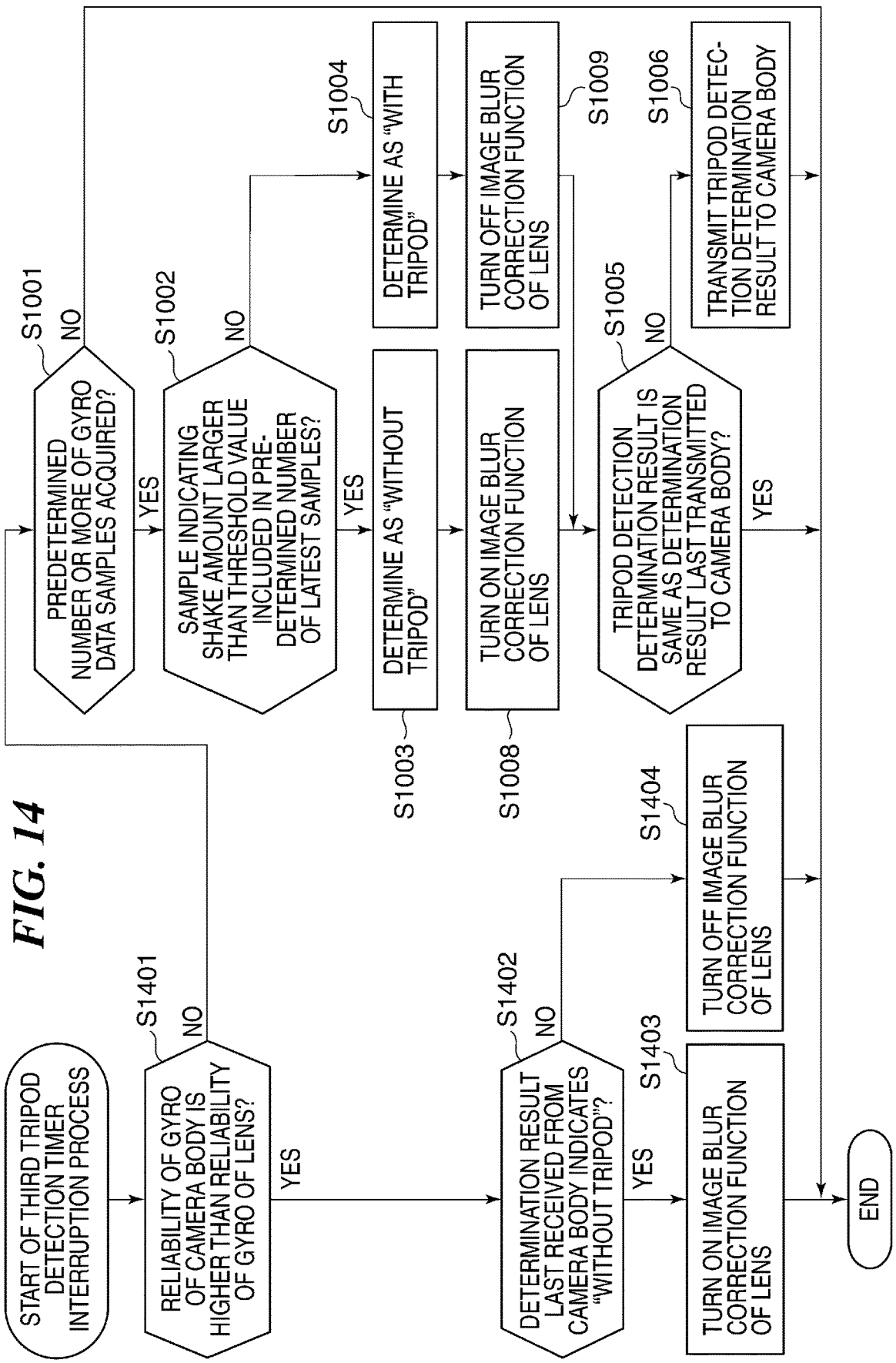
FIG. 14 is a flowchart of a third tripod detection timer interruption process performed in a step of the lens unit process in FIG. 12.

FIG. 14 is a flowchart of the third tripod detection timer interruption process performed in the step S1204 of the lens unit process in FIG. 12. Note that the same steps in the third tripod detection timer interruption process in FIG. 14 as those of the third tripod detection timer interruption process in FIG. 10 are denoted by the same step numbers, and description thereof is omitted.

When the third tripod detection timer interruption process is started, the lens controller 203 determines, based on the reliability information, whether or not the reliability of the camera shake detection section 151 is higher than the reliability of the lens shake detection section 205 (step S1401). If the reliability of the camera shake detection section 151 is not higher than the reliability of the lens shake detection section 205 (NO to the step S1401), the lens controller 203 proceeds to the step S1001.

In the third tripod detection timer interruption process in FIG. 14, after execution of the step S1003, the step S1008 is executed. Further, after execution of the step S1004, the step S1009 is executed. Then, after execution of the step S1008 or S1009, the lens controller 203 executes the step S1005. If the tripod detection determination result obtained by the lens unit 200 is different from a determination result transmitted to the camera body 100 last time (NO to the step S1005), the lens controller 203 executes the step S1006, followed by terminating the present process. If the tripod detection determination result in the camera body 100 is the same as the last transmitted determination result (YES to the step S1005), the lens controller 203 terminates the present process.

If the reliability of the camera shake detection section 151 is higher than the reliability of the lens shake detection section 205 (YES to the step S1401), the lens controller 203 checks the tripod detection determination result received from the camera body 100 last time. Then, the lens controller 203 determines whether or not the last received tripod detection determination result indicates "without tripod" (step S1402).

If the last received tripod detection determination result indicates "without tripod" (YES to the step S1402), the lens controller 203 turns on the image blur correction function of the lens unit 200 (step S1403), followed by terminating the present process.

On the other hand, if the last received tripod detection determination result indicates "with tripod" (NO to the step S1402), the lens controller 203 turns off the image blur correction function of the lens unit 200 (step S1404), followed by terminating the present process.

As described above, in the third embodiment, whether or not to perform image blur correction using one of the detection results obtained by the camera shake detection section 151 and the lens shake detection section 205 is determined based on the reliability information concerning the results of detection by the camera shake detection section 151 and the lens shake detection section 205. This makes it possible to prevent a situation in which the image blur correction function is turned on only by one of the camera body 100 and the lens unit 200 and an unnatural image is photographed.

Although in the above-described first to third embodiments, the description is given of tripod detection for detecting whether or not a tripod is used, by way of example, it is only required to determine whether or not the respective shake amounts of the camera body 100 and the lens unit 200 are sufficiently small.

Although in the above-described first to third embodiments, the description is given of the processes including tripod detection determination, a determination result which causes a problem when different between the camera body 100 and the lens unit 200 is not limited to the tripod detection determination result. The following description is given of processes including image blur correction mode determination in place of the processes including the tripod detection determination.

Figure 15:
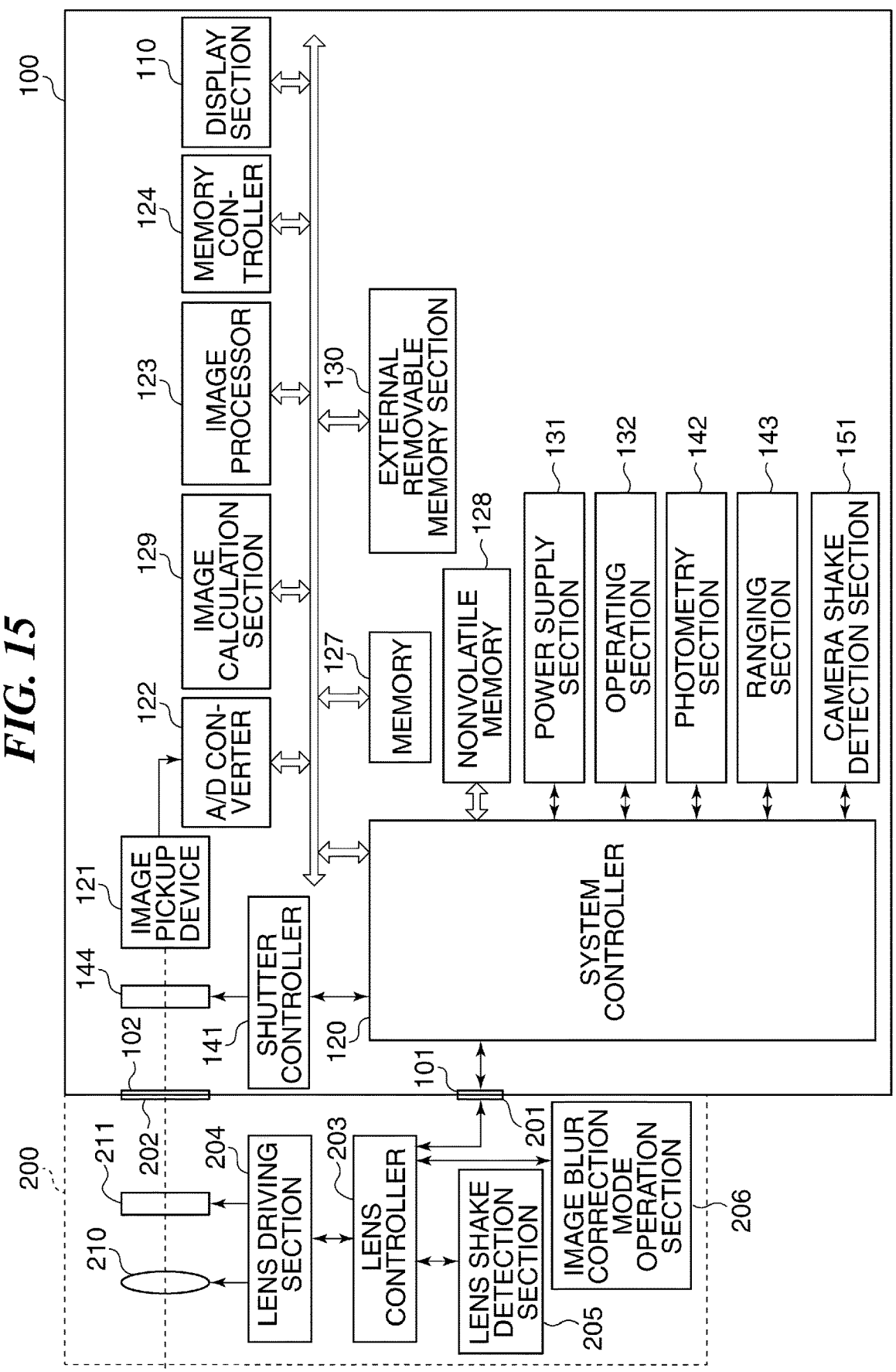
FIG. 15 is a block diagram of a digital camera as an image pickup apparatus according to a fourth embodiment of the present invention.

Next, a description will be given of a fourth embodiment of the present invention. FIG. 15 is a block diagram of a camera as an image pickup apparatus according to the fourth embodiment. The same components of the camera, appearing in FIG. 15, as those of the camera, appearing in FIG. 1, are denoted by the same reference numerals, and description thereof is omitted.

The lens unit 200 of the illustrated camera includes an image blur correction mode operation section 206. The image processor 123 included in the camera body 100 performs image blur correction processing according to an image blur correction mode set from a plurality of image blur correction modes, described hereinafter. Further, the lens driving section 204 included in the lens unit 200 drives the image blur correction control mechanism according to an image blur correction mode set from the plurality of image blur correction modes under the control of the lens controller 203.

The image blur correction mode operation section 206 is formed e.g. by a mechanical switch, and the user can operate the image blur correction mode operation section 206 to thereby set whether to fix the image blur correction mode of the lens driving section 204 to an image blur correction mode selected by the user or cause the image blur correction mode to be selected by automatic determination. Note that when the image blur correction mode is not fixed by the image blur correction mode operation section 206, the lens controller 203 determines an image blur correction mode of the lens driving section 204, and sets the image blur correction mode according to the determination result.

Here, examples of the plurality of image blur correction modes include a normal mode, a panning shooting mode, a tripod mode, an only-exposure-time correction mode, and an image blur correction off mode.

The normal mode is an image blur correction mode suitable for a case where photographing is performed while holding the camera by hand, and in the normal mode, image blur correction is performed particularly for image blur to be caused by a camera shake occurring when the user holds the camera by hand (i.e. when gripping the camera).

The panning shooting mode is an image blur correction mode suitable for so-called panning shooting, and when the user pans the camera so as to cause the camera to follow an object, only blur image correction in a panning direction of the camera is turned off.

The tripod mode is an image blur correction mode suitable for a case where photographing is performed by fixing the camera e.g. to a tripod, and in this mode, image blur correction is inhibited to prevent image blur correction from being unnecessarily performed in a case where the shake amount is sufficiently small. Instead, in the tripod mode, image blur correction is performed particularly for a camera shake caused by vibration of a release switch, not shown, which is liable to affect an image when the camera is fixed to the tripod.

The only-exposure-time correction mode is an image blur correction mode suitable for a case where the user causes the camera to follow a quickly moving object through a finder, and in this mode, image blur correction is performed only during exposure, and is turned off during non-exposure. This prevents the image blur correction from impairing the object following capability of a finder image.

The image blur correction off mode is a mode for inhibiting image blur correction regardless of the shake amount. Further, the lens driving section 204 and the image processor 123 may perform driving and processing in an image blur correction mode other than the above-described image blur correction modes.

Figure 16:
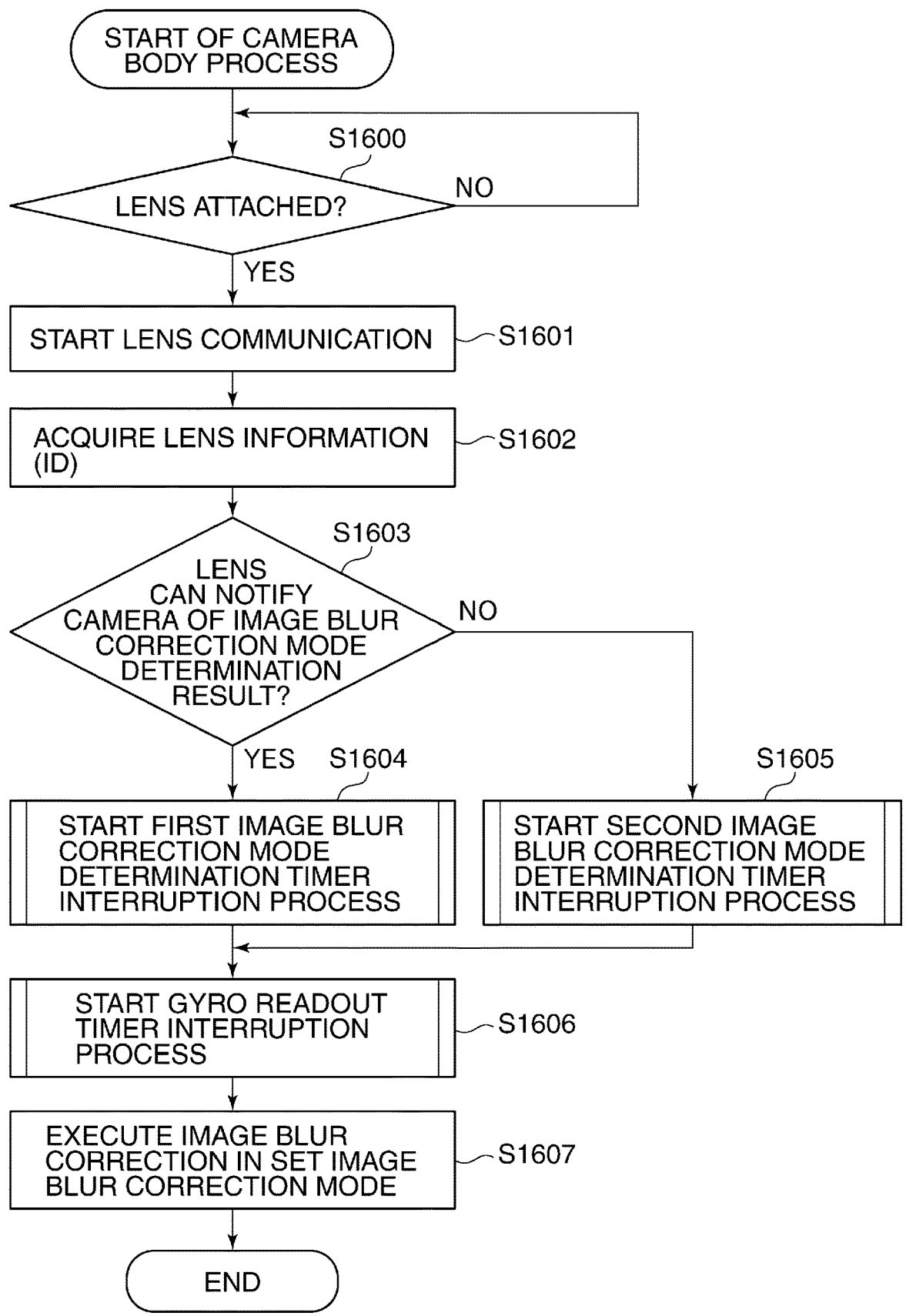
FIG. 16 is a flowchart of a camera body process performed by a camera body appearing in FIG. 15.

FIG. 16 is a flowchart of a camera body process performed by the camera body 100 appearing in FIG. 15. The camera body process in FIG. 16 is performed under the control of the system controller 120. Steps S1600 to S1602 of the camera body process in FIG. 16 are the same as the steps S300 to S302 of the camera body process in FIG. 3, respectively, and hence description thereof is omitted.

After execution of the step S1602, the system controller 120 determines, based the lens information, whether or not the lens unit 200 is capable of notifying the system controller 120 of a result of image blur correction mode determination (step S1603). If the lens unit 200 is capable of notifying the system controller 120 of a result of image blur correction mode determination (YES to the step S1603), the system controller 120 starts a first image blur correction mode determination timer interruption process, described hereinafter (step S1604). After that, the first image blur correction mode determination timer interruption process is repeatedly performed at predetermined time intervals.

If the lens unit 200 is incapable of notifying the system controller 120 of a result of image blur correction mode determination (NO to the step S1603), the system controller 120 starts a second image blur correction mode determination timer interruption process, described hereinafter (step S1605). After that, the second image blur correction mode determination timer interruption process is repeatedly performed at predetermined time intervals.

After execution of the step S1604 or S1605, the system controller 120 starts a gyro readout timer interruption process in a step S1606. Note that the gyro readout timer interruption process in the step S1606 is the same as the gyro readout timer interruption process in the step S306 in FIG. 3, and hence description thereof is omitted.

After execution of the step S1606, the system controller 120 controls the image processor 123 to perform image blur correction according to the image blur correction mode set in the step S1604 or S1605 (step S1607), followed by terminating the camera body process.

Figure 17:
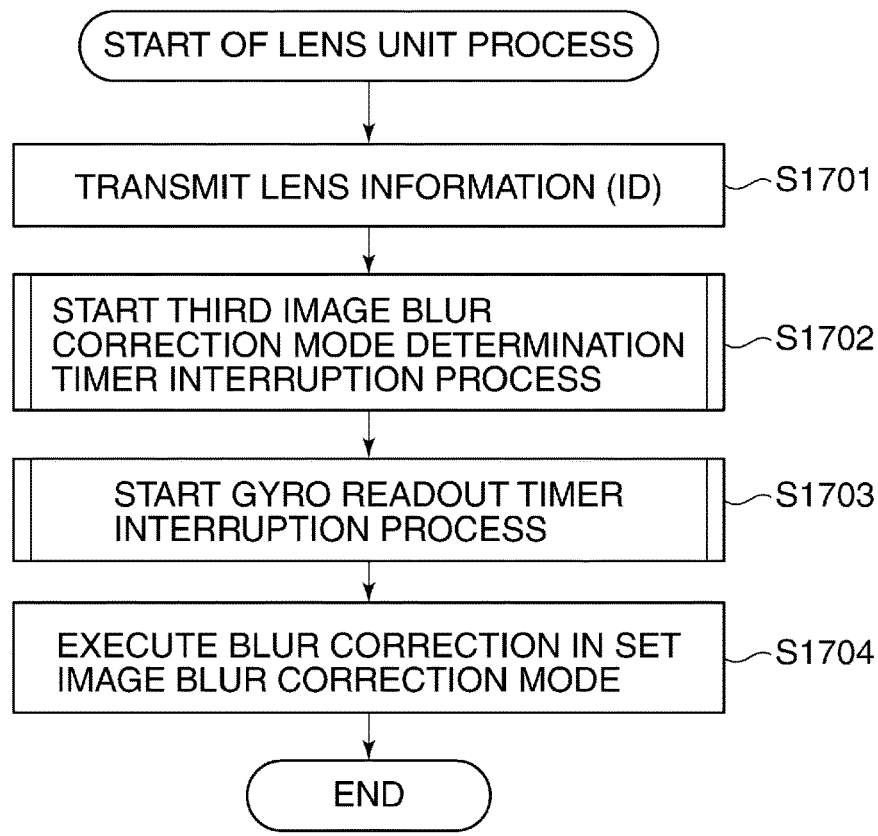
FIG. 17 is a flowchart of a lens unit process performed by a lens unit appearing in FIG. 15.

FIG. 17 is a flowchart of a lens unit process performed by the lens unit 200 appearing in FIG. 15. The lens unit process in FIG. 17 is performed under the control of the lens controller 203. Further, a step S1701 of the lens unit process in FIG. 17 is the same as the step S401 of the lens unit process in FIG. 4, and hence description thereof is omitted.

After execution of the step S1701, the lens controller 203 starts a third image blur correction mode determination timer interruption process, described hereinafter (step S1702). After that, the third image blur correction mode determination timer interruption process is repeatedly performed at predetermined time intervals.

Next, in a step S1703, similar to the step S403 of the lens unit process described with reference to FIG. 4, the lens controller 203 starts a gyro readout timer interruption process. Then, the lens controller 203 controls the lens driving section 204 to perform image blur correction according to the image blur correction mode set in the step S1702. After that, the lens controller 203 terminates the present process.

Figure 18:
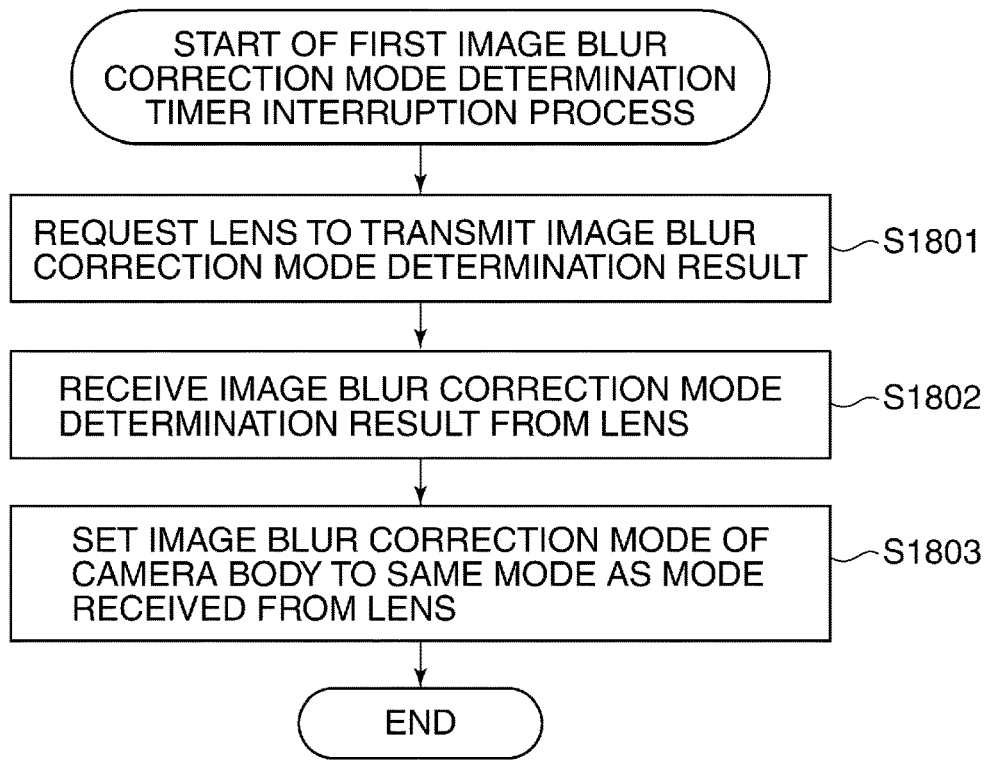
FIG. 18 is a flowchart of a first image blur correction mode determination timer interruption process performed in a step of the camera body process in FIG. 16.

FIG. 18 is a flowchart of the first image blur correction mode determination timer interruption process performed in the step S1604 of the camera body process in FIG. 16.

When the first image blur correction mode determination timer interruption process is started, the system controller 120 requests the lens controller 203 to transmit an image blur correction mode determination result obtained by the lens unit 200 (step S1801). The system controller 120 receives, as a response to this request, the image blur correction mode determination result obtained by the lens unit 200, from the lens controller 203 (step S1802).

Then, the system controller 120 sets the image blur correction mode of the image processor 123 to the same mode as that indicated by the image blur correction mode determination result received from the lens unit 200 (step S1803), followed by terminating the present process.

Figure 19:
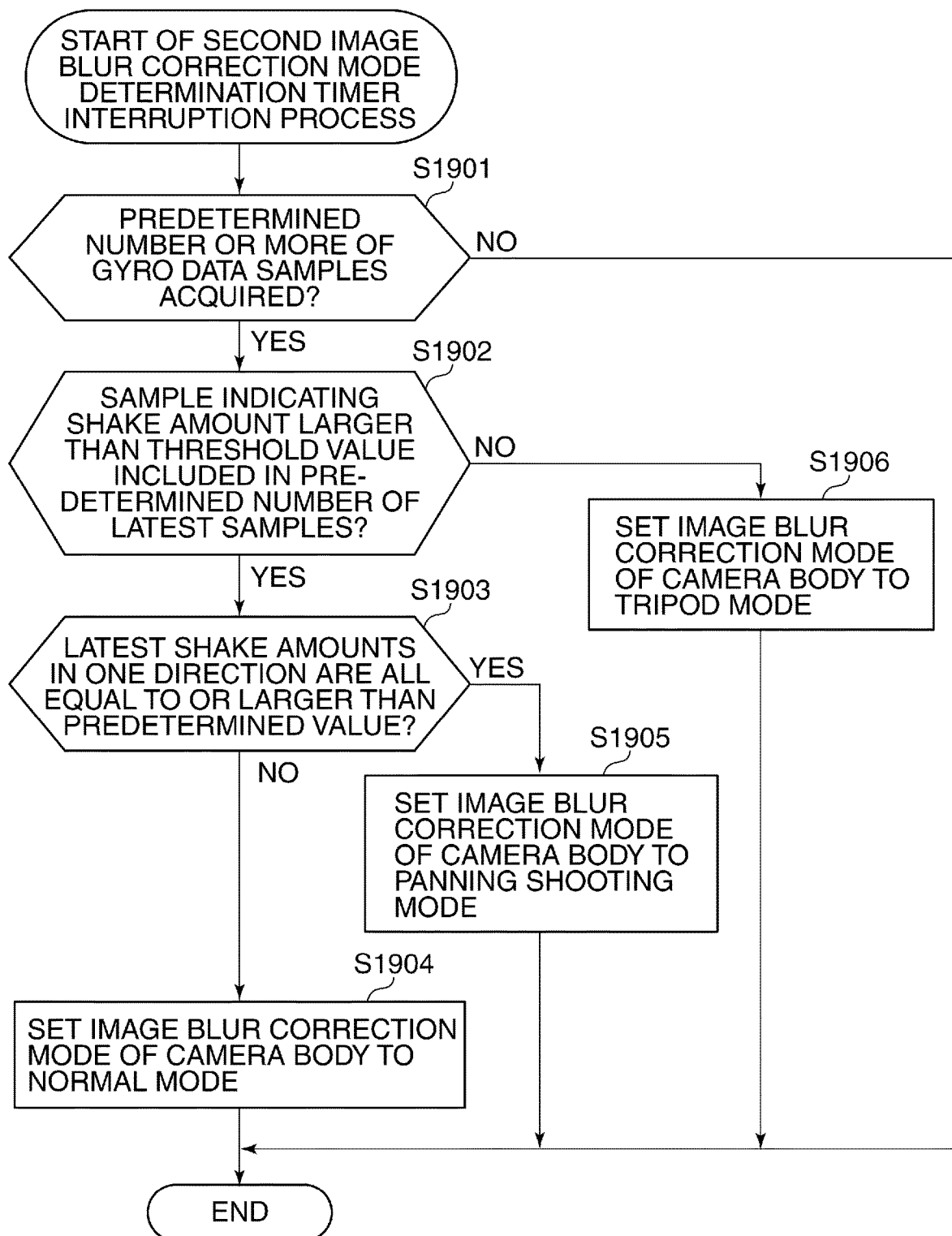
FIG. 19 is a flowchart of a second image blur correction mode determination timer interruption process performed in a step of the camera body process in FIG. 16.

FIG. 19 is a flowchart of the second image blur correction mode determination timer interruption process performed in the step S1605 of the camera body process in FIG. 16.

When the second image blur correction mode determination timer interruption process is started, the system controller 120 executes steps S1901 and S1902. The steps S1901 and S1902 are the same as the steps S601 and S602 of the second tripod detection timer interruption process in FIG. 6.

If the number of acquired shake amount data samples is smaller than the predetermined number (NO to the step S1901), the system controller 120 terminates the present process.

If it is determined in the step S1902 that a sample indicating a shake amount larger than the predetermined threshold value is included in the checked samples (YES to the step S1902), the system controller 120 checks latest shake amount data items recently obtained over a predetermined time period, and determines from the checked shake amount data items whether or not shake amounts in one direction are all equal to or larger than a predetermined value (not smaller than a predetermined amount) (step S1903). If the shake amounts in one direction are not all equal to or larger than the predetermined value (NO to the step S1903), the system controller 120 sets the image blur correction mode of the camera body 100 to the "normal mode" (step S1904). In other words, the system controller 120 sets the image blur correction mode of the image processor 123 to the "normal mode", followed by terminating the present process.

If the shake amounts in one direction are all equal to or larger than the predetermined value (YES to the step S1903), the system controller 120 sets the image blur correction mode of the camera body 100 to the "panning shooting mode" (step S1905). In other words, the system controller 120 sets the image blur correction mode of the image processor 123 to the "panning shooting mode", followed by terminating the present process.

If it is determined in the step S1902 no sample indicating a shake amount larger than the predetermined threshold value is included in the checked samples (NO to the step S1902), the system controller 120 sets the image blur correction mode of the camera body 100 to the "tripod mode" (step S1904). In other words, the system controller 120 sets the image blur correction mode of the image processor 123 to the "tripod mode", followed by terminating the present process.

Figure 20:
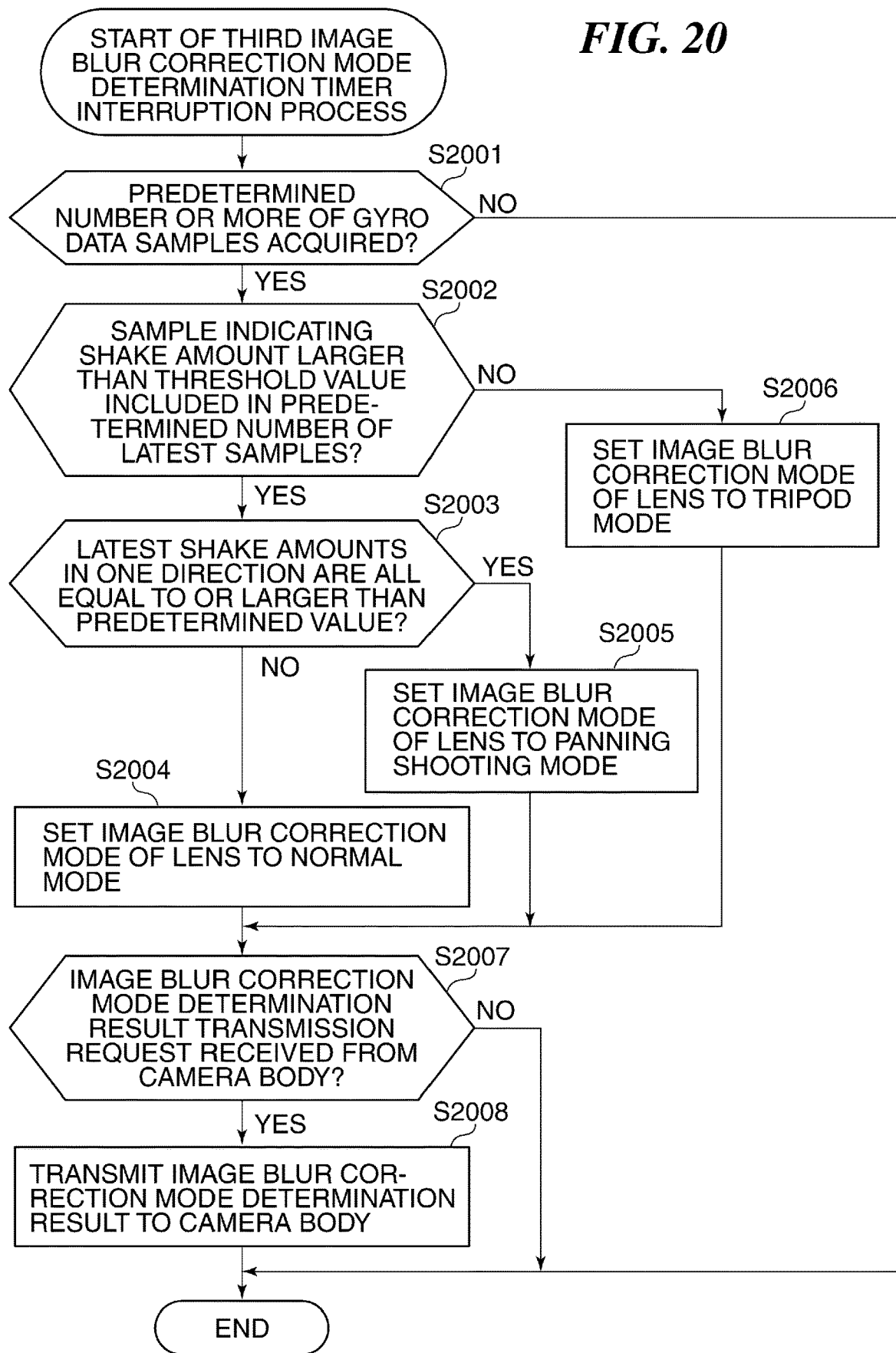
FIG. 20 is a flowchart of a third image blur correction mode determination timer interruption process performed in a step of the lens unit process in FIG. 17.

FIG. 20 is a flowchart of the third image blur correction mode determination timer interruption process performed in the step S1702 of the lens unit process in FIG. 17.

When the third image blur correction mode determination timer interruption process is started, the lens controller 203 executes steps S2001 and S2002. The steps S2001 and S2002 are the same as the steps S801 and S802 in FIG. 8.

If the number of acquired shake amount data samples is smaller than the predetermined number (NO to the step S2001), the lens controller 203 terminates the present process. If it is determined in the step S2002 that a sample indicating a shake amount larger than a predetermined threshold value is included in the checked samples (YES to the step S2002), the lens controller 203 checks latest shake amount data items recently obtained over a predetermined time period, and determines from the checked shake amount data items whether or not shake amounts in one direction are all equal to or larger than a predetermined value (step S2003). If the shake amounts in one direction are not all equal to or larger than the predetermined value (NO to the step S2003), the lens controller 203 sets the image blur correction mode of the lens unit 200 to the "normal mode" (step S2004). In other words, the lens controller 203 sets the image blur correction mode of the lens driving section 204 to the "normal mode".

On the other hand, if the shake amounts in one direction are all equal to or larger than the predetermined value (YES to the step S2003), the lens controller 203 sets the image blur correction mode of the lens unit 200 to the "panning shooting mode" (step S2005). In other words, the lens controller 203 sets the image blur correction mode of the lens driving section 204 to the "panning shooting mode".

If it is determined in the step S2002 that no sample indicating a shake amount larger than the predetermined threshold value is included in the checked samples (NO to the step S2002), the lens controller 203 sets the image blur correction mode of the lens unit 200 to the "tripod mode" (step S2006). In other words, the lens controller 203 sets the image blur correction mode of the lens driving section 204 to the "tripod mode".

After execution of the step S2004, S2005, or S2006, the lens controller 203 determines whether or not a request for transmitting the image blur correction mode determination result has been received from the system controller 120 (step S2007). If the transmission request has been received (YES to the step S2007), the lens controller 203 transmits the image blur correction mode determination result to the system controller 120 (step S2008), followed by terminating the present process. If the transmission request has not been received (NO to the step S2007), the lens controller 203 terminates the present process.

As described above, in the fourth embodiment, the image blur correction mode of the lens unit 200 is prioritized, and the image blur correction mode of the camera body 100 is caused to coincide with the image blur correction mode of the lens unit 200. With this, when the lens unit 200 capable of notifying the system controller 120 of the image blur correction mode determination result is attached to the camera body 100, both of the camera body 100 and the lens unit 200 are set to the same image blur correction mode, whereby it is possible to prevent an unnatural image or video from being generated.

Although in the fourth embodiment, the priority is given to the image blur correction mode of the lens unit 200, and the image blur correction mode of the camera body 100 is caused to coincide with the image blur correction mode of the lens unit 200, the image blur correction mode determination result obtained by the camera body 100 may be prioritized.

Next, a description will be given of a fifth embodiment of the present invention. The camera as an image pickup apparatus according to the fifth embodiment has the same configuration as that of the camera shown in FIG. 15. Further, a camera body process, a lens unit process, a second image blur correction mode determination timer interruption process, and a gyro readout timer interruption process in the fifth embodiment are the same as the corresponding processes in FIGS. 16, 17, 19, and 7, respectively.

Figure 21:
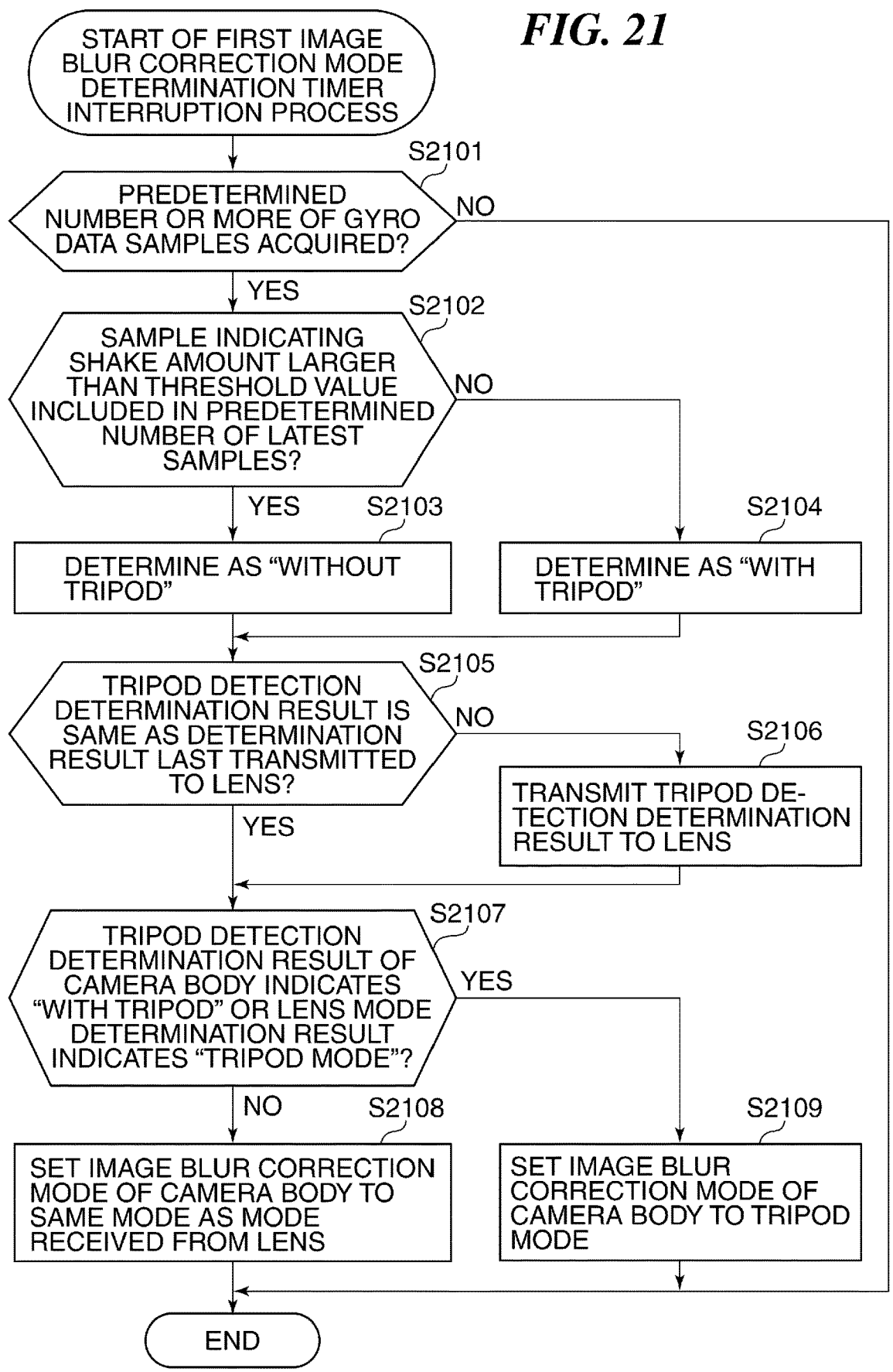
FIG. 21 is a flowchart of a first image blur correction mode determination timer interruption process performed by a camera body of a digital camera as an image pickup apparatus according to a fifth embodiment of the present invention.

FIG. 21 is a flowchart of a first image blur correction mode determination timer interruption process performed by the camera body 100 of the camera as the image pickup apparatus according to the fifth embodiment.

When the first image blur correction mode determination timer interruption process is started, the system controller 120 executes steps S2101 to S2106. The steps S2101 to S2106 are the same as the steps S901 to S906 of the first image blur correction mode determination timer interruption process in FIG. 9.

If it is determined in the step S2105 that the tripod detection determination result obtained by the camera body 100 is the same as a determination result transmitted to the lens unit 200 last time (YES to the step S2105), or after execution of the step S2106, the system controller 120 proceeds to a step S2107.

In the step S2107, the system controller 120 refers to the tripod detection determination result obtained by the camera body 100 and the image blur correction mode determination result received from the lens unit 200 last time. Then, the system controller 120 determines whether or not the tripod detection determination result obtained by the camera body 100 indicates "with tripod" or the image blur correction mode determination result received from the lens unit 200 last time indicates "the tripod mode".

If the condition that the tripod detection determination result indicates "with tripod" or the last received image blur correction mode determination result indicates "the tripod mode" is not satisfied (NO to the step S2107), the system controller 120 proceeds to a step S2108. In the step S2108, the system controller 120 sets the image blur correction mode of the image processor 123 to the same mode as the mode indicated by the image blur correction mode determination result received from the lens unit 200 last time, followed by terminating the present process.

On the other hand, if the tripod detection determination result indicates "with tripod" or the last received image blur correction mode determination result indicates "the tripod mode" (YES to the step S2107), the system controller 120 sets the image blur of the image processor 123 to the "tripod mode" (step S2109), followed by terminating the present process.

Figure 22:
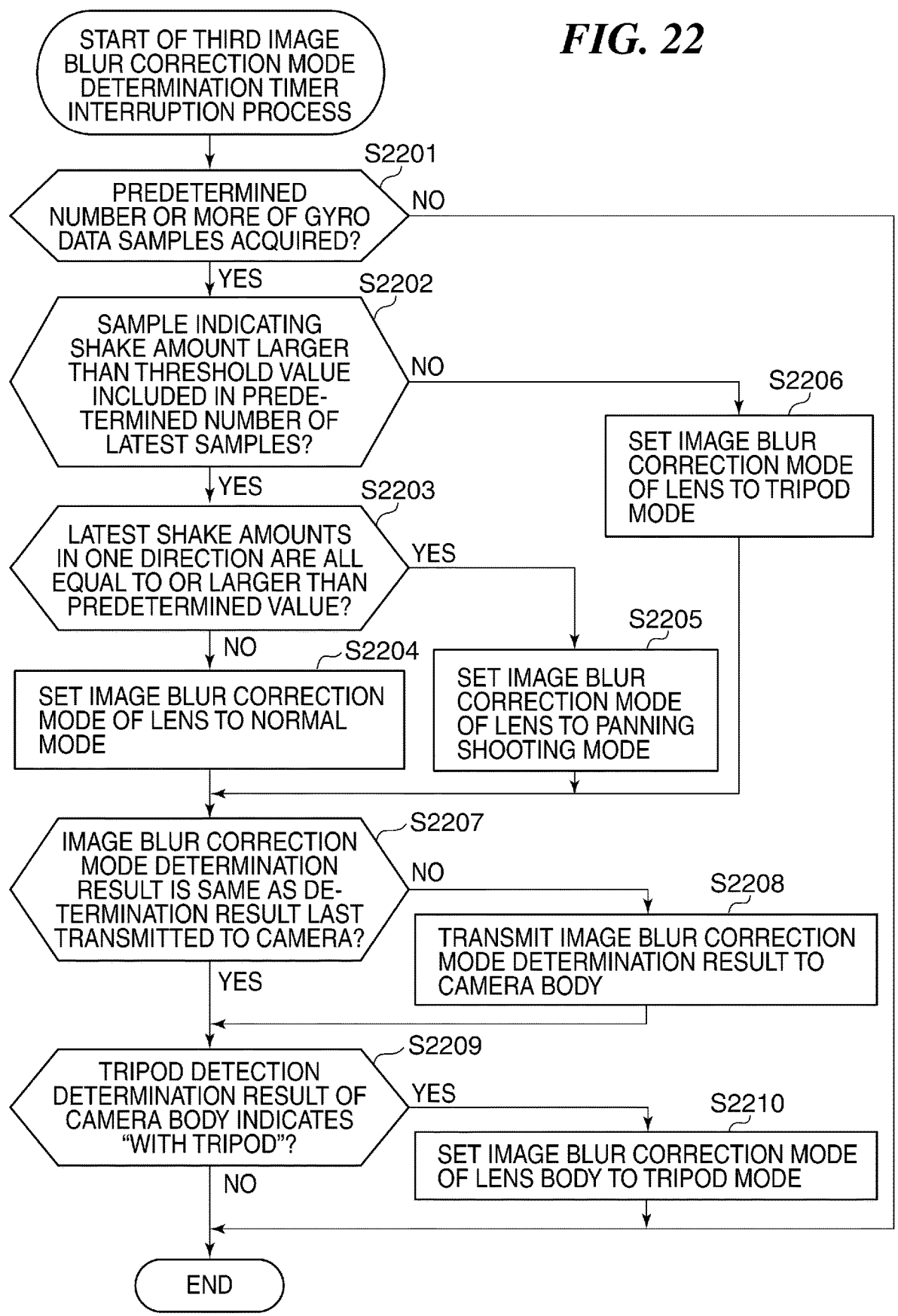
FIG. 22 is a flowchart of a third image blur correction mode determination timer interruption process performed by a lens unit of the digital camera as the image pickup apparatus according to the fifth embodiment.

FIG. 22 is a flowchart of a third image blur correction mode determination timer interruption process performed by the lens unit 200 of the camera as the image pickup apparatus according to the fifth embodiment. Steps S2201 to S2206 in FIG. 22 are the same as the steps S2001 to S2006 of the third image blur correction mode determination timer interruption process in FIG. 20.

After execution of the step S2204, S2205, or S2206, the lens controller 203 determines whether or not the image blur correction mode determination result obtained by the lens unit 200 is the same as the determination result transmitted to the camera body 100 last time (step S2207). If the image blur correction mode determination result is different from the last transmitted determination result (NO to the step S2207), the lens controller 203 transmits the image blur correction mode determination result obtained by the lens unit 200 to the system controller 120 (step S2208), and then proceeds to the step S2209.

If the image blur correction mode determination result is the same as the last transmitted determination result (YES to the step S2207), the lens controller 203 directly proceeds to the step S2209 to check whether or not the tripod detection determination result received from the camera body 100 last time indicates "with tripod".

If the last received tripod detection determination result indicates "with tripod" (YES to the step S2209), the lens controller 203 sets the image blur correction mode of the lens driving section 204 to the "tripod mode" (step S2210), followed by terminating the present process. If the last received tripod detection determination result indicates "without tripod" (NO to the step S2209), the lens controller 203 terminates the present process.

As described above, in the fifth embodiment, when the shake detection amount is not larger than the threshold value in at least one of the camera shake detection section 151 and the lens shake detection section 205, the image blur correction mode of both the camera body 100 and the lens unit 200 is set to the "tripod mode". With this, even when a large shake amount is erroneously detected by one of the camera shake detection section 151 and the lens shake detection section 205 e.g. due to interference of vibration caused by driving of the lens in spite of the fact that the actual shake amount is sufficiently small, it is possible to prevent a situation in which the "tripod mode" is cancelled out.

Further, in the fifth embodiment, the system controller 120 and the lens controller 203 notify the respective other parties of the tripod detection determination result and the image blur correction mode determination result, only in the case where the tripod detection determination result and the image blur correction mode determination result, obtained respectively, are different from the respective determination results transmitted, i.e. notified to the respective other parties last time. This makes it possible to reduce frequency of communication between the system controller 120 and the lens controller 203.

Note that in the fifth embodiment, the "tripod detection" refers to the determination of whether or not the shake amount detected by the camera body 100 and the lens unit 200 is sufficiently small, and is not limited to the determination of whether or not the camera is fixed to a tripod.

Next, a description will be given of a sixth embodiment of the present invention. The camera as an image pickup apparatus according to the sixth embodiment has the same configuration as that of the camera shown in FIG. 15.

Figure 23:
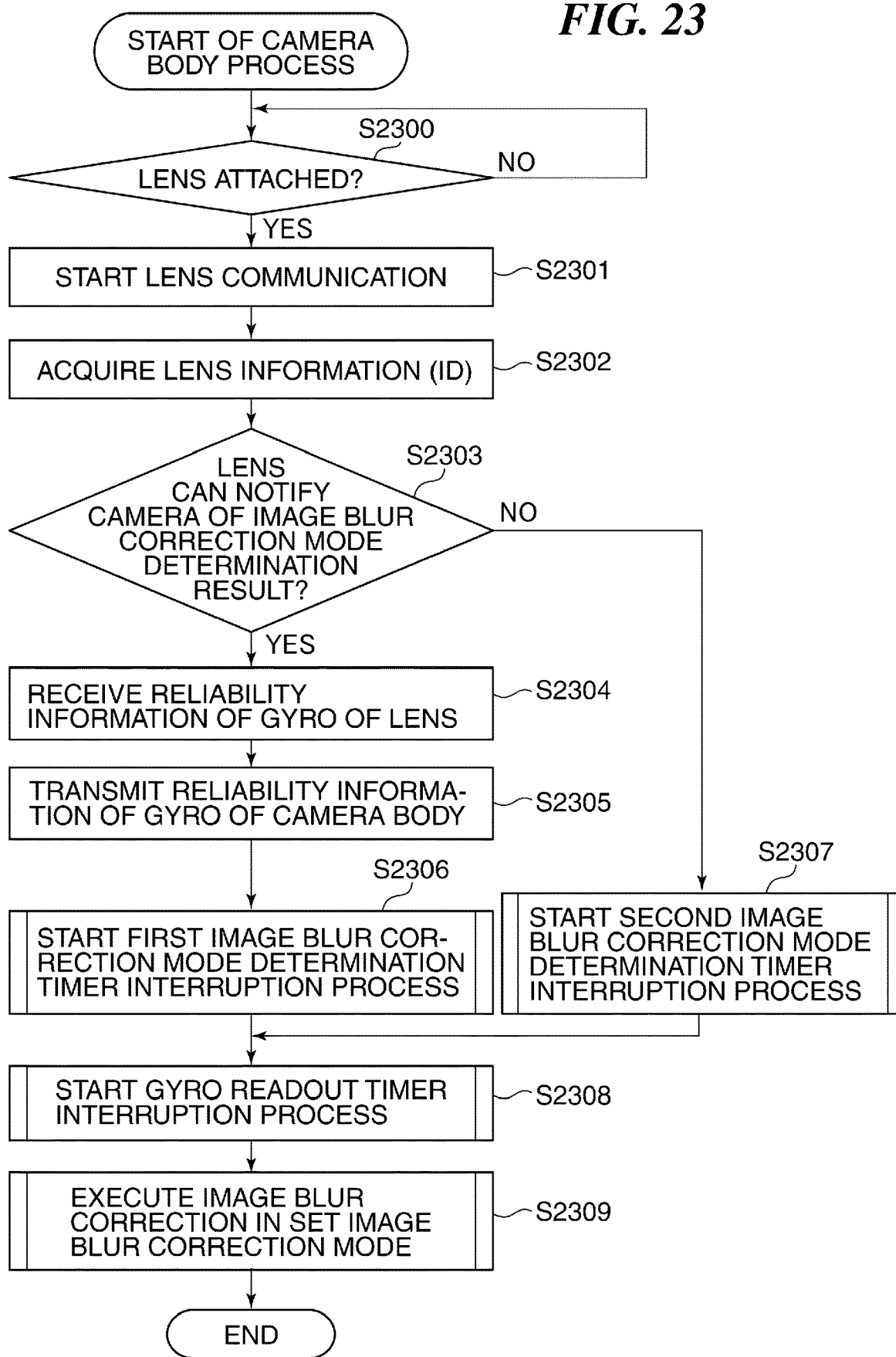
FIG. 23 is a flowchart of a camera body process performed by a camera body of a digital camera as an image pickup apparatus according to a sixth embodiment of the present invention.

FIG. 23 is a flowchart of a camera body process performed by the camera body 100 of the camera as the image pickup apparatus according to the sixth embodiment.

Note that in FIG. 23, steps S2304 and S2305 are executed between steps S2303 and S2306 corresponding to the steps S1603 and S1604 in FIG. 16. Further, a step S2300 to the step S2303 and steps S2307 to S2309 in FIG. 23 are the same as the steps S1600 to S1603 and S1605 to S1607 of the camera body process in FIG. 16.

If the lens unit 200 is capable of notifying the system controller 120 of an image blur correction mode determination result (YES to the step S2303), the system controller 120 receives information on reliability of the result of detection by the lens shake detection section 205 (reliability information) from the lens controller 203 (step S2304). Here, as the reliability information, the system controller 120 receives, for example, information on an S/N ratio of the result of detection by the lens shake detection section 205.

Then, the system controller 120 transmits information on reliability of the result of detection by the camera shake detection section 151 (reliability information) to the lens controller 203 (step S2305). Here, as the reliability information, the system controller 120 transmits, for example, information on an S/N ratio of the result of detection by the camera shake detection section 151. Then, the system controller 120 starts a first image blur correction mode determination timer interruption process, described hereinafter (step S2306). If the lens unit 200 is incapable of notifying the system controller 120 of an image blur correction mode determination result (NO to the step S2303), the system controller 120 starts a second image blur correction mode determination timer interruption process, described hereinafter (step S2307).

Figure 24:
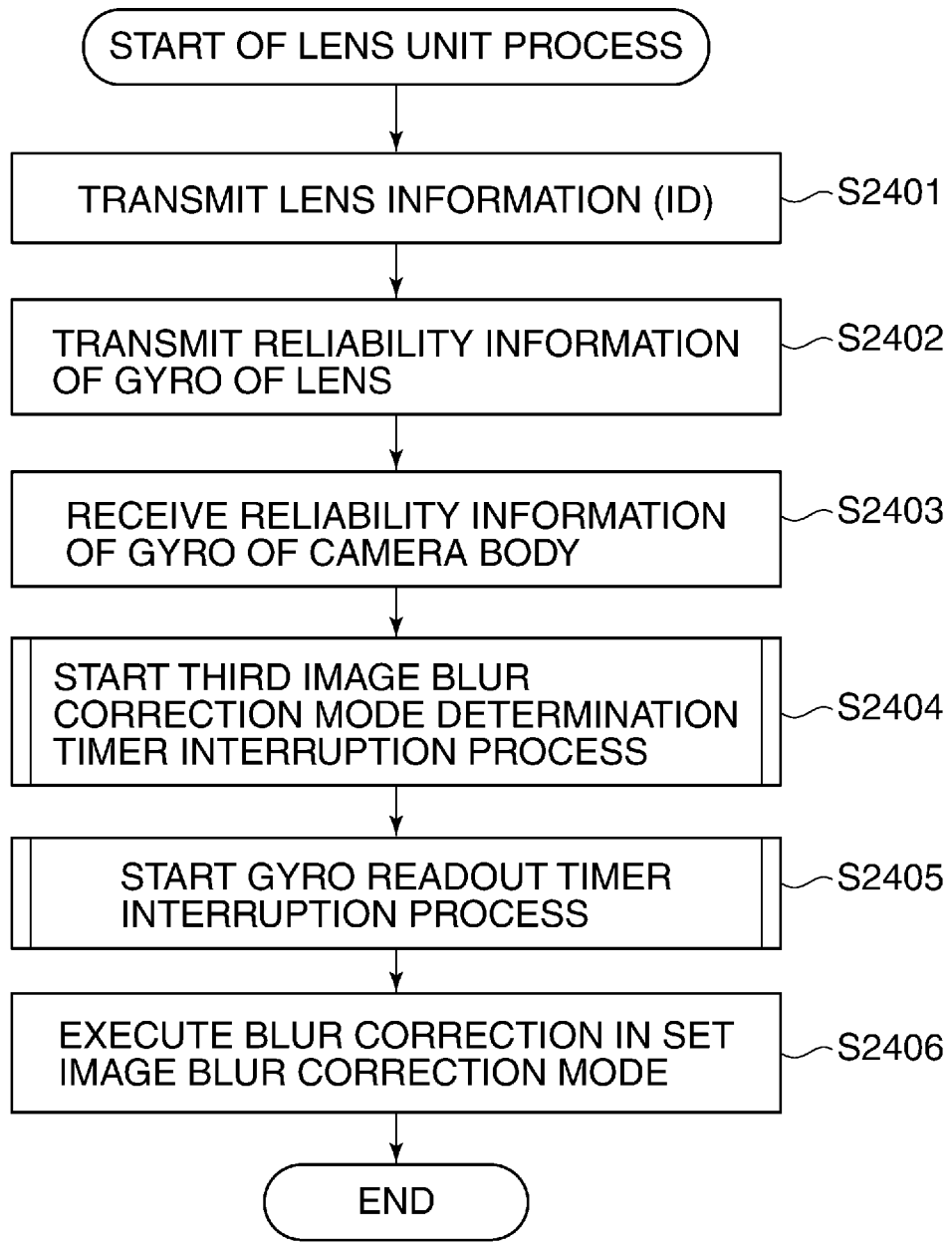
FIG. 24 is a flowchart of a lens unit process performed by a lens unit of the digital camera as the image pickup apparatus according to the sixth embodiment.

FIG. 24 is a flowchart of a lens unit process performed by the lens unit 200 of the camera as the image pickup apparatus according to the sixth embodiment. Note that in FIG. 24, steps S2402 and S2403 are executed between steps S2401 and S2404 corresponding to the steps S1701 and S1702 of the lens unit process in FIG. 17. Further, the step S2401, and steps S2405 and S2406 in FIG. 24 are the same as the steps S1701, S1703, and S1704 of the lens unit process in FIG. 17.

After execution of the step S2401, the lens controller 203 transmits information on reliability of data output from the lens shake detection section 205 included in the lens unit 200 to the system controller 120 (step S2402). For example, the lens controller 203 transmits information on an S/N ratio of the lens shake detection section 205.

Then, the lens controller 203 receives information on reliability of data output from the camera shake detection section 151 included in the camera body 100 from the system controller 120 (step S2403). For example, the lens controller 203 receives information on an S/N ratio of the camera shake detection section 151. Then, the lens controller 203 starts a third image blur correction mode determination timer interruption process, described hereinafter (step S2404).

Figure 25:
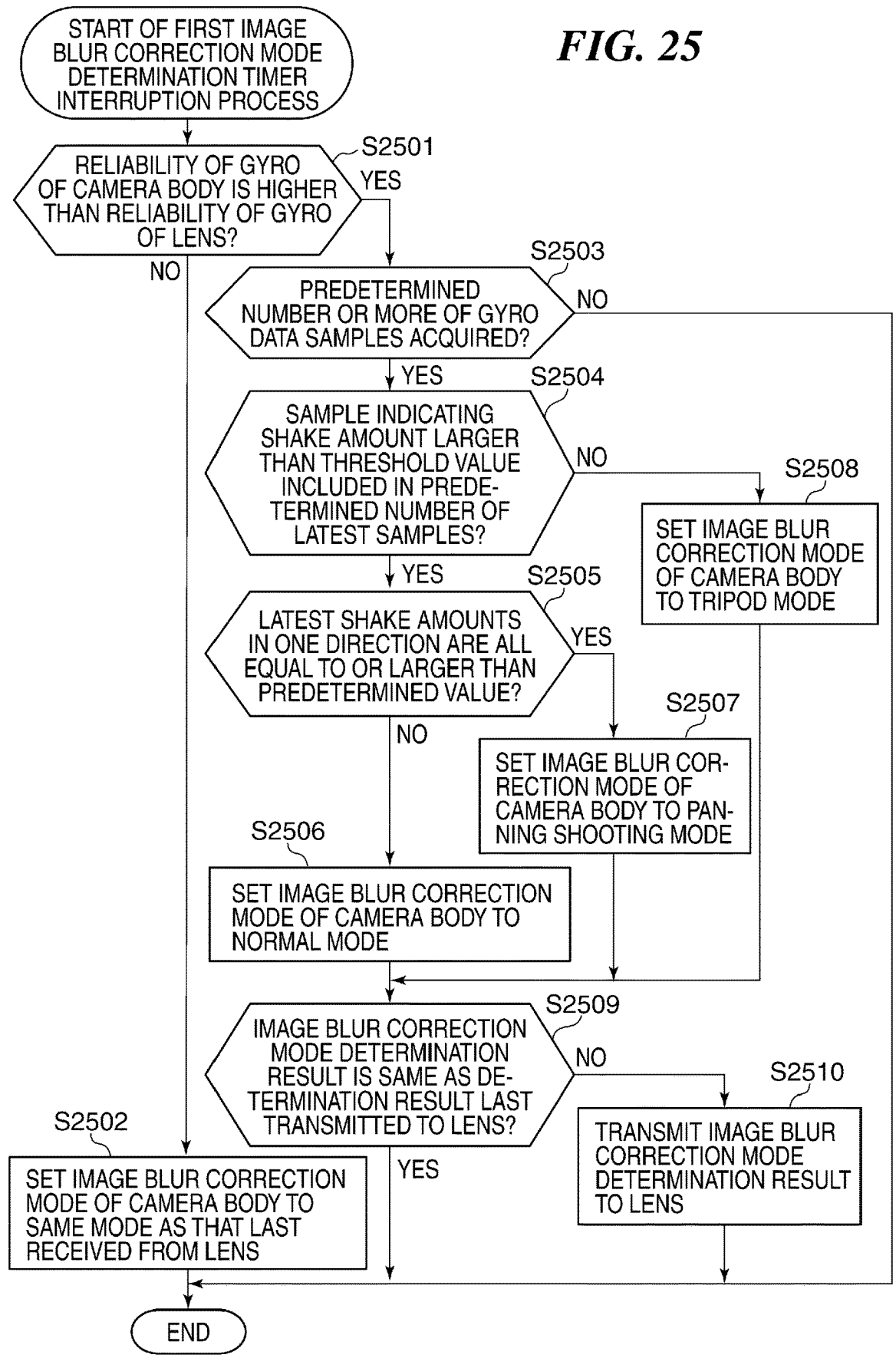
FIG. 25 is a flowchart of a first image blur correction mode determination timer interruption process performed in a step of the camera body process in FIG. 23.

FIG. 25 is a flowchart of the first image blur correction mode determination timer interruption process performed in the step S2306 of the camera body process in FIG. 23. Note that a step S2501 of the first image blur correction mode determination timer interruption process in FIG. 25 is the same as the step S1301 of the first tripod detection timer interruption process in FIG. 13. Further, steps S2503 and S2504 are the same as the steps S901 and S902 of the first tripod detection timer interruption process in FIG. 9.

If it is determined in the step S2501 that the reliability of the camera shake detection section 151 is not higher than the reliability of the lens shake detection section 205 (NO to the step S2501), the system controller 120 proceeds to a step S2502. In the step S2502, the system controller 120 sets the image blur of the image processor 123 to the same mode as that indicated by the image blur correction mode determination result received from the lens unit 200 last time, followed by terminating the present process.

If it is determined in the step S2503 that the number of acquired shake amount data samples is smaller than the predetermined number (NO to the step S2503), the system controller 120 terminates the present process. If a sample indicating a shake amount larger than the predetermined threshold value is included in the checked samples (YES to the step S2504), the system controller 120 checks latest shake amount data items recently obtained over a predetermined time period, and determines from the checked shake amount data items whether or not shake amounts in one direction are all equal to or larger than a predetermined value (step S2505).

If the shake amounts in one direction are not all equal to or larger than the predetermined value (NO to the step S2505), the system controller 120 sets the image blur correction mode determination result of the camera body 100 to the "normal mode", and then sets the image blur correction mode of the image processor 123 to the "normal mode" (step S2506).

On the other hand, if the shake amounts in one direction are all equal to or larger than the predetermined value (YES to the step S2505), the system controller 120 sets the image blur correction mode determination result of the camera body 100 to the "panning shooting mode", and then sets the image blur correction mode of the image processor 123 to the "panning shooting mode" (step S2507).

If it is determined in the step S2504 that no sample indicating a shake amount larger than the predetermined threshold value is included in the checked samples (NO to the step S2504), the system controller 120 sets the image blur correction mode determination result of the camera body 100 to the "tripod mode", and then sets the image blur correction mode of the lens driving section 204 to the "tripod mode" (step S2508).

After execution of the step S2506, S2507, or S2508, the system controller 120 determines whether or not the image blur correction mode determination result obtained by the camera body 100 is the same as a determination result transmitted to the lens unit 200 last time (step S2509).

If the image blur correction mode determination result is different from the last transmitted determination result (NO to the step S2509), the system controller 120 transmits the image blur correction mode determination result obtained by the camera body 100 to the lens controller 203 (step S2510), followed by terminating the present process. If the image blur correction mode determination result is the same as the last transmitted determination result (YES to the step S2509), the system controller 120 terminates the present process.

Figure 26:
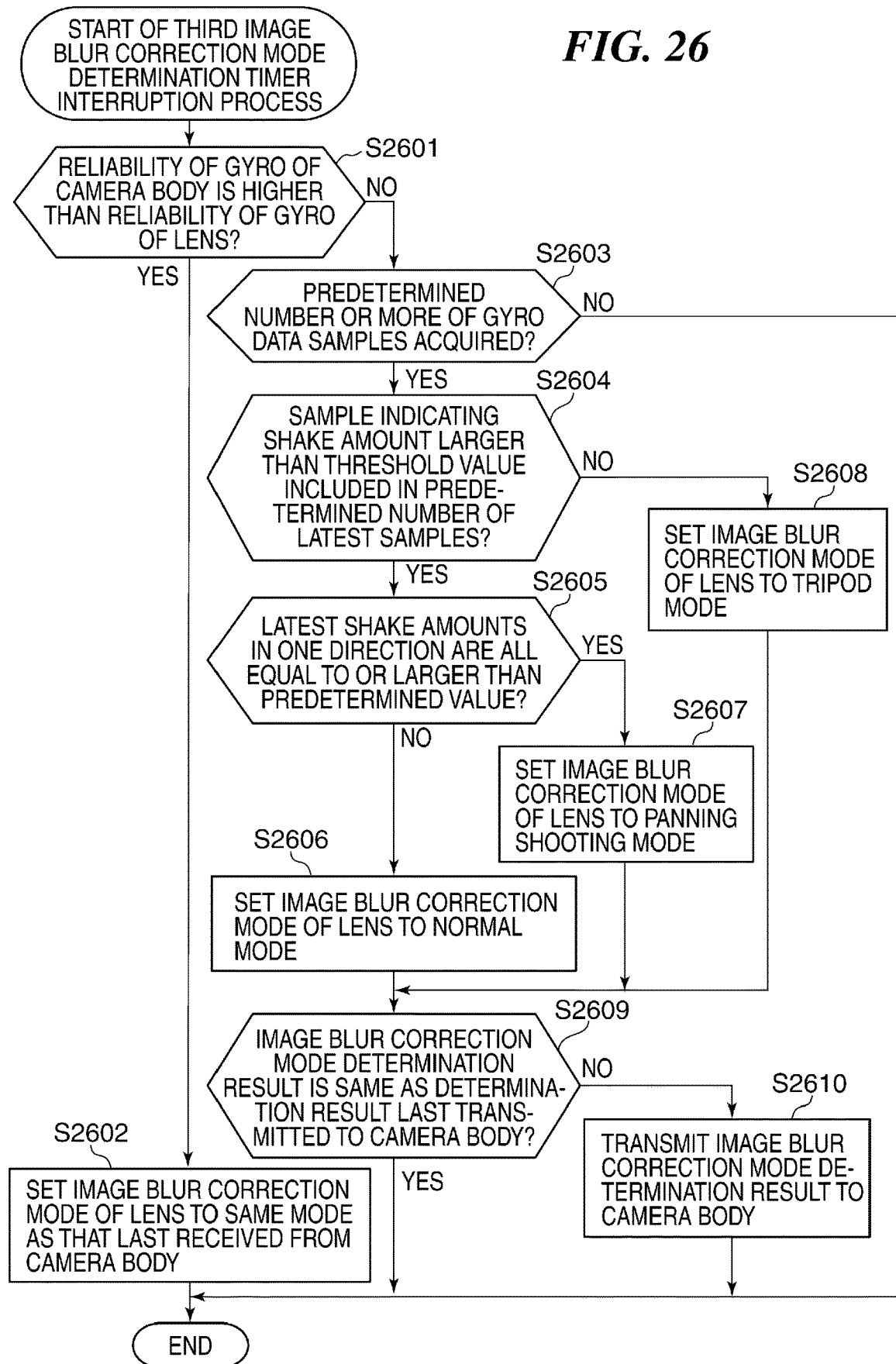
FIG. 26 is a flowchart of a third image blur correction mode determination timer interruption process performed in a step of the lens unit process in FIG. 24.

FIG. 26 is a flowchart of the third image blur correction mode determination timer interruption process performed in the step S2404 of the lens unit process in FIG. 24. Note that a step S2601 of the third image blur correction mode determination timer interruption process in FIG. 26 is the same as the step S1401 of the third tripod detection timer interruption process in FIG. 14. Further, steps S2603 to S2610 are the same as the steps S2201 to S2208 of the third image blur correction mode determination timer interruption process in FIG. 22.

If it is determined in the step S2601 that the reliability of the camera shake detection section 151 is higher than the reliability of the lens shake detection section 205 (YES to the step S2601), the lens controller 203 proceeds to a step S2602. In the step S2602, the lens controller 203 sets the image blur correction mode of the lens driving section 204 to the same mode as that indicated by the last image blur correction mode determination result received from the camera body 100, followed by terminating the present process.

Note that after execution of the step S2610, the lens controller 203 terminates the present process. Further, if the image blur correction mode determination result obtained by the lens unit 200 is the same as the determination result transmitted to the camera body 100 last time (YES to the step S2609), the lens controller 203 terminates the present process.

As described above, in the sixth embodiment, the system controller 120 and the lens controller 203 transmit and receive the information on the reliability of each of the camera shake detection section 151 and the lens shake detection section 205. This makes it possible to determine the image blur correction mode of the camera body 100 and the lens unit 200 using the output of the shake detection section which is higher in reliability.

Although in the sixth embodiment, the information concerning the S/N ratio is used as the information on the reliability of the shake detection section, other information may be used. For example, the information on the temperature of each of the camera shake detection section 151 and the lens shake detection section 205 may be used.

Next, a description will be given of a seventh embodiment of the present invention. The camera as an image pickup apparatus according to the seventh embodiment has the same configuration as that of the camera shown in FIG. 15. A camera body process performed by the camera body 100 of the camera as the image pickup apparatus according to the seventh embodiment and a lens unit process performed by the lens unit 200 are the same as the corresponding processes, described with reference to FIGS. 23 and 24. Further, other processes are the same as the corresponding processes described in the fourth embodiment.

Figure 27A:
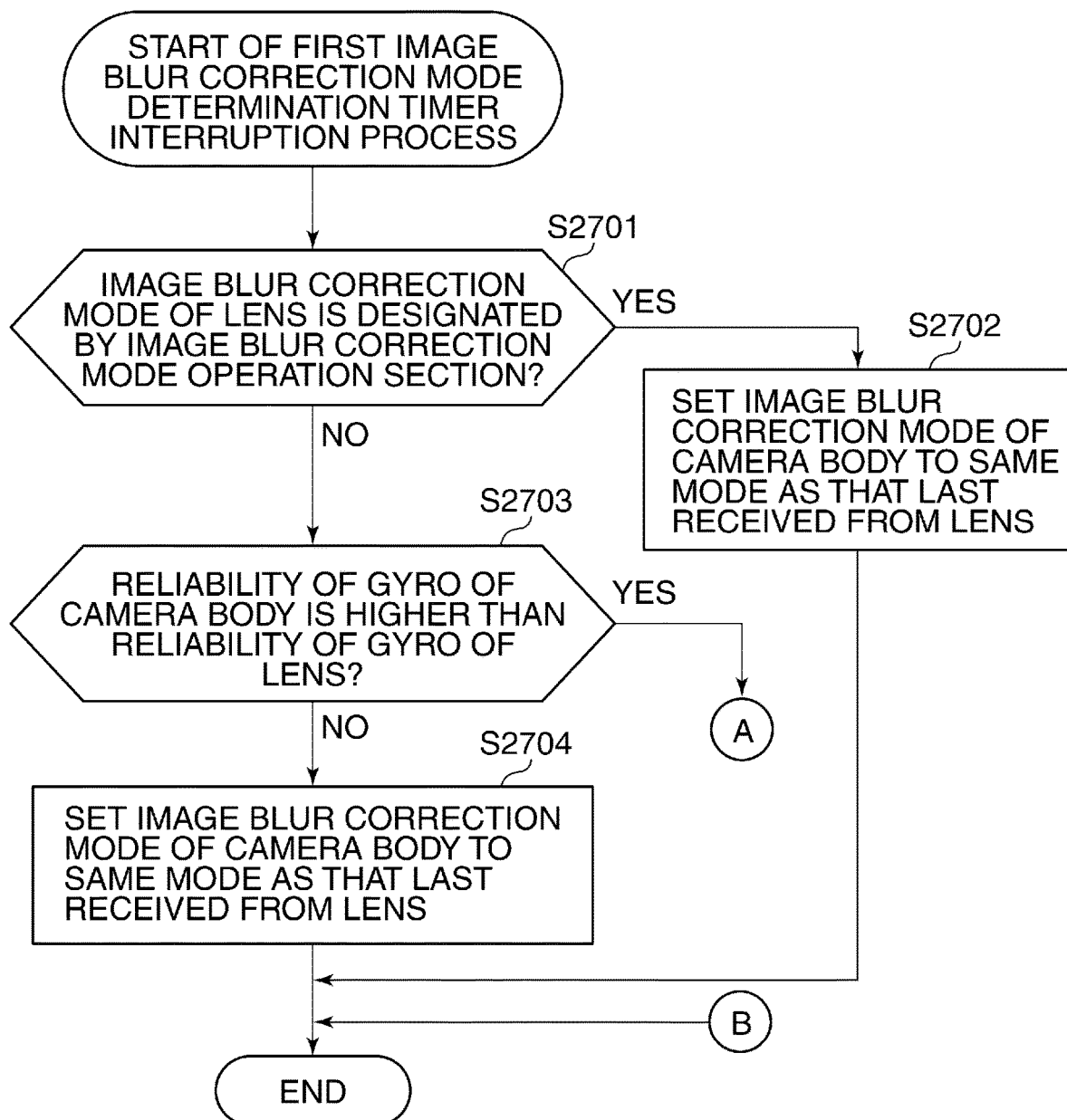
FIGS. 27A and 27B are a flowchart of a first image blur correction mode determination timer interruption process performed by a camera body of a digital camera as an image pickup apparatus according to a seventh embodiment of the present invention.
Figure 27B:
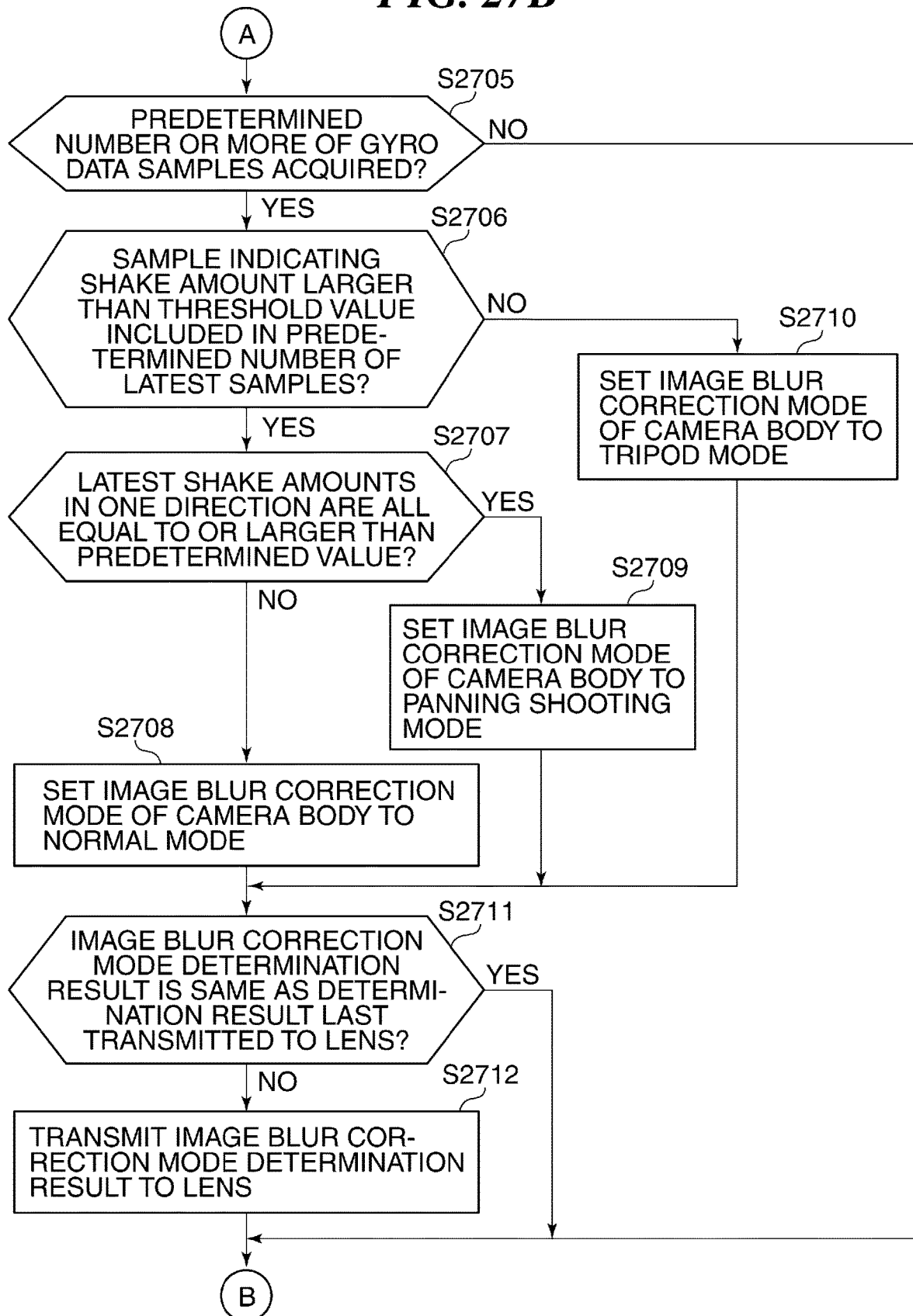

FIGS. 27A and 27B are a flowchart of a first image blur correction mode determination timer interruption process performed by the camera body 100 of the camera as the image pickup apparatus according to the seventh embodiment.

When the first image blur correction mode determination timer interruption process is started, the system controller 120 determines whether or not the image blur correction mode of the lens unit 200 has been designated by the image blur correction mode operation section 206 (step S2701). If the image blur correction mode of the lens unit 200 has been designated by the image blur correction mode operation section 206 (YES to the step S2701), the system controller 120 sets the image blur correction mode of the image processor 123 to the same mode as that indicated by the image blur correction mode determination result received from the lens unit 200 last time (step S2702), followed by terminating the present process.

If the image blur correction mode of the lens unit 200 has not been designated by the image blur correction mode operation section 206 (NO to the step S2701), the system controller 120 proceeds to a step S2703. Note that the step S2703 to a step S2712 of the present process in FIGS. 27A and 27B are the same as the steps S2501 to S2510 of the first image blur correction mode determination timer interruption process in FIG. 25, and hence description thereof is omitted.

Figure 28A:
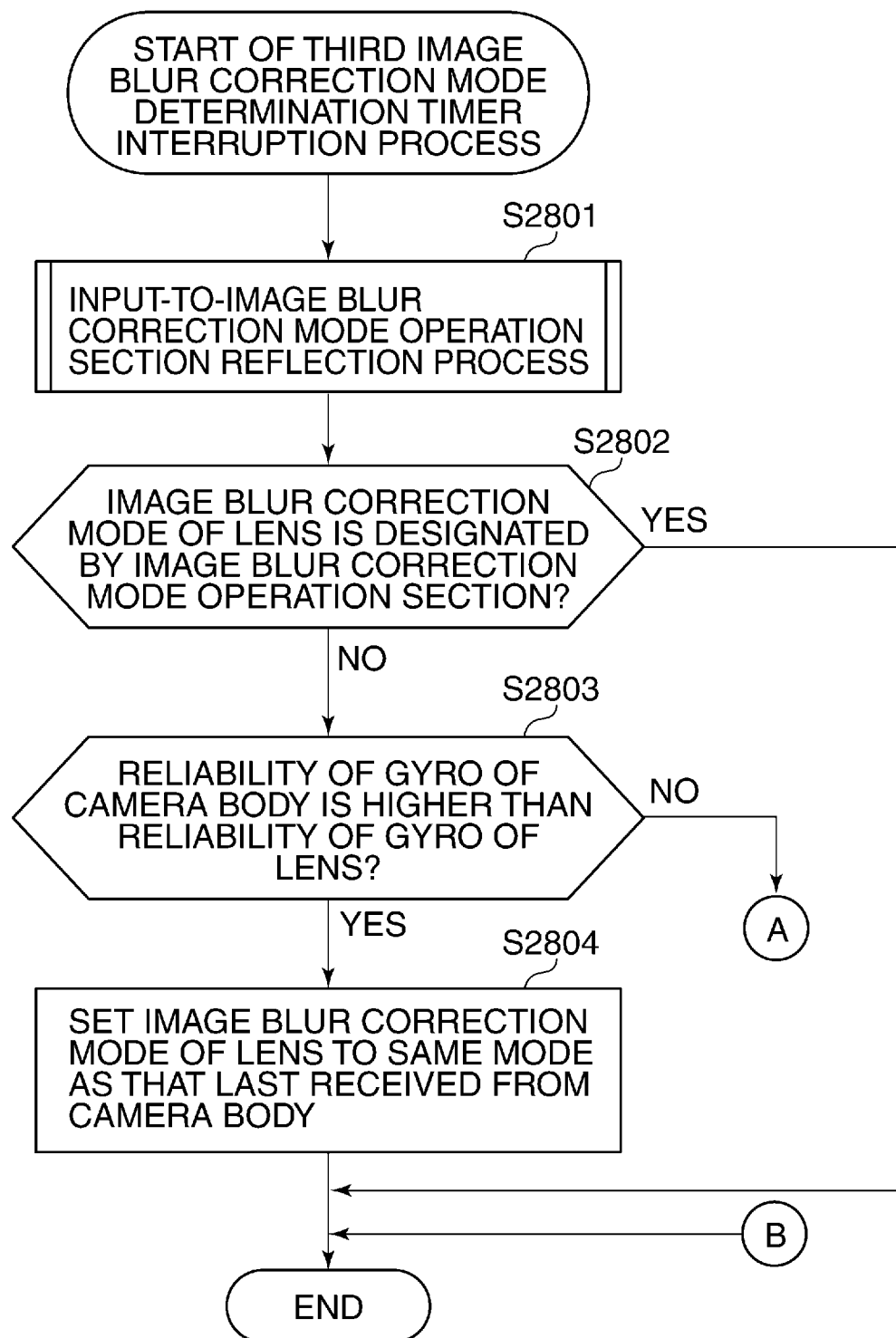
FIGS. 28A and 28B are a flowchart of a third image blur correction mode determination timer interruption process performed by a lens unit of the digital camera as the image pickup apparatus according to the seventh embodiment.
Figure 28B:
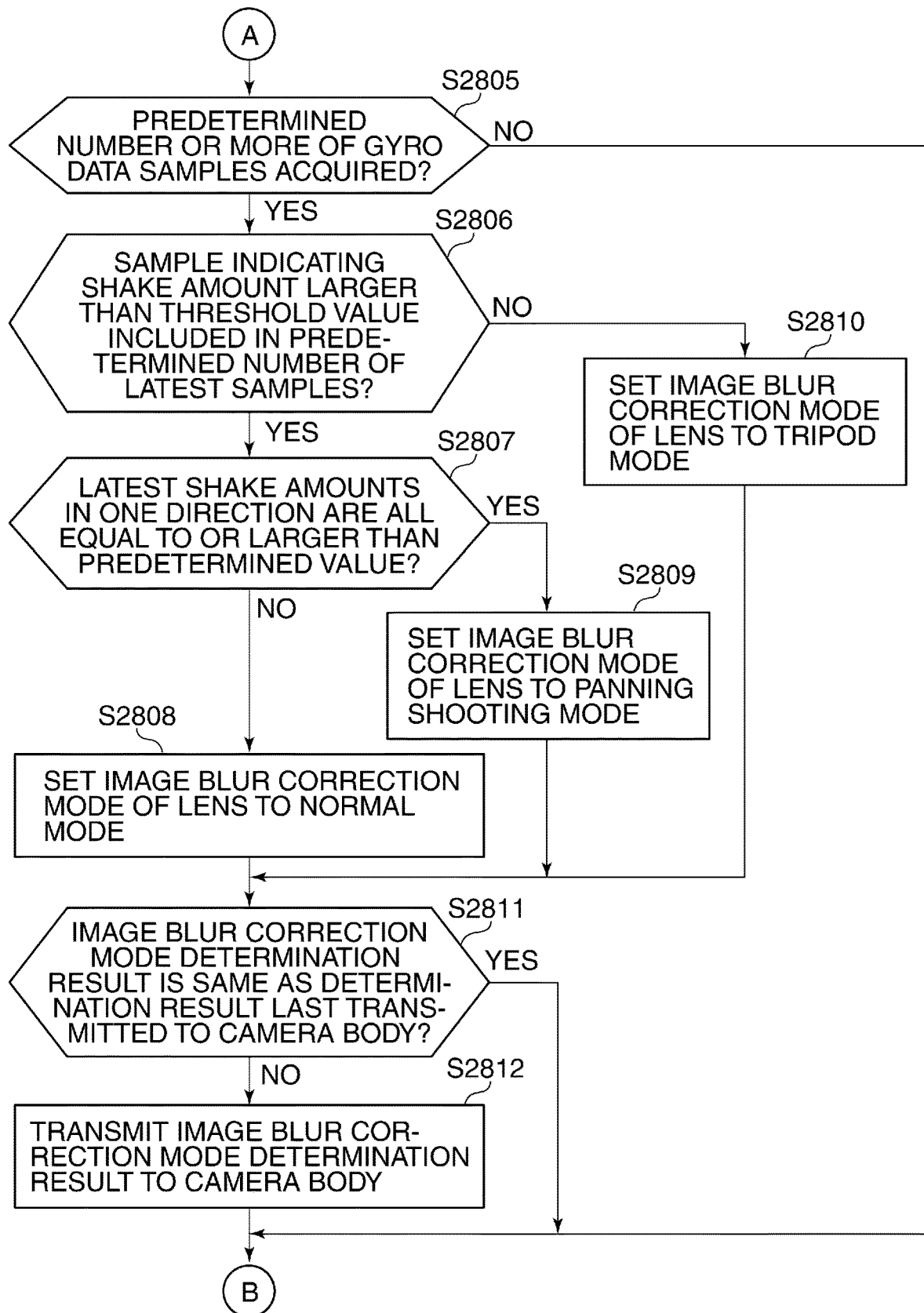

FIGS. 28A and 28B are a flowchart of a third image blur correction mode determination timer interruption process performed by the lens unit 200 of the camera as the image pickup apparatus according to the seventh embodiment.

When the third image blur correction mode determination timer interruption process is started, the lens controller 203 performs an input-to-image blur correction mode operation section reflection process, described hereinafter (step S2801). After that, the lens controller 203 determines whether or not the image blur correction mode of the lens unit 200 has been designated by the image blur correction mode operation section 206 (step S2802). If the image blur correction mode has been designated (YES to the step S2802), the lens controller 203 terminates the present process.

On the other hand, if the image blur correction mode has not been designated (NO to the step S2802), the lens controller 203 proceeds to a step S2803. Note that the step S2803 to a step S2812 of the present process in FIGS. 28A and 28B are the same as the steps S2601 to S2610 of the third image blur correction mode determination timer interruption process in FIG. 26, and hence description thereof is omitted.

Figure 29:
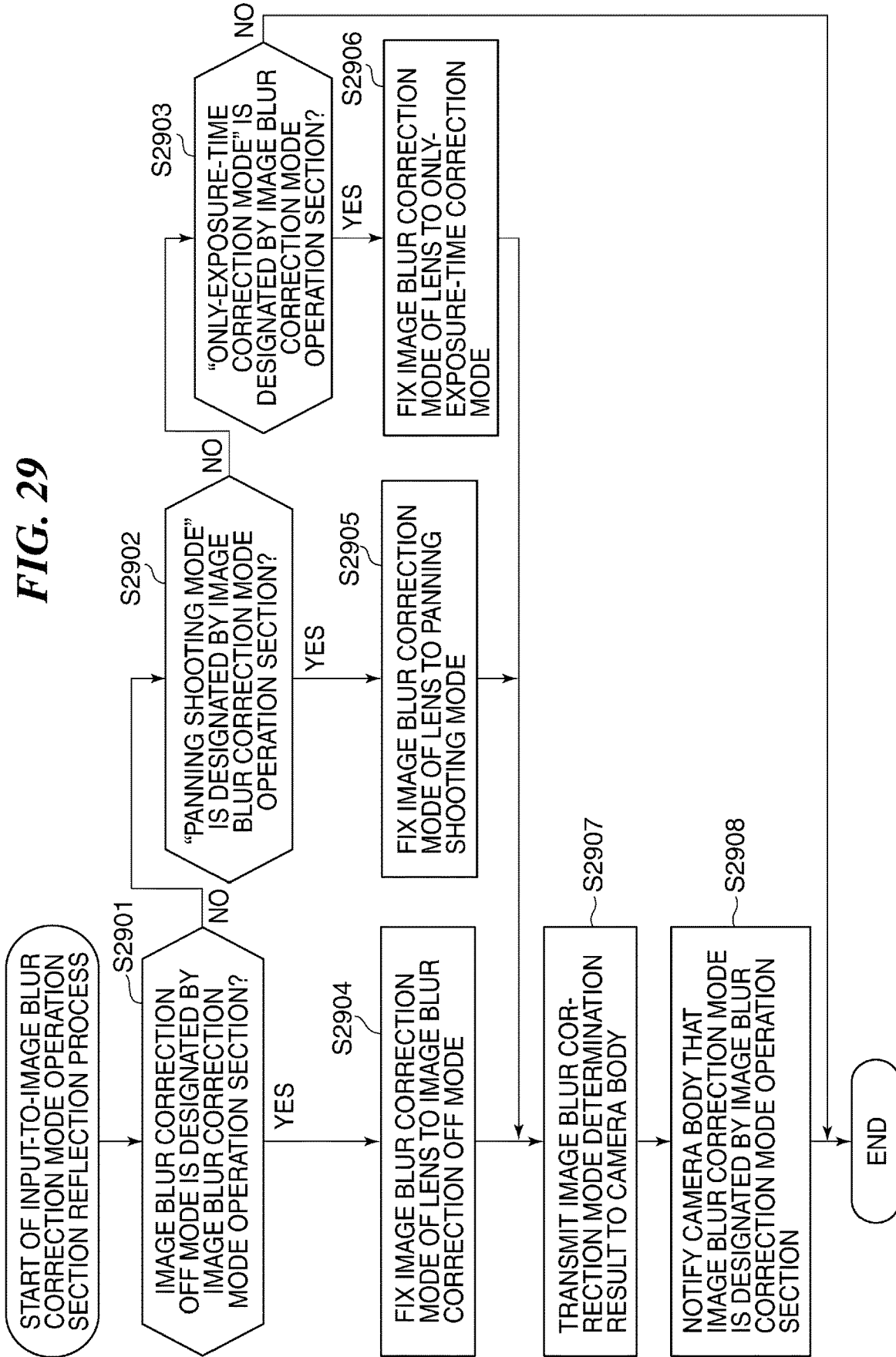
FIG. 29 is a flowchart of an input-to-image blur correction mode operation section reflection process performed in a step of the third image blur correction mode determination timer interruption process in FIGS. 28A and 28B.

FIG. 29 is a flowchart of the input-to-image blur correction mode operation section reflection process performed in the step S2801 of the third image blur correction mode determination timer interruption process in FIGS. 28A and 28B.

When the input-to-image blur correction mode operation section reflection process is started, the lens controller 203 determines whether or not the image blur correction off mode has been designated by the image blur correction mode operation section 206 (step S2901). If the image blur correction off mode has not been designated by the image blur correction mode operation section 206 (NO to the step S2901), the lens controller 203 determines whether or not the "panning shooting mode" has been designated by the image blur correction mode operation section 206 as the designated correction mode (step S2902).

If the "panning shooting mode" has not been designated (NO to the step S2902), the lens controller 203 determines whether or not the "only-exposure-time correction mode" has been designated by the image blur correction mode operation section 206 as the designated correction mode (step S2903). If the "only-exposure-time correction mode" has not been designated (NO to the step S2903), the lens controller 203 terminates the present process, determining that no image blur correction mode has been designated by the image blur correction mode operation section 206.

If the image blur correction off mode has been designated by the image blur correction mode operation section 206 (YES to the step S2901), the lens controller 203 sets the image blur correction mode determination result of the lens unit 200 to the "image blur correction off mode", and then sets the image blur correction mode of the lens driving section 204 to the "image blur correction off mode" (step S2904).

If the "panning shooting mode" has been designated (YES to the step S2902), the lens controller 203 sets the image blur correction mode determination result of the lens unit 200 to the "panning shooting mode", and then sets the image blur correction mode of the lens driving section 204 to the "panning shooting mode" (step S2905).

If the "only-exposure-time correction mode" has been designated (YES to the step S2903), the lens controller 203 sets the image blur correction mode determination result of the lens unit 200 to the "only-exposure-time correction mode", and then sets the image blur correction of the lens driving section 204 to the "only-exposure-time correction mode" (step S2906).

After execution of the step S2904, S2905, or S2906, the lens controller 203 transmits the image blur correction mode determination result obtained by the lens unit 200 to the system controller 120 (step S2907). Then, the lens controller 203 notifies the system controller 120 that the image blur correction mode of the lens unit 200 has been designated by the image blur correction mode operation section 206 (step S2908), followed by terminating the present process.

As described above, in the seventh embodiment, when the image blur correction mode is designated by the lens unit 200, the designated image blur correction mode is prioritized, and the image blur correction mode of the camera body 100 is caused to coincide with the image blur correction mode of the lens unit 200. This makes it possible to cause both the camera body 100 and the lens unit 200 to perform image blur correction in the image blur correction mode designated by the user.

Further, although in the seventh embodiment, the lens unit 200 is provided with the image blur correction mode operation section 206, the camera body 100 may be provided with an image blur correction mode operation section. In this case, when the image blur correction mode is designated by the camera body 100, the image blur correction mode designated by the camera body 100 is prioritized, and the lens controller 203 causes the image blur correction mode of the lens unit 200 to coincide with the image blur correction mode of the camera body 100.

Although in the above-described first to seventh embodiments, the description is given of electronic image blur correction in which an image is corrected, as an example of the image blur correction of the camera body, optical image blur correction for moving the image pickup device in a direction intersecting the optical axis, for example, may be performed.

Figure 30:
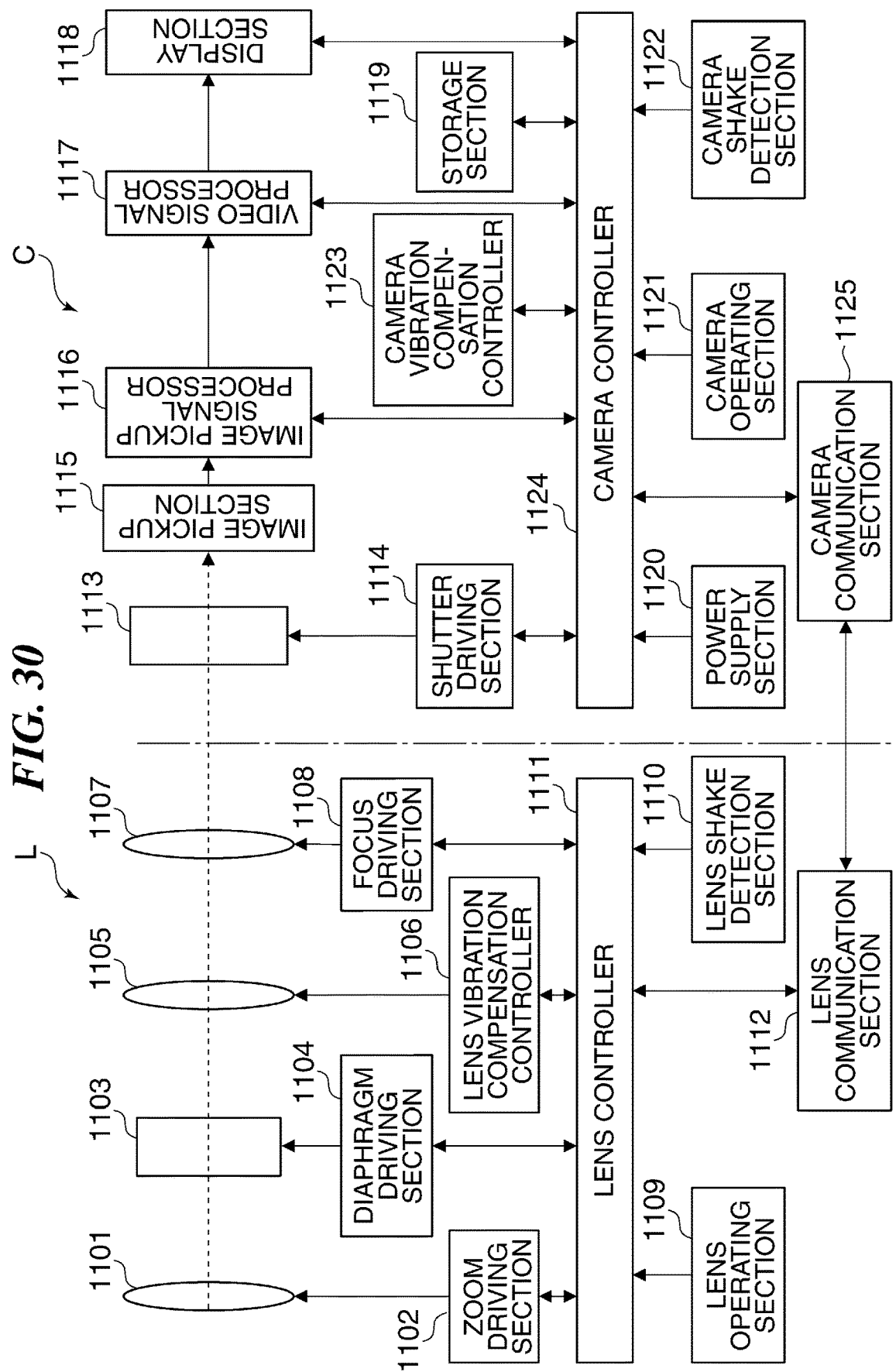
FIG. 30 is a block diagram of a digital camera system (hereinafter simply referred to as the camera) as an image pickup system according to an eighth embodiment of the present invention.

FIG. 30 is a block diagram of an image pickup system according to an eighth embodiment of the present invention.

The illustrated image pickup system is e.g. a digital camera system (hereinafter simply referred to as the camera), and is a so-called lens interchangeable camera system mainly for photographing a still image and a moving image. The illustrated image pickup system includes a lens device (hereinafter referred to as the lens unit) L, and the lens unit L is removably attached to a camera body (image pickup apparatus) C. When the lens unit L is attached to the camera body C, the lens unit L and the camera body C are enabled to communicate with each other.

The lens unit L includes a zoom driving section 1102, and the zoom driving section 1102 drives a variable power lens 1101 along the optical axis to thereby change magnification under the control of a lens controller 1111. A diaphragm 1103 adjusts the amount of light by changing the aperture diameter thereof. A diaphragm driving section 1104 drives the diaphragm 1103 under the control of the lens controller 1111. A shift lens (hereinafter referred to as the correction lens) 1105 used as a vibration compensation optical element is moved (shifted) in a direction perpendicular to (intersecting with) the optical axis to perform an optical vibration compensation operation for reducing image blur. A lens vibration compensation controller 1106 controls the driving of the correction lens 1105 for shifting, i.e. the optical vibration compensation operation, under the control of the lens controller 1111. A lens vibration compensation section is formed by the lens vibration compensation controller 1106 and the correction lens 1105.

The lens vibration compensation controller 1106 performs determination of a lens supported state. For example, the lens vibration compensation controller 1106 determines a supported state of the lens unit L based on a lens shake signal which is detected and output by a lens shake detection section 1110. More specifically, the lens vibration compensation controller 1106 determines an amplitude of vibration applied to the lens unit L based on a lens shake signal which is detected and output by the lens shake detection section 1110, and determines the supported state of the lens unit L based on the determined amplitude of vibration.

Although in the illustrated example, the lens vibration compensation controller 1106 determines the supported state of the lens unit L based on the amplitude of vibration, the supported state may be determined based on the frequency of vibration applied to the lens unit L in place of the amplitude of vibration. Further, the supported state may be determined using the amplitude and frequency of vibration.

A focus driving section 1108 drives a focus lens 1107 along the optical axis to perform focus adjustment under the control of the lens controller 1111. An image pickup optical system is formed by the variable power lens 1101, the diaphragm 1103, the correction lens 1105, and the focus lens 1107.

A lens operating section 1109 includes various switches, not shown, which are operated by the user. The lens shake detection section 1110 detects a lens shake (angular velocity), such as a hand shake, applied to the lens unit L, and outputs the lens shake signal indicative of the detected lens shake to the lens controller 1111.

The lens controller 1111 includes a CPU, etc., and controls the overall operation of the lens unit L. Further, the lens controller 1111 and a camera controller 1124 provided in the camera body C communicate with each other via a lens communication section 1112 provided in the lens unit L and a camera communication section 1125 provided in the camera body C. The lens communication section 1112 and the camera communication section 1125 each have a communication circuit that makes it possible to exchange notifications and information (data) between the lens controller 1111 and the camera controller 1124 via a plurality of communication channels.

The camera body C includes a shutter 1113 and an image pickup section 1115. A shutter driving section 1114 drives the shutter 1113 to open and close the same so as to control exposure of the image pickup section 1115 under the control of the camera controller 1124. The image pickup section 1115 includes an image pickup device, such as a CMOS sensor, and outputs electrical signals (image pickup signals) obtained by photoelectrically converting an object image (optical image) formed thereon through the image pickup optical system. An image pickup signal processor 1116 converts the image pickup signals output from the image pickup section 1115 to digital signals by analog-to-digital conversion, and performs predetermined video processing on the digital signals to thereby generate video signals. A video signal processor 1117 performs predetermined image processing on the video signals according to the use thereof.

A camera vibration compensation controller 1123 determines (controls) a cutout area (hereinafter referred to as the video cutout area) to be cut out from the video signals so as to perform an electronic vibration compensation operation. The video signal processor 1117 performs processing for cutting out a video cutout area from the whole video signals output from the image pickup signal processor 1116.

The camera vibration compensation controller 1123 performs the electronic vibration compensation operation by changing (shifting) the position of the video cutout area according to a camera shake signal or an electronic vibration compensation correction amount, described hereinafter. A camera vibration compensation section is formed by the camera vibration compensation controller 1123 and the video signal processor 1117.

The camera vibration compensation controller 1123 performs determination of a camera supported state. For example, the camera vibration compensation controller 1123 determines the supported state of the camera body C based on a camera shake signal output from a camera shake detection section 1122. More specifically, the camera vibration compensation controller 1123 obtains an amplitude of vibration applied to the camera body C based on a camera shake signal which is detected and output by the camera shake detection section 1122, and determines the supported state of the camera body C based on the determined amplitude of vibration.

Although in the illustrated example, the camera vibration compensation controller 1123 determines the supported state of the camera body C based on the amplitude of vibration, the supported state may be determined based on the frequency of vibration applied to the camera body C in place of the amplitude of vibration. Further, the supported state may be determined using the amplitude and frequency of vibration. Further, although the electronic vibration compensation operation is performed by the camera body C, the optical vibration compensation operation may be performed by shifting the image pickup device within a plane perpendicular to the optical axis direction.

A display section 1118 displays a video according to video signals output from the video signal processor 1117. Various data items, including video signals, are recorded in a storage section 1119. A power supply section 1120 supplies electric power to the camera body C and the lens unit L. A camera operating section 1121 includes various switches, not shown, operated by a user, and outputs an operation signal according to a user's operation on the camera operating section 1121 to the camera controller 1124.

The camera shake detection section 1122 detects a camera shake (angular velocity), such as a hand shake, applied to the camera body C, and outputs a camera shake signal according to the detected camera shake to the camera controller 1124. The camera controller 1124 includes a CPU, and controls the overall operation of the camera. The camera controller 1124 communicates with the lens communication section 1112 via the camera communication section 1125. That is, when the lens unit L is attached and electrically connected to the camera body C, the lens unit L and the camera body C communicates with each other via the lens communication section 1112 and the camera communication section 1125.

The above-described lens operating section 1109 has a lens vibration compensation switch, not shown, for selecting on/off of the optical vibration compensation function controlled by the lens vibration compensation controller 1106. Further, the camera operating section 1121 has a camera vibration compensation switch, not shown, for selecting on/off of the electronic vibration compensation function controlled by the camera vibration compensation controller 1123.

When the user turns on the lens vibration compensation switch, the lens controller 1111 instructs the lens vibration compensation controller 1106 to perform the vibration compensation operation. Upon receipt of this instruction, the lens vibration compensation controller 1106 controls the optical vibration compensation operation as the lens vibration compensation operation until the user turns off the lens vibration compensation switch (vibration compensation control).

Similarly, when the user turns on the camera vibration compensation switch, the camera controller 1124 instructs the camera vibration compensation controller 1123 to perform the vibration compensation operation. Upon receipt of this instruction, the camera vibration compensation controller 1123 controls the electronic vibration compensation operation as the camera vibration compensation operation until the user turns off the camera vibration compensation switch (vibration compensation control).

The camera operating section 1121 includes a vibration compensation mode selection switch, not shown, for selecting one of a first vibration compensation mode and a second vibration compensation mode for the vibration compensation control. The first vibration compensation mode is a mode for performing only the optical vibration compensation operation, and the second vibration compensation mode is a mode for performing the optical vibration compensation operation and the electronic vibration compensation operation.

In the first vibration compensation mode, a video cutout area cut out by the video signal processor 1117 is fixed to a wider area than in the second vibration compensation mode. This makes it possible to output video signals for a wide angle of view.

On the other hand, in the second vibration compensation mode, although a video cutout area cut by the video signal processor 1117 is narrower than in the first vibration compensation mode, it is possible to largely shift the video cutout area, which makes it possible to correct large image blur.

The camera operating section 1121 includes a shutter release switch, not shown, which turns on a first switch (SW1) or a second switch (SW2) according to a stroke through which the shutter release switch is pressed in. When the user presses the shutter release switch through a first stroke, the SW1 is turned on, and when the user presses the shutter release switch further through a second stroke, the SW2 is turned on.

When the SW1 is turned on, the camera controller 1124 performs the autofocus (AF) operation by causing the lens controller 1111 to drive the focus lens 1107. Further, the camera controller 1124 adjusts a light amount by causing the lens controller 1111 to drive the diaphragm 1103 based on the luminance information obtained from the video signals.

When the SW2 is turned on, the camera controller 1124 causes the image pickup section 1115 to perform photoelectric conversion of an object image, and causes the image pickup signal processor 1116 to generate video signals (video data). At this time, if the lens vibration compensation switch or the camera vibration compensation switch has been turned on, the optical vibration compensation operation or the electronic vibration compensation operation is performed as described above. Then, the generated video data is recorded in the storage section 1119.

The camera operating section 1121 includes a moving image recording switch, not shown. When the moving image recording switch is operated by the user, the camera controller 1124 starts recording of a moving image, and if the user operates the moving image recording switch again when the moving image is being recorded, the camera controller 1124 terminates recording of the moving image.

When the user operates the shutter release switch to turn on the SW1 and the SW2 during recording of the moving image, the camera controller 1124 performs processing for obtaining a still image from the moving image being recorded, and recording the obtained still image in the storage section 1119. Further, the camera operating section 1121 includes a reproduction mode selection switch, not shown, for selecting a reproduction mode. When the reproduction mode is selected by operating the reproduction mode selection switch, the camera controller 1124 stops the vibration compensation control.

Figure 31:
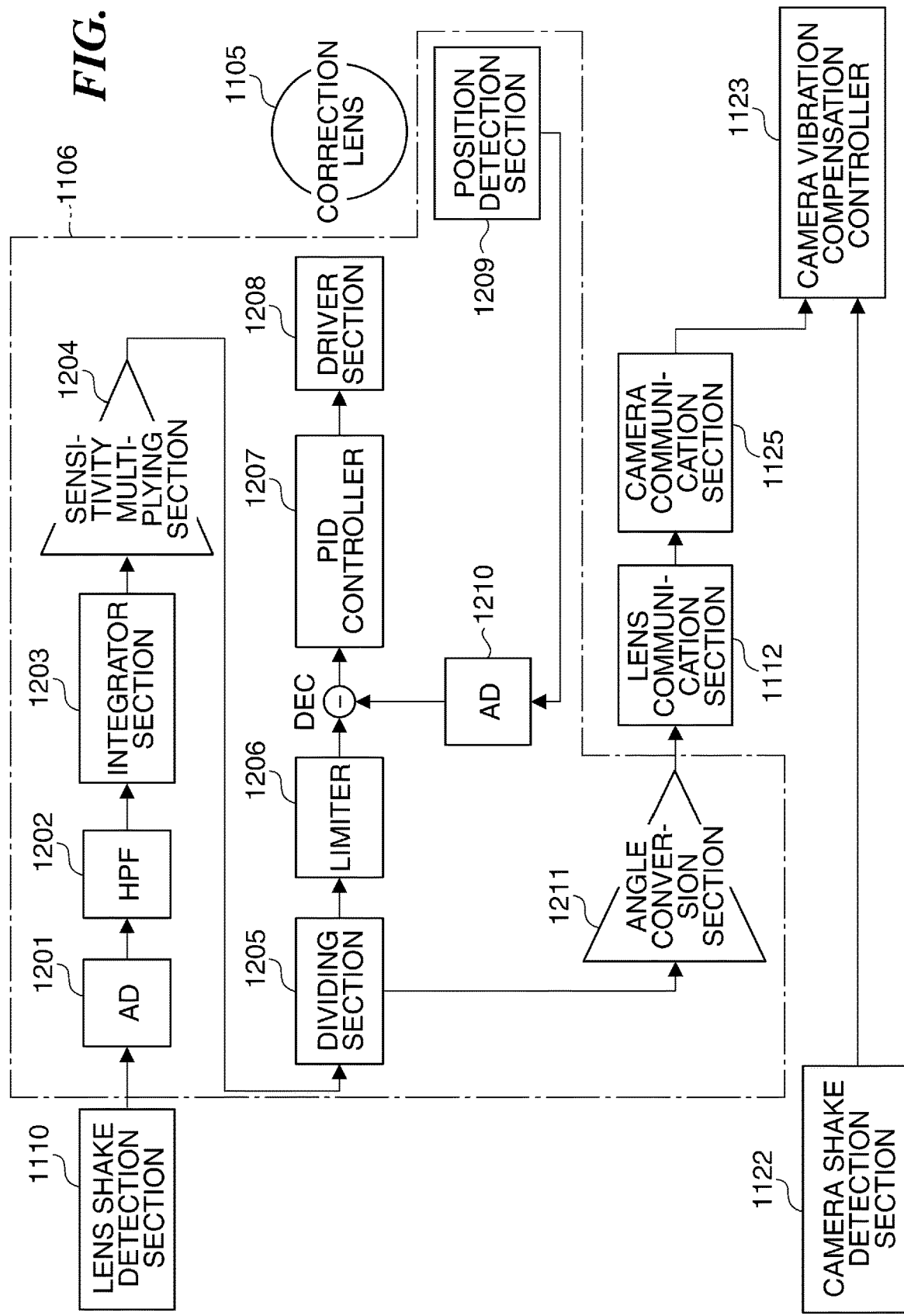
FIG. 31 is a block diagram useful in explaining components of the camera, shown in FIG. 30, which are associated with vibration compensation control.
Figure 32:
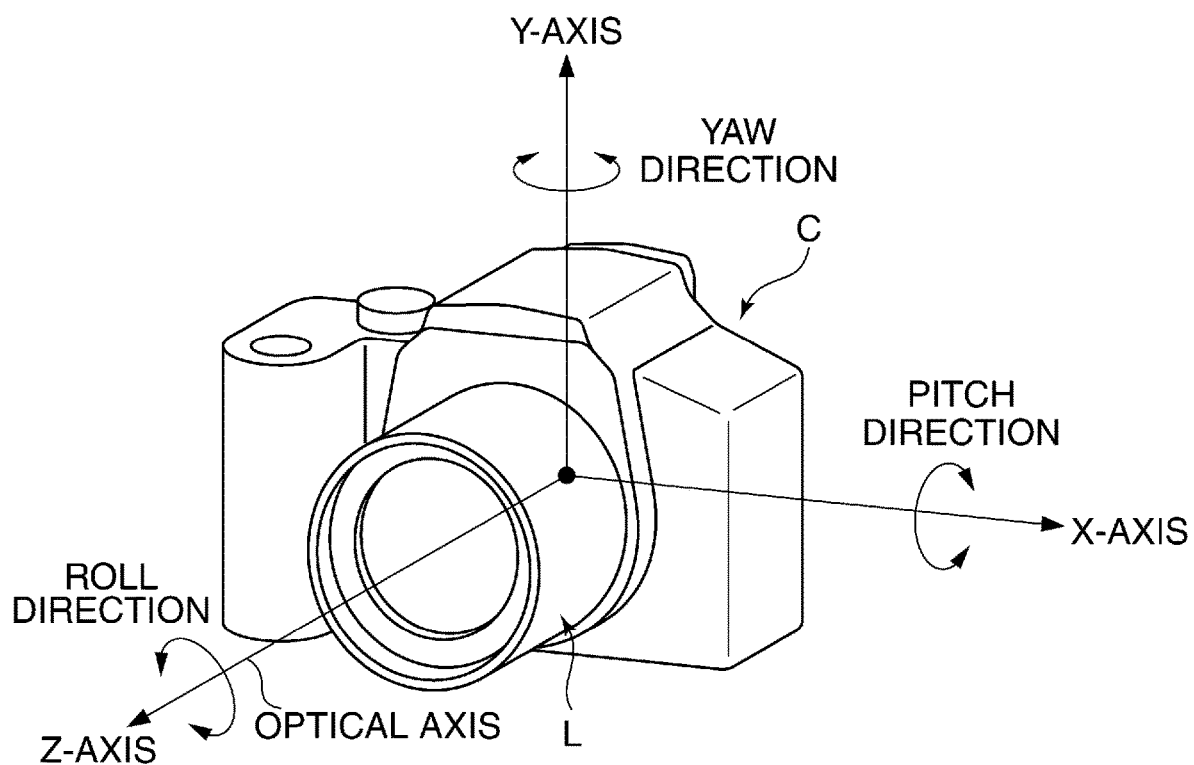
FIG. 32 is a perspective view showing a pitch direction, a yaw direction, and a roll direction of the camera shown in FIG. 30.

FIG. 31 is a block diagram useful in explaining components of the camera shown in FIG. 30, which are associated with vibration compensation control. Further, FIG. 32 is a perspective view showing the pitch direction, the yaw direction, and the roll direction of the camera shown in FIG. 30. Note that the lens controller 1111 and the camera controller 1124 are omitted from illustration in FIG. 31.

Referring to FIGS. 31 and 32, the lens shake detection section 1110 and the camera shake detection section 1122 each detect an angular velocity using a gyro sensor used as a shake sensor, and each output a shake signal indicative of a voltage corresponding to the detected angular velocity. Hereinafter, a shake signal output from the lens shake detection section 1110 is referred to as the lens shake signal, and a shake signal output from the camera shake detection section 1122 is referred to as the camera shake signal.

Note that the lens shake detection section 1110 has a pitch shake sensor and a yaw shake sensor, neither of which is shown. Further, the camera shake detection section 1122 has a pitch shake sensor, a yaw shake sensor, and a roll shake sensor, none of which are shown.

As shown in FIG. 32, in the camera body C, the optical axis of the image pickup optical system is defined as a Z-axis, and a vertical direction in the normal position of the camera body C is defined as a Y-axis. Further, a direction perpendicular to the Y-axis and the Z-axis is defined as an X-axis. In this case, the pitch direction is a direction of rotation about the X-axis (tilt direction), the yaw direction is a direction of rotation about the Y-axis (panning direction). Further, the roll direction is a direction of rotation about the Z-axis (direction of rotation within a plane on which the image pickup surface is perpendicular to the optical axis). That is, the pitch direction is a direction in which the camera is tilted in a vertical direction with respect to a horizontal plane, the yaw direction is a direction in which the camera is tilted in a horizontal direction with respect to a vertical plane, and the pitch direction and the yaw direction are perpendicular to each other.

In FIG. 31, the pitch shake sensor and the yaw shake sensor included in the lens shake detection section 1110 output a pitch shake signal corresponding to a shake in the pitch direction and a yaw shake signal corresponding to a shake in the yaw direction, respectively. These pitch shake signal and yaw shake signal are sent to an analog-to-digital converter 1201 as lens shake signals. Further, the pitch shake sensor and the yaw shake sensor included in the camera shake detection section 1122 output a pitch shake signal and a yaw shake signal, respectively. Further, the roll shake sensor outputs a roll shake signal corresponding to a shake in the roll direction. These pitch shake signal, yaw shake signal, and roll shake signal are sent to the camera vibration compensation controller 1123 as camera shake signals.

The analog-to-digital converter 1201 converts the lens shake signals from analog to digital to thereby generate angular velocity data which are digital signals. A high pass filter (HPF) 1202 outputs the angular velocity data from which offset components and temperature drift components are removed to an integrator section 1203. The integrator section 1203 integrates the angular velocity data by pseudo integration mainly using a low pass filter (LPF) to thereby convert the data into angular displacement data.

A sensitivity multiplying section 1204 converts the angular displacement data sent from the integrator section 1203 to a whole vibration compensation correction amount using a sensitivity. The sensitivity is changed according to a focal length of the image pickup optical system. Further, a correction amount dependent on sensitivity adjustment of the gyro sensor is reflected on the sensitivity, whereby variation in the sensitivity of the gyro sensor is accommodated.

A dividing section 1205 divides the whole vibration compensation correction amount output from the sensitivity multiplying section 1204 into an optical vibration compensation correction amount which is a correction amount for the optical vibration compensation operation, and an electronic vibration compensation correction amount which is a correction amount for the electronic vibration compensation operation. More specifically, the dividing section 1205 multiplies the vibration compensation correction amount by a coefficient K to calculate the optical vibration compensation correction amount. The coefficient K is determined by using the following equation (1) using an optical vibration compensation available range within which optical vibration compensation can be performed (maximum range of shifting of the correction lens 1105) A and an electronic vibration compensation available range within which electronic vibration compensation can be performed (maximum range of shifting of the video cutout area) B for each focal length of the image pickup optical system:

$$K = A/(A+B) \tag{1}$$

As is clear from the equation (1), the coefficient K represents a value not larger than 1. That is, by multiplying the whole vibration compensation correction amount by the coefficient K, the optical vibration compensation correction amount (first correction amount) as part of the whole vibration compensation correction amount is calculated.

A limiter 1206 limits (cramps) the optical vibration compensation correction amount according to the movable range of the correction lens 1105. This makes it possible to prevent the correction lens 1105 from remaining in a state having reached the end of the movable range.

The output from the limiter 1206 is input to a subtraction section DEC. Then, the subtraction section DEC performs subtraction between the output from the limiter 1206 and the output from an analog-to-digital converter 1210, described hereinafter. The output from the subtraction section DEC is sent to a PID controller 1207.

The PID controller 1207 controls the position of the correction lens 1105 according to the output from the subtraction section DEC. This position control is performed by PID control in which P (proportional) control, I (integral) control, and D (derivative) control are combined. A driver section 1208 supplies electric current for driving the correction lens 1105 to a vibration compensation actuator (voice coil motor or the like: not shown) provided in the driver section 1208 according to a control signal sent from the PID controller 1207, which is dependent on the optical vibration compensation correction amount.

A position detection section 1209 detects the position of the correction lens 1105, and outputs a position detection signal indicative of a voltage corresponding to the detected position. The analog-to-digital converter 1210 converts the position detection signal output from the position detection section 1209 to position detection data as a digital signal, by analog-to-digital conversion, and outputs the position detection data to the subtraction section DEC. The subtraction section DEC calculates a difference (deviation) between the output from the limiter 1206 and the output from the analog-to-digital converter 1210, and outputs the calculated deviation to the PID controller 1207. With this, feedback position control for controlling the position of the correction lens 1105 is performed.

On the other hand, the dividing section 1205 multiplies the whole vibration compensation correction amount output from the sensitivity multiplying section 1204 by a coefficient "1−K" to calculate the electronic vibration compensation correction amount to be given from the lens unit L to the camera body C (lens electronic vibration compensation correction amount). As described above, while the optical vibration compensation correction amount is calculated by multiplication using the coefficient K, the electronic vibration compensation correction amount is calculated by multiplication using the coefficient "1−K".

An angle conversion section 1211 converts the electronic vibration compensation correction amount (second correction amount) to angular displacement data. A conversion coefficient used at this time is different for each focal length of the image pickup optical system, and is changed whenever there is a change in the focal length. The angular displacement data after conversion is sent (i.e. transmitted) as the lens electronic vibration compensation correction amount (vibration compensation information) to the camera vibration compensation controller 1123 via the lens communication section 1112 and the camera communication section 1125.

The camera vibration compensation controller 1123 performs the electronic vibration compensation control based on the lens electronic vibration compensation correction amount and the camera electronic vibration compensation correction amount calculated based on the camera shake signal.

Figure 33A:
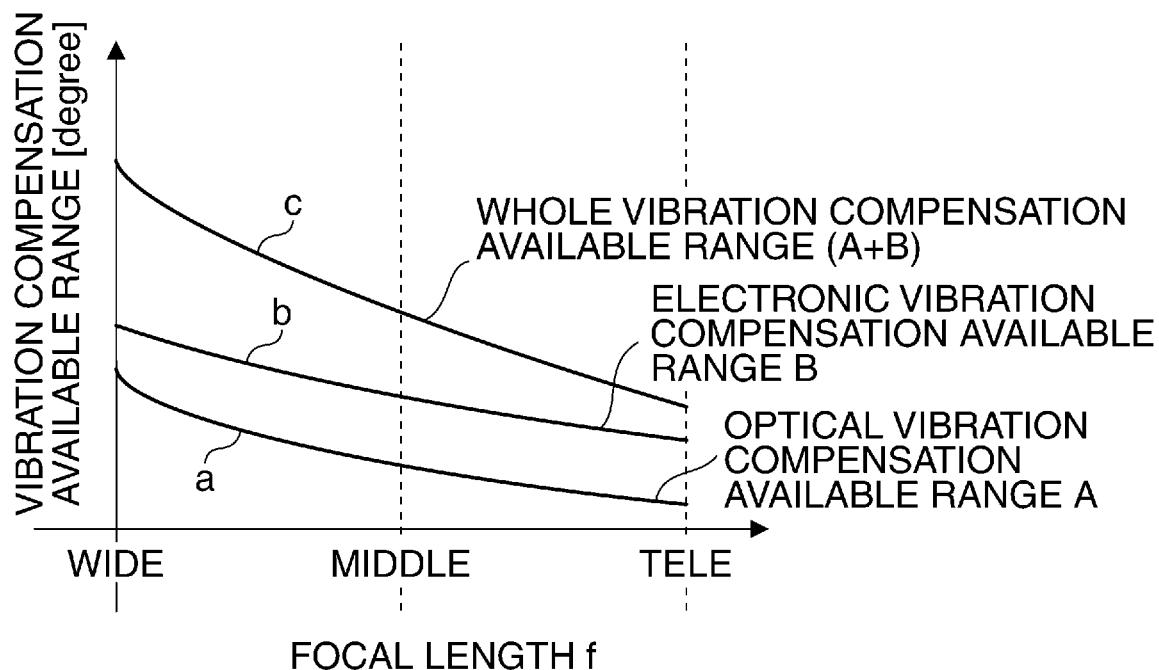
FIGS. 33A and 33B are diagrams useful in explaining optical vibration compensation and electronic vibration compensation performed by the camera shown in FIG. 30.
Figure 33B:
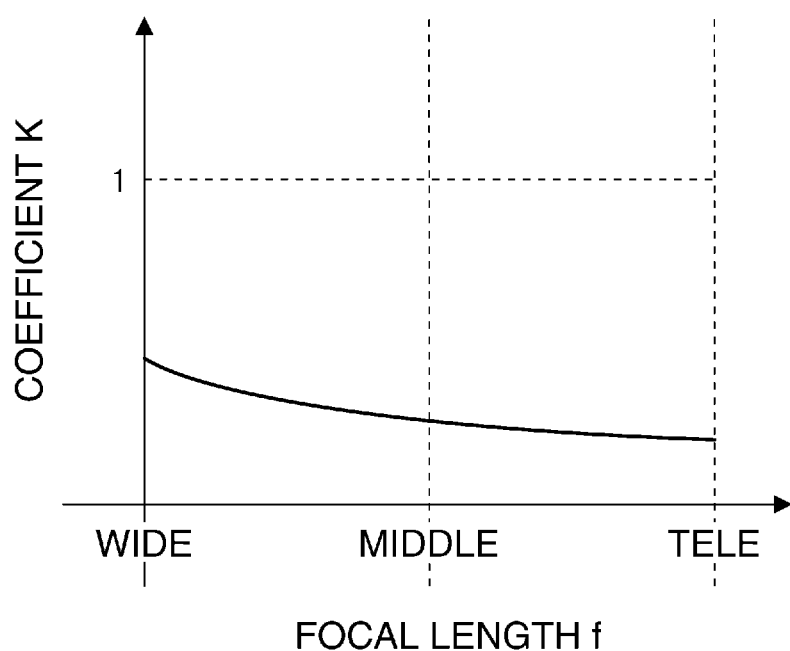

FIGS. 33A and 33B are diagrams useful in explaining the optical vibration compensation operation and the electronic vibration compensation operation, performed by the camera shown in FIG. 30. FIG. 33A shows a relationship between the focal length of the image pickup system, and the optical vibration compensation available range and the electronic vibration compensation available range, and FIG. 33B shows a relationship between the focal length and the coefficient K.

Referring to FIG. 33A, a horizontal axis represents the focal length (zoom position) f, and a vertical axis represents the vibration compensation available range (in units of degrees). Further, curves a and b represent the optical vibration compensation available range A and the electronic vibration compensation available range B, respectively.

The optical vibration compensation available range A is determined by optical characteristics (a focal length, a resolution, a peripheral light amount, and so forth) of the image pickup optical system, and the electronic vibration compensation available range B is determined by a surplus video area other than the video cutout area of the video signals. Further, the optical vibration compensation available range A and the electronic vibration compensation available range B both vary with the zoom position.

More specifically, even when the lens shake amount and the camera shake amount are of the same magnitude, if the image pickup optical system is at a wide-angle end (Wide), a shift amount (i.e. the optical vibration compensation available range A) by which the correction lens 1105 is to be driven for the optical vibration compensation operation is smaller than a shift amount by which the correction lens 1105 is to be driven when the image pickup optical system is at a telephoto end (Tele). For this reason, the electronic vibration compensation available range B varies with the shift amount. Note that in the vibration compensation control, the optical vibration compensation available range A and the electronic vibration compensation available range B are both managed as the angular displacement amount data.

The optical vibration compensation operation is performed by shifting the correction lens 1105 within the optical vibration compensation available range A, and the electronic vibration compensation operation is performed by shifting the position of the video cutout area within the electronic vibration compensation available range B. By combining the optical vibration compensation operation and the electronic vibration compensation operation, the whole vibration compensation available range (A+B), indicated by a curve c, is obtained.

In FIG. 33A, the optical vibration compensation available range A at the wide-angle end (Wide), an intermediate zoom position (Middle), and the telephoto end (Tele) is at 2, 0.75, and 0.3 degrees, respectively, and the electronic vibration compensation available range B is at 2.5, 1.6, and 1.1 degrees, respectively.

Referring to FIG. 33B, a horizontal axis represents the focal length f, and a vertical axis represents the coefficient K. The coefficient K is determined by the optical vibration compensation available range A and the electronic vibration compensation available range B. The coefficient K applied to the illustrated example in FIG. 33A is equal to 0.444, 0.319, and 0.214, at the wide-angle end, the intermediate zoom position, and the telephoto end, respectively. In the second vibration compensation mode for performing the optical vibration compensation operation and the electronic vibration compensation operation, the correction lens 1105 is driven with the optical vibration compensation correction amount determined using the coefficient K=A/(A+B), and the position of the video cutout area is changed with the electronic vibration compensation correction amount determined using the coefficient "1−K".

By performing the optical vibration compensation operation and the electronic vibration compensation operation in combination, a boundary between the optical vibration compensation available range A and the electronic vibration compensation available range B is eliminated. As a result, it is possible to suppress an image from being disturbed due to overshooting of the optical vibration compensation operation.

On the other hand, in the first vibration compensation mode for performing only the optical vibration compensation operation, the coefficient K for the optical vibration compensation operation is set to 1, whereby the coefficient "1−K" for the electronic vibration compensation operation is set to 0. With this, the correction lens 1105 is driven using the whole vibration compensation correction amount as the optical vibration compensation correction amount.

Here, photographing of a still image in the second vibration compensation mode will be described.

When the SW2 is turned on by operating the shutter release switch provided on the camera operating section 1121, the camera controller 1124 starts the exposure operation for photographing a still image. In doing this, the dividing section 1205 sets the coefficient K for the optical vibration compensation operation to 1, and sets the coefficient "1−K" for the electronic vibration compensation operation to 0. With this, the optical vibration compensation operation using the whole vibration compensation correction amount as the optical vibration compensation correction amount is performed, as mentioned above.

When the exposure operation is terminated, the dividing section 1205 sets the coefficient K=A/(A+B) for the optical vibration compensation operation, and sets the coefficient "1−K" for the electronic vibration compensation operation. Note that at the start and the end of the exposure operation, to avoid a sudden change in the optical vibration compensation correction amount due to interruption and restart of the electronic vibration compensation operation, processing for gradually changing the optical vibration compensation correction amount and the electronic vibration compensation correction amount is performed over a predetermined time period.

Figure 34:
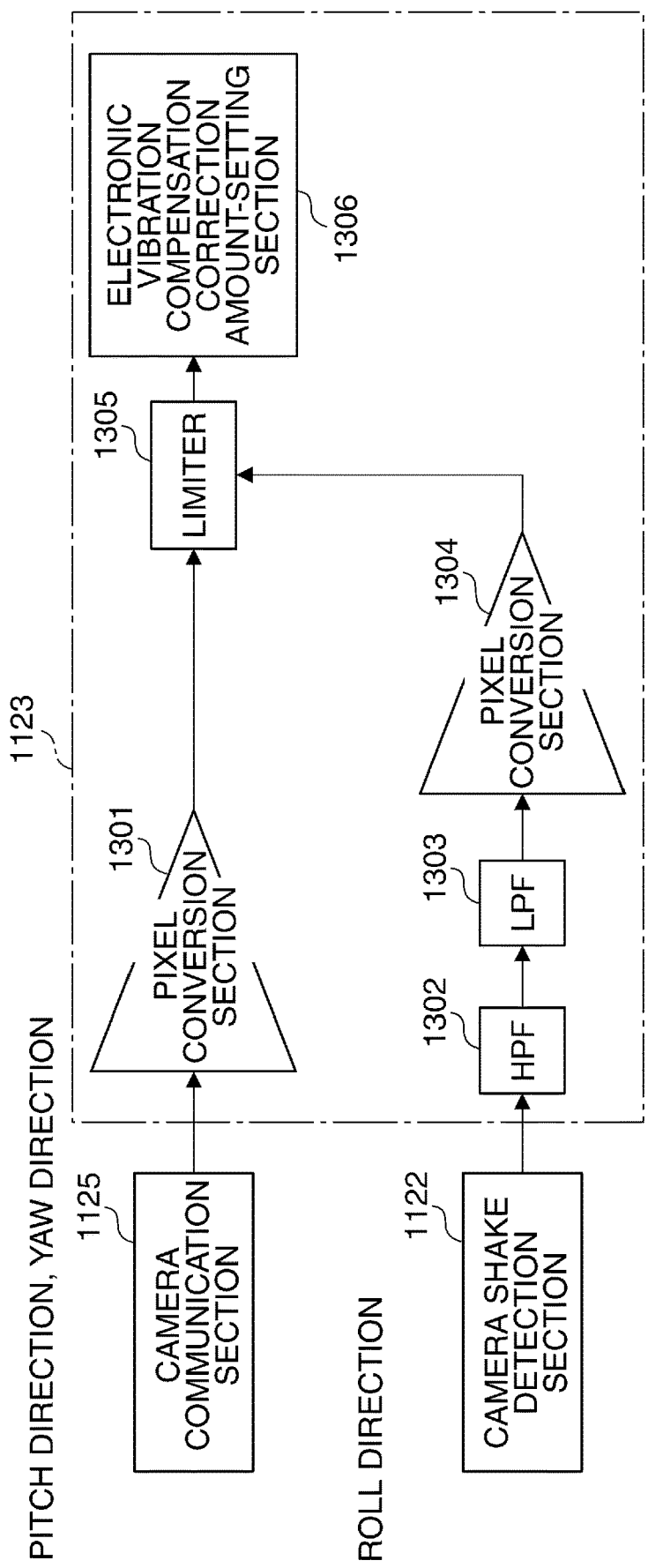
FIG. 34 is a block diagram of a camera vibration compensation controller appearing in FIG. 30.

FIG. 34 is a block diagram of the camera vibration compensation controller appearing in FIG. 30. Note that in FIG. 34, the camera controller 1124 arranged between the camera shake detection section 1122 and the camera communication section 1125, and the camera vibration compensation controller 1123 is omitted.

The camera communication section 1125 receives correction amounts in the pitch direction and the yaw direction (angular displacement conversion values) indicative of the electronic vibration compensation correction amount (lens electronic vibration compensation correction amount) from the lens controller 1111 via the lens communication section 1112. A pixel conversion section 1301 converts the lens electronic vibration compensation correction amount to a correction amount corresponding to the number of pixels (pixel number conversion correction amount), and outputs the pixel number conversion correction amount to a limiter 1305. Note that a conversion coefficient used when converting the lens electronic vibration compensation correction amount to the pixel number conversion correction amount is different for each focal length of the image pickup optical system, and is changed whenever the focal length is changed.

A high pass filter (HPF) 1302 receives a roll shake signal from the roll shake sensor provided in the camera shake detection section 1122. The high pass filter 1302 removes the offset and drift components from the roll shake signal. Further, a low pass filter (LPF) 1303 eliminates high-frequency noise from the roll shake signal. Similar to the pixel conversion section 1301, a pixel conversion section 1304 converts the roll shake signal to a pixel number conversion correction amount and outputs the pixel number conversion correction amount to the limiter 1305.

The limiter 1305 limits (cramps) the pixel number conversion correction amounts output from the pixel conversion sections 1301 and 1304 with the number of pixels corresponding to the electronic vibration compensation available range B. That is, the limiter 1305 sets a limit level with respect to each of the three correction axial directions of the pitch direction, the yaw direction, and the roll direction. Then, the limiter 1305 sends correction amounts thus limited so as not to exceed the limit level to an electronic vibration compensation correction amount-setting section 1306. The electronic vibration compensation correction amount-setting section 1306 sets the electronic vibration compensation correction amount for each correction axial direction.

Figure 35:
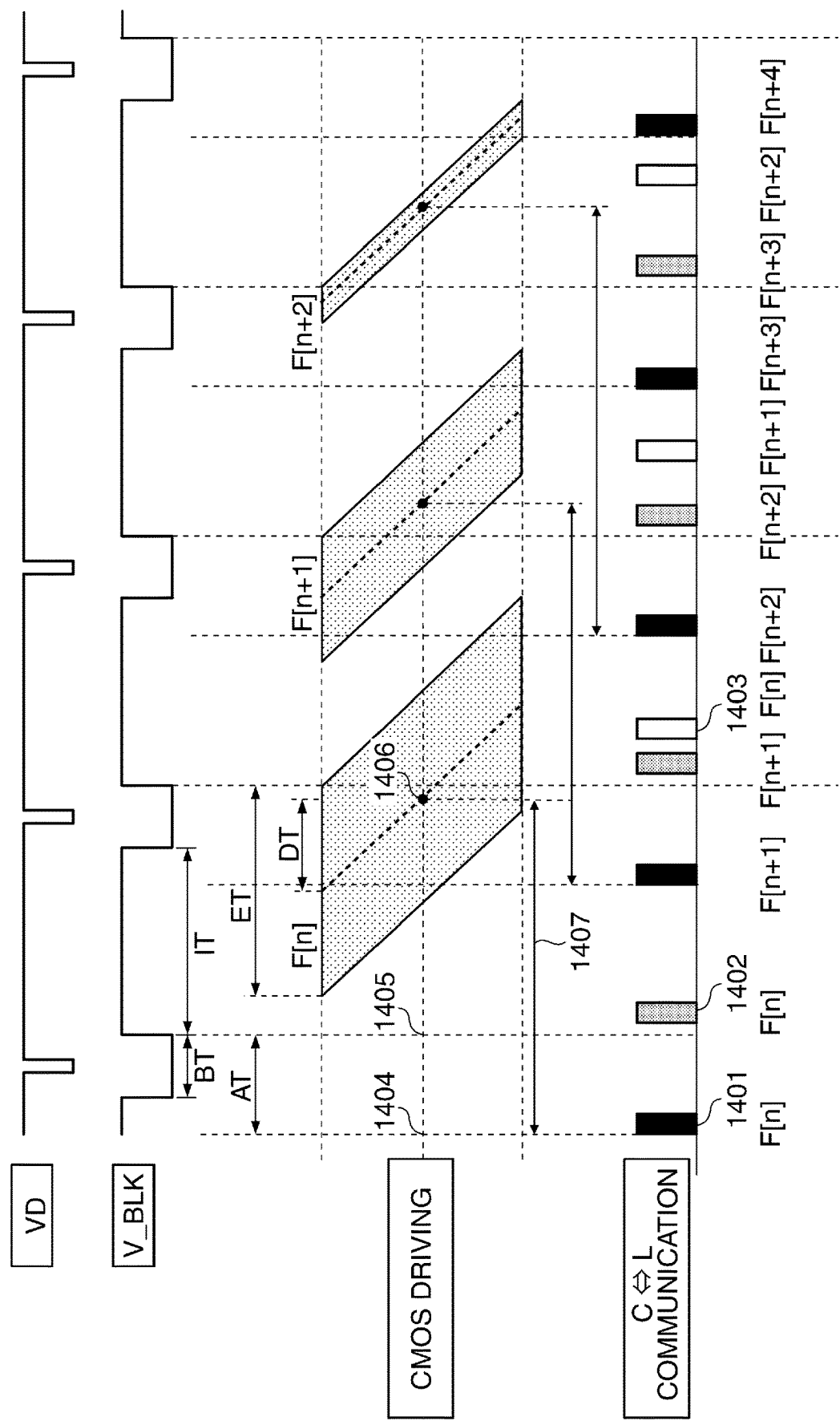
FIG. 35 is a diagram showing communication between a camera controller and a lens controller, appearing in FIG. 30, and timings of the communication.

FIG. 35 is a diagram showing communication between the camera controller and the lens controller, appearing in FIG. 30, and timings of the communication.

To perform the optical vibration compensation operation and the electronic vibration compensation operation, the camera controller 1124 is required to notify the lens controller 1111 of an exposure barycenter timing 1406 which is a timing of the barycenter of an exposure amount (exposure barycenter) in the image pickup section 1115. However, the communication between the camera controller 1124 and the lens controller 1111 includes not only the communication concerning the vibration compensation operation, but also a lot of communications for AF (autofocus), AE (auto exposure), and so forth. If the accurate exposure barycenter timing 1406 cannot be notified due to variation in communication timing caused by overlapping of the communication concerning the vibration compensation operation with other communications, there is a possibility that the vibration compensation control is not properly performed.

To prevent this, in the illustrated example, to avoid deviation of the timing (communication timing deviation) at which the exposure barycenter timing 1406 is notified from the camera controller 1124 to the lens controller 1111, communication processing is performed by dividing the same into communication for notifying reference timing and communication for notifying a relative time period.

Further, if a large amount of communication information is exchanged between the camera controller 1124 and the lens controller 1111, it is difficult to complete the vibration compensation control within a specified time period. Further, in order to be compatible with various lens units, it is required that the vibration compensation control can be performed regardless of the specifications of each lens unit. To this end, in the present embodiment, the lens unit L (lens controller 1111) performs the optical vibration compensation control of the lens unit L, and supplies information (lens electronic vibration compensation correction amount, referred to hereinafter) for use in the electronic vibration compensation control of the camera body C.

Referring to FIG. 35, VD represents a vertical synchronization signal, and V_BLK represents a vertical blanking signal. "CMOS driving" indicates a driving state of the image pickup device, and communication between the camera body C and the lens unit L is indicated in the lowest row. Further, F[n] represents an n-th frame (n represents an integer not less than 1) as a photographed image frame (hereinafter simply referred to as the frame).

Times shown in FIG. 35 are as follows. BT: a vertical blanking period; IT: an imaging time period; AT: a time period from a communication timing 1404 of a first communication 1401 to a timing 1405 at which the exposure time is determined; ET: exposure time; and DT: delay time from the center of the exposure time ET to the exposure barycenter timing 1406.

The exposure barycenter timing 1406 determined with reference to the timing 1405 is calculated by IT+BT−ET/2+DT based on the center of the exposure time ET.

Note that a parallelogram in each frame represents an exposure amount, and as the exposure amount is smaller, the area of the parallelogram is smaller. Further, the timing of the barycenter of the parallelogram is the exposure barycenter timing 1406. Readout of signals from the image pickup device is started at a time point at which the exposure time ET elapses (which corresponds to an upper right vertex of the parallelogram) from a time point of the start of exposure (which corresponds to an upper left vertex of the parallelogram).

The first communication 1401 from the camera controller 1124 to the lens controller 1111 is performed at the timing 1404, using the vertical synchronization signal (VD) to the image pickup section 1115 as a trigger. In the first communication 1401, the timing with reference to which the lens controller 1111 determines the exposure barycenter timing 1406 is notified to the lens controller 1111. More specifically, at the timing of the first communication 1401, the lens controller 1111 acquires the time (timer time) counted by an internal timer as the reference timing for determining the exposure barycenter timing 1406.

Note that the timing at which the first communication 1401 is performed may be the same timing as that of the vertical synchronization signal, or may be before or after that of the vertical synchronization signal. However, in the latter case, the first communication 1401 is caused to be performed with a fixed time difference from the vertical synchronization signal for each frame. Further, the first communication timing 1404 is set so as not to overlap the other communications. In the illustrated example in FIG. 35, the first communication timing 1404 is set to a time point before (prior to) the vertical synchronization signal.

Then, the camera controller 1124 performs the second communication 1402 with the lens controller 1111. In the second communication 1402, information indicative of the relative time period, denoted by reference numeral 1407, to elapse from the first communication timing 1404, and information indicative of the electronic vibration compensation available range B at the current focal length are transmitted to the lens controller 1111.

The timing at which the second communication 1402 is performed (second communication timing) is after the timing 1405 of determination of the exposure time of a frame of which the exposure barycenter is to be transmitted from the camera controller 1124 to the lens controller 1111. With this, even in a case where the exposure time is changed for each frame, it is possible to cause the lens controller 1111 to determine the accurate exposure barycenter timing 1406.

The camera controller 1124 determines the exposure barycenter timing 1406 based on the determined exposure time and time taken to read out signals from the image pickup device (signal readout time). Then, the camera controller 1124 calculates the relative time period 1407 from the first communication timing (reference timing) 1404 with reference to which the lens controller 1111 determines the exposure barycenter timing 1406. That is, the relative time period 1407 is calculated by AT+IT+BT−ET/2+DT. Note that the timing 1405 of determination of the exposure time of each frame is not fixed.

The lens controller 1111 receives information indicative of the relative time period 1407 from the camera controller 1124 through the second communication 1402. This enables the lens controller 1111 to determine the exposure barycenter timing 1406 corresponding to the time point at which the relative time period 1407 elapses from the reference timing acquired through the first communication 1401.

Further, the lens controller 1111 receives information indicative of the electronic vibration compensation available range B through the second communication 1402, and calculates the optical vibration compensation available range A in the lens unit L and the coefficient K used by the dividing section 1205. The lens controller 1111 takes in the lens shake signals from the lens shake detection section 1110 at the exposure barycenter timing 1406. Further, the dividing section 1205 divides the whole vibration compensation correction amount into the optical vibration compensation correction amount and the lens electronic vibration compensation correction amount. Then, the lens controller 1111 holds the divided lens electronic vibration compensation correction amount in an internal memory until a communication request is received from the camera controller 1124.

After that, the camera controller 1124 performs third communication 1403 with the lens controller 1111. In the third communication 1403, upon receipt of the communication request from the camera controller 1124, the lens controller 1111 transmits the lens electronic vibration compensation correction amount held in the internal memory to the camera controller 1124.

The timing at which the third communication 1403 is performed (third communication timing) is after the exposure barycenter timing 1406. At this time, since the camera controller 1124 has already determined the exposure barycenter timing 1406, the third communication 1403 is performed at a desired timing after the exposure barycenter timing 1406.

The camera controller 1124 sends the lens electronic vibration compensation correction amount received from the lens controller 1111 to the camera vibration compensation controller 1123. In the camera vibration compensation controller 1123, the electronic vibration compensation correction amount-setting section 1306 sets the electronic vibration compensation correction amount using the pixel number conversion correction amounts determined based on the lens electronic vibration compensation correction amounts (in the pitch and yaw directions) and the camera electronic vibration compensation correction amount (in the roll direction), respectively.

The camera controller 1124 performs the first to third communications 1401 to 1403 for each frame, and transmits the reference timing to the lens controller 1111 through the first communication 1401 as described above. Then, the camera controller 1124 notifies the lens controller 1111 of the relative time period 1407 from the reference timing and the electronic vibration compensation available range B through the second communication 1402. Further, the camera controller 1124 acquires the lens electronic vibration compensation correction amount from the lens controller 1111 through the third communication 1403.

On the other hand, for each frame, the lens controller 1111 acquires the above-mentioned reference timing through the first communication 1401, and receives the relative time period 1407 from the reference timing through the second communication 1402, thereby determining the exposure barycenter timing 1406. Further, the lens controller 1111 acquires the electronic vibration compensation available range B through the second communication 1402. Then, the lens controller 1111 notifies the camera controller 1124 of the lens electronic vibration compensation correction amount divided from the whole vibration compensation correction amount acquired at the exposure barycenter timing 1406, through the third communication 1403.

Figure 36:
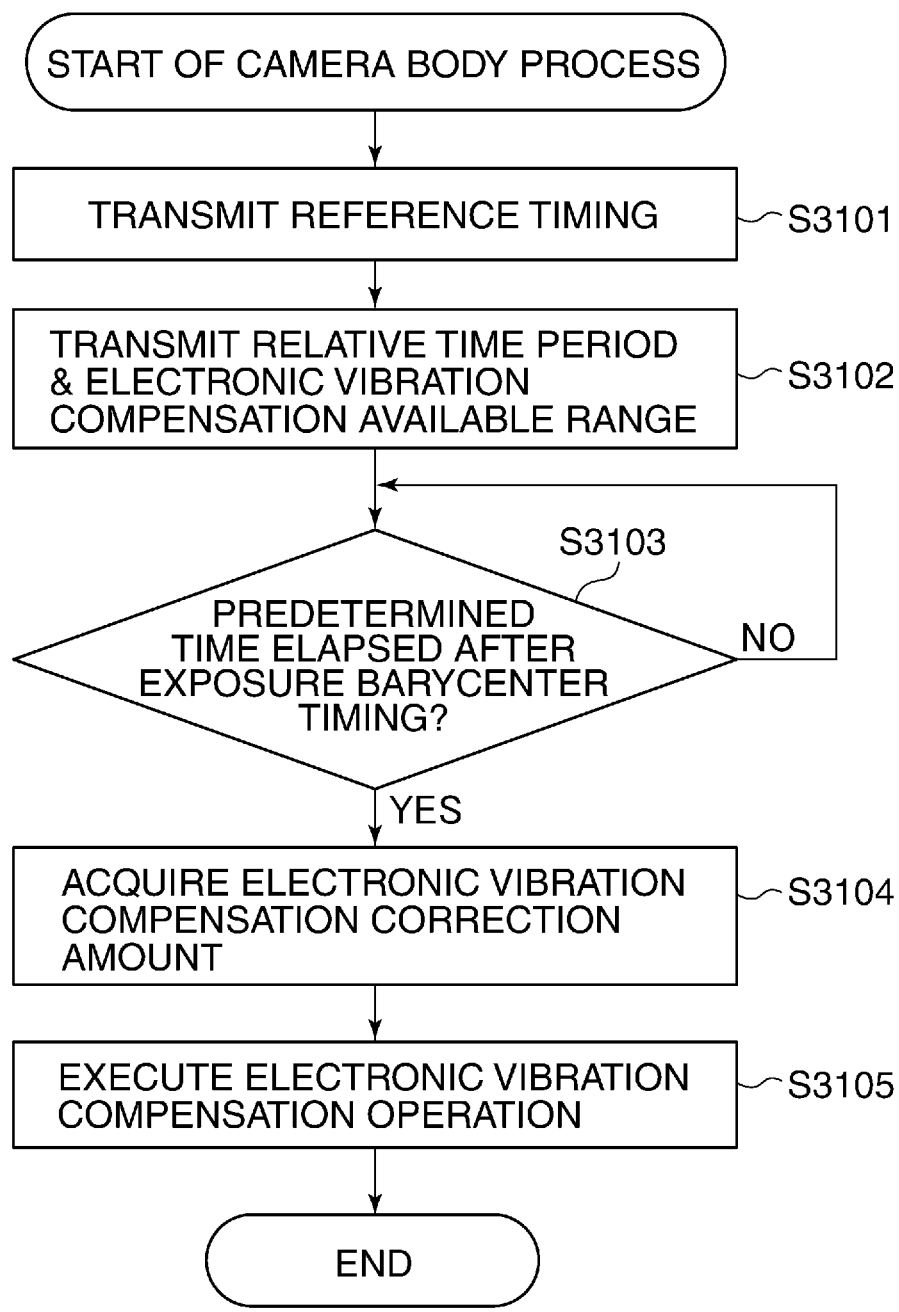
FIG. 36 is a flowchart of a camera body process performed by a camera body appearing in FIG. 30.

FIG. 36 is a flowchart of a camera body process performed by the camera body 100 appearing in FIG. 30. The camera body process in FIG. 36 is performed under the control of the camera controller 1124.

Referring to FIG. 36, the camera controller 1124 performs the first communication 1401 at the first communication timing 1404 to transmit the reference timing associated with the exposure barycenter timing 1406 to the lens controller 1111 (step S3101). Then, the camera controller 1124 performs the second communication 1402 with the lens controller 1111 to transmit the relative time period 1407 from the reference timing. Further, the camera controller 1124 transmits the information indicative of the electronic vibration compensation available range B at the current focal length to the lens controller 1111 through the second communication 1402 (step S3102).

Next, the camera controller 1124 determines whether or not a predetermined time period (fixed time period) has elapsed from the exposure barycenter timing 1406 (step S3103). If the predetermined time period has not elapsed (NO to the step S3103), the camera controller 1124 waits. Here, the camera controller 1124 waits until the lens controller 1111 completes the processing for calculating the lens electronic vibration compensation correction amount from the whole vibration compensation correction amount acquired at the exposure barycenter timing 1406. Then, at the timing of completion of calculation of the lens electronic vibration compensation correction amount by the lens controller 1111, the camera controller 1124 requests the lens controller 1111 to transmit the lens electronic vibration compensation correction amount, as described hereinafter.

If the predetermined time period has elapsed (YES to the step S3103), the camera controller 1124 performs the third communication 1403 with the lens controller 1111 to acquire the lens electronic vibration compensation correction amount calculated by the lens controller 1111 at the exposure barycenter timing 1406 (step S3104). After that, the camera controller 1124 causes the camera vibration compensation controller 1123 to perform the electronic vibration compensation operation according to the lens electronic vibration compensation correction amount acquired in the step S3104 (step S3105), followed by terminating the present process.

Figure 37:
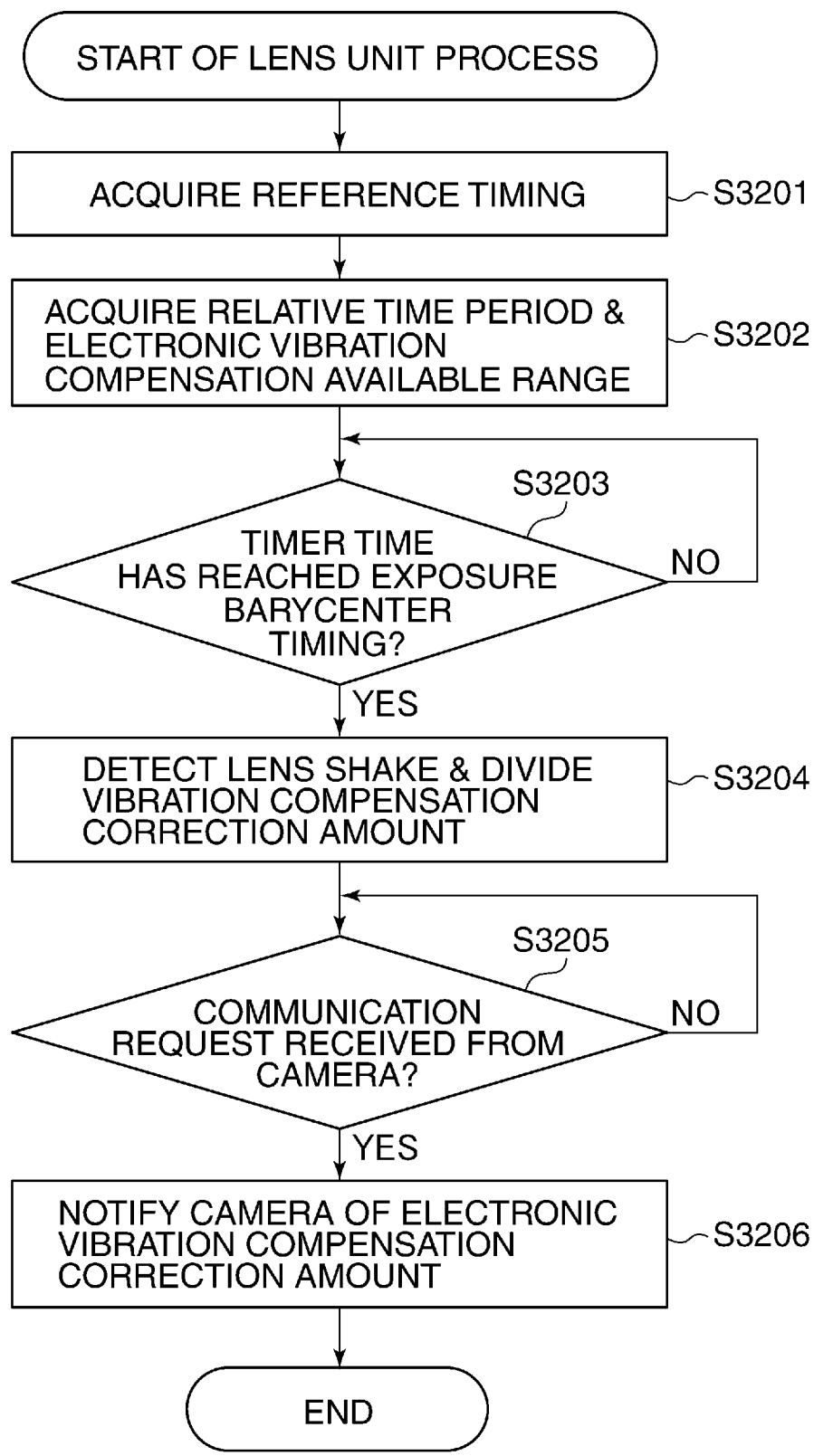
FIG. 37 is a flowchart of a lens unit process performed by a lens unit appearing in FIG. 30.

FIG. 37 is a flowchart of a lens unit process performed by the lens unit 200 appearing in FIG. 30. The lens unit process in FIG. 37 is performed under the control of the lens controller 1111.

Through the first communication 1401 from the camera controller 1124, the lens controller 1111 acquires the timer time at the first communication timing 1404 as the reference timing associated with the exposure barycenter timing 1406 (step S3201).

Through the second communication 1402 from the camera controller 1124, the lens controller 1111 acquires the relative time period 1407 from the reference timing. At this time, the lens controller 1111 determines the exposure barycenter timing 1406 based on the reference timing and the relative time period 1407, and sends the exposure barycenter timing 1406 to the lens vibration compensation controller 1106. Further, the lens controller 1111 acquires the information indicative of the electronic vibration compensation available range B through the second communication 1402 (step S3202). The lens controller 1111 causes the lens vibration compensation controller 1106 to calculate the coefficient K used by the dividing section 1205 based on the electronic vibration compensation available range B and the optical vibration compensation available range A of the lens unit L. Further, the lens controller 1111 causes the lens vibration compensation controller 1106 to calculate the optical vibration compensation correction amount and the lens electronic vibration compensation correction amount using the coefficient K.

Then, the lens controller 1111 determines whether or not the timer time has reached the exposure barycenter timing 1406 (step S3203). If the timer time has not reached the exposure barycenter timing 1406 (NO to the step S3203), the lens controller 1111 waits.

On the other hand, if the timer time has reached the exposure barycenter timing 1406 (YES to the step S3203), the lens controller 1111 receives the lens shake signals from the lens shake detection section 1110 at the exposure barycenter timing 1406. Then, the lens controller 1111 causes the lens vibration compensation controller 1106 to calculate the whole vibration compensation correction amount based on the lens shake signals, and divide the whole vibration compensation correction amount into the optical vibration compensation correction amount and the electronic vibration compensation correction amount (lens electronic vibration compensation correction amount) using the coefficient K (step S3204). The lens controller 1111 temporarily stores the lens electronic vibration compensation correction amount in the internal memory until a communication request is received from the camera controller 1124.

The lens controller 1111 determines whether or not the communication request of the third communication 1403 has been received from the camera controller 1124 (step S3205). If the communication request of the third communication 1403 has not been received (NO to the step S3205), the lens controller 1111 waits.

On the other hand, if the communication request of the third communication 1403 has been received (YES to the step S3205), the lens controller 1111 transmits, through the third communication 1403, the lens electronic vibration compensation correction amount held in the internal memory in the step S3204 to the camera controller 1124 (step S3206), followed by terminating the present process.

Figure 38:
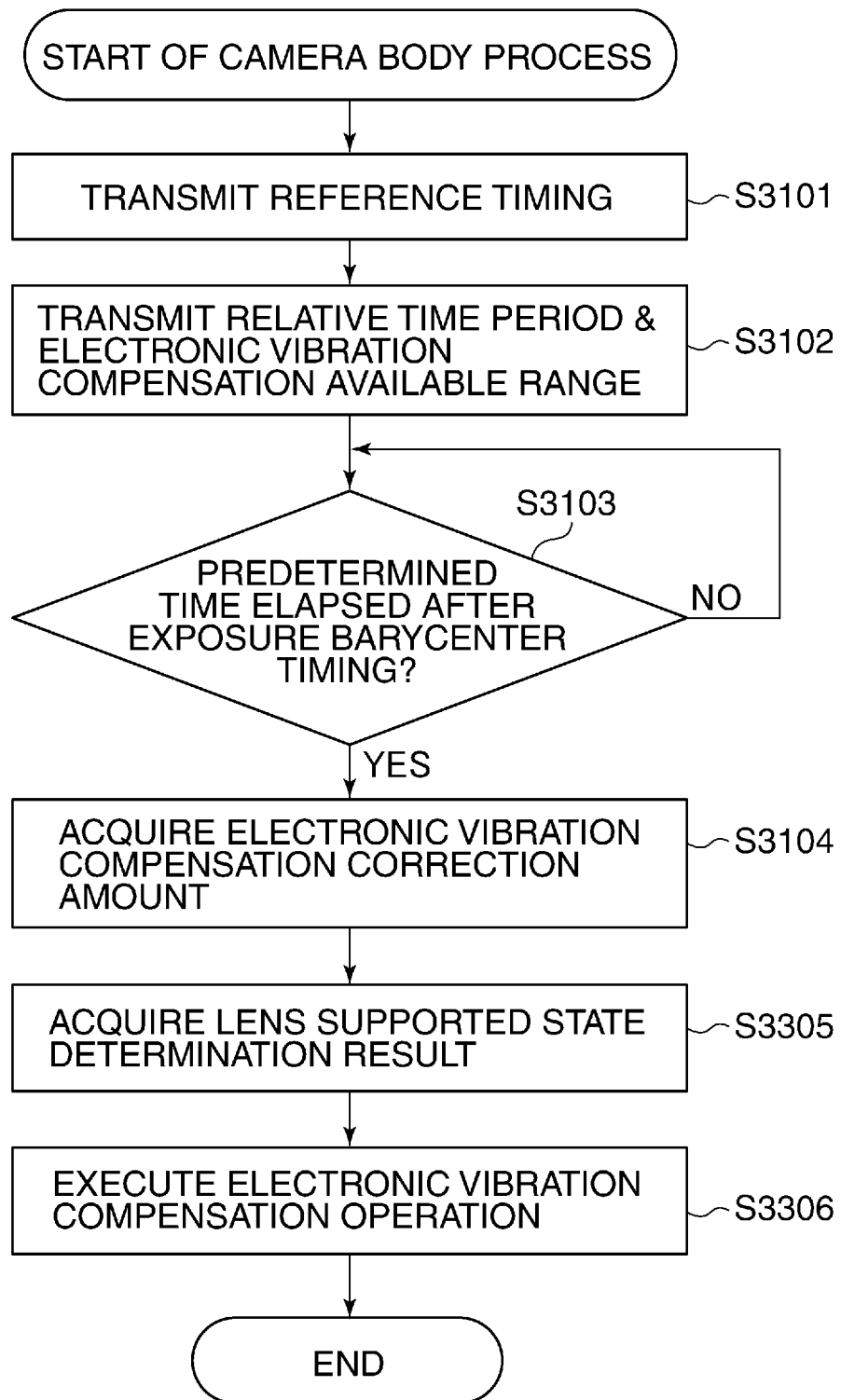
FIG. 38 is a flowchart of a variation of the camera body process performed by the camera body appearing in FIG. 30.

FIG. 38 is a flowchart of a variation of the camera body process performed by the camera body 100 appearing in FIG. 30.

The process in FIG. 38 is performed under the control of the camera controller 1124. Further, the same steps of the camera body process in FIG. 38 as those of the camera body process in FIG. 36 are denoted by the same step numbers, and description thereof is omitted.

After execution of the step S3104, the camera controller 1124 acquires a result of the determination of the lens supported state from the lens controller 1111 (step S3305). Then, the camera controller 1124 causes the camera vibration compensation controller 1123 to perform the electronic vibration compensation operation based on the lens electronic vibration compensation correction amount and a result of determination of the lens supported state (hereafter referred to as the lens supported state determination result) (step S3306). In this step, if the lens supported state determination result indicates the fixedly supported state of the lens unit L, the camera controller 1124 stops the electronic vibration compensation control. When stopping the electronic vibration compensation control, the camera controller 1124 causes the camera vibration compensation controller 1123 to gradually reduce a gain (vibration compensation gain) associated with the electronic vibration compensation operation. This reduces a feeling of strangeness when the electronic vibration compensation control is terminated.

Note that the lens supported state determination result has already been applied to the lens electronic vibration compensation correction amounts (in the pitch and roll directions) obtained in the step S3104. Therefore, the camera controller 1124 causes the electronic vibration compensation correction amount-setting section 1306 to set the electronic vibration compensation correction amount according to the pixel number conversion correction amounts determined from the lens electronic vibration compensation correction amounts (in the pitch and yaw directions) and the camera electronic vibration compensation correction amount (in the roll direction).

On the other hand, as for the camera electronic vibration compensation correction amount (in the roll direction) with respect to the correction axis other than the lens electronic vibration compensation correction amount obtained in the step S3104, the camera controller 1124 applies the lens supported state determination result obtained in the step S3305. That is, the camera controller 1124 improves the accuracy of the vibration compensation control by applying the supported state determination result determined on a side where the vibration compensation control in the pitch and yaw directions, which is critical to the vibration compensation control, is performed, to thereby ensure consistency in the vibration compensation control. Then, the camera controller 1124 terminates the camera body process.

Figure 39:
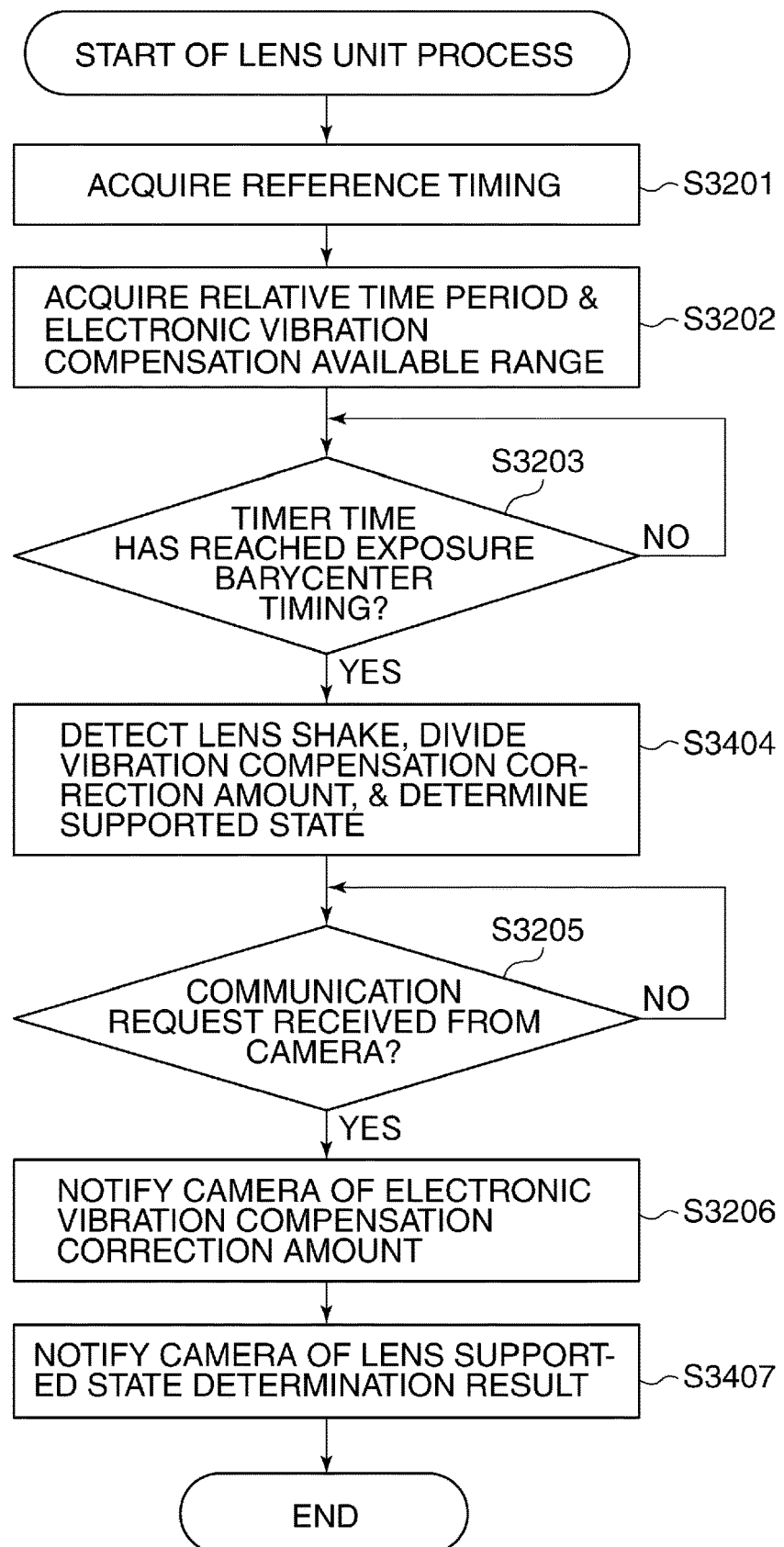
FIG. 39 is a flowchart of a variation of the lens unit process performed by the lens unit appearing in FIG. 30.

FIG. 39 is a flowchart of a variation of the lens unit process performed by the lens unit 200 appearing in FIG. 30.

The lens unit process in FIG. 39 is performed under the control of the lens controller 1111. Further, the same steps of the lens unit process in FIG. 39 as those of the lens unit process in FIG. 37 are denoted by the same step numbers, and description thereof is omitted.

If it is determined in the step S3203 that the timer time has reached the exposure barycenter timing 1406 (YES to the step S3203), the lens controller 1111 receives lens shake signals from the lens shake detection section 1110 at the exposure barycenter timing 1406. Then, the lens controller 1111 causes the lens vibration compensation controller 1106 to calculate the whole vibration compensation correction amount based on the lens shake signals, and divide the whole vibration compensation correction amount into the optical vibration compensation correction amount and the electronic vibration compensation correction amount (lens electronic vibration compensation correction amount) using the coefficient K. Then, the lens controller 1111 temporarily stores the lens electronic vibration compensation correction amount in the internal memory until a communication request is received from the camera controller 1124. Further, the lens vibration compensation controller 1106 determines the supported state of the lens unit L based on the lens shake signals to acquire the lens supported state determination result. The lens controller 1111 temporarily stores the lens supported state determination result as well in the internal memory until the communication request is received from the camera controller 1124 (step S3404).

After execution of the step S3206, upon receipt of the request for the lens supported state determination result from the camera controller 1124, the lens controller 1111 transmits the lens supported state determination result held in the internal memory in the step S3404 to the camera controller 1124 (step S3407). Then, the lens controller 1111 terminates the lens unit process.

As described above, in the eighth embodiment, the camera controller 1124 acquires not only the lens electronic vibration compensation correction amount, but also the lens supported state determination result, from the lens controller 1111. This makes it possible to ensure consistency in the supported state between the camera body and the lens unit in the vibration compensation control, and as a result, it is possible to perform the vibration compensation control with high accuracy. That is, it is possible to avoid inconsistency of the vibration compensation control (image blur correction control) between the camera body and the lens unit.

Although in the above-described example, the camera controller 1124 acquires the lens supported state determination result at the same timing as the timing at which the lens electronic vibration compensation correction amount is acquired, the lens supported state determination result may be acquired at a different timing.

Further, although in the above-described embodiment, since the vibration compensation correction amount is divided by the lens unit L, the supported state determination result acquired by the lens unit L is used, in a case where the vibration compensation correction amount is divided by the camera body C, the supported state determination result acquired by the camera body C may be used. That is, by setting one of the camera body C and the lens unit L, from which the calculated image blur correction amount is transmitted to the other, as a master device for the image blur correction, and causing the controller of the master device to transmit the supported state determination result of the master device to the other, the vibration compensation control may be performed based on the supported state determination result of the master device. Out of the camera body C and the lens unit L, one in which the vibration compensation control in the pitch and yaw directions, which is critical to the vibration compensation control as mentioned above, is performed may also be set as the master device for the image blur correction.

Next, a description will be given of a camera according to a ninth embodiment of the present invention. The camera according to the ninth embodiment has the same configuration as that of the camera shown in FIG. 30.

Figure 40:
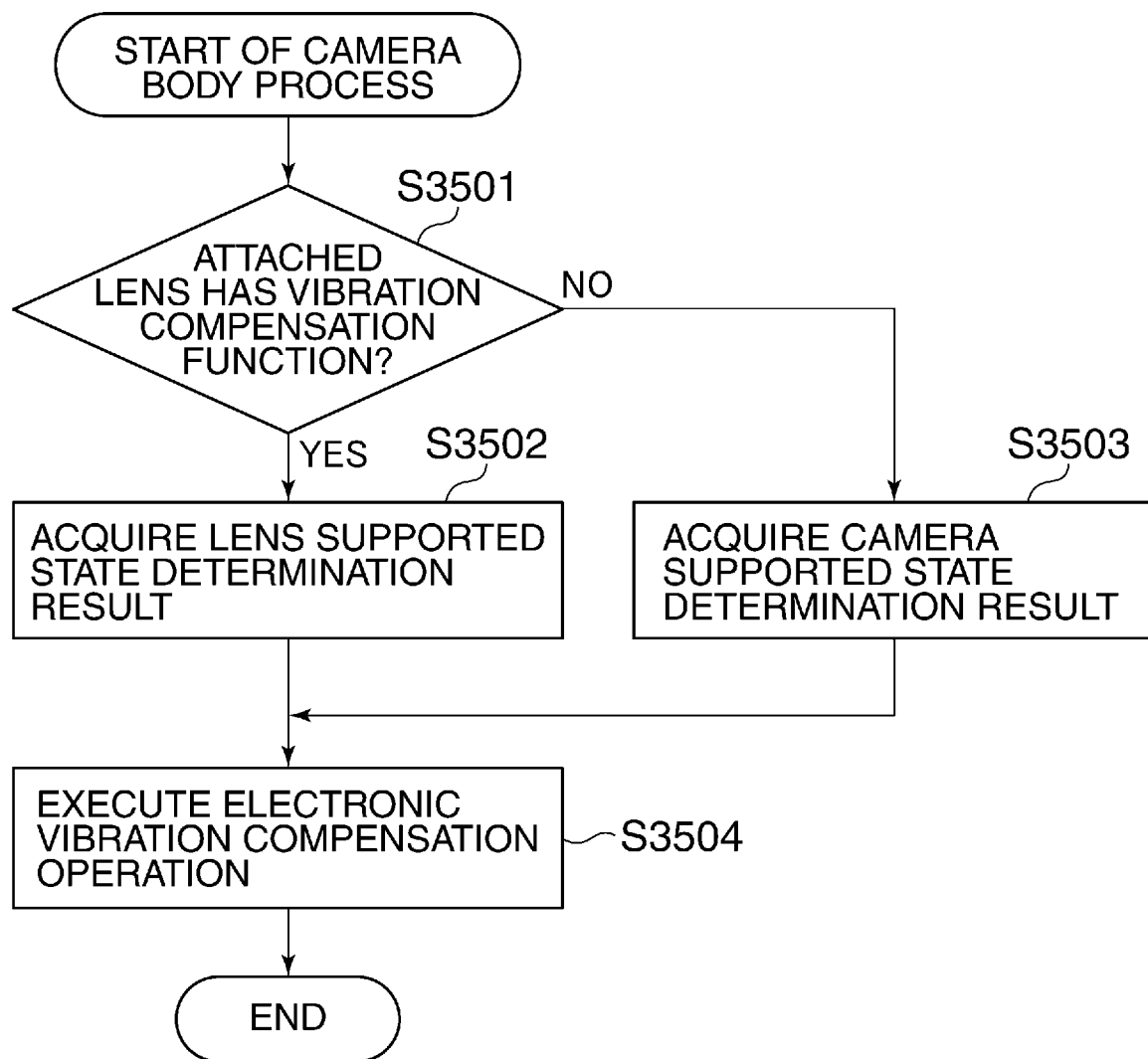
FIG. 40 is a flowchart of a camera body process performed by a camera controller of a camera as an image pickup system according to a ninth embodiment of the present invention.

FIG. 40 is a flowchart of a camera body process performed by the camera controller of the camera according to the ninth embodiment.

Referring to FIG. 40, the camera controller 1124 performs communication with the lens controller 1111 to determine the type of the lens unit L attached to the camera body C. In this step, the camera controller 1124 determines whether or not the lens unit L is equipped with the vibration compensation function (step S3501).

If the lens unit L is equipped with the vibration compensation function (YES to the step S3501), the camera controller 1124 acquires the lens supported state determination result from the lens controller 1111 (step S3502). That is, if the lens unit L is equipped with the vibration compensation function, so as to apply the supported state determination result of the lens unit L that performs the vibration compensation control in the pitch and yaw directions, which is critical to the vibration compensation control, the camera controller 1124 acquires the lens supported state determination result.

If the lens unit L is not equipped with the vibration compensation function (NO to the step S3501), the camera controller 1124 acquires the camera supported state determination result (step S3503). That is, if the lens unit L is not equipped with the vibration compensation function, the whole vibration compensation control, including the vibration compensation control in the pitch and yaw directions, is performed by the camera body C, and hence the camera controller 1124 acquires the camera supported state determination result to apply the supported state determination result of the camera body C.

After execution of the step S3502 or S3503, the camera controller 1124 causes the camera vibration compensation controller 1123 to perform the electronic vibration compensation operation based on the lens supported state determination result or the camera supported state determination result as described above (step S3504).

Here, the electronic vibration compensation correction amount-setting section 1306 sets the electronic vibration compensation correction amount using the camera electronic vibration compensation correction amount determined based on the camera shake signals. Then, similar to the first embodiment, if the lens supported state determination result indicates the fixedly supported state of the lens unit L, the camera controller 1124 stops the electronic vibration compensation control. When stopping the electronic vibration compensation control, the camera controller 1124 causes the camera vibration compensation controller 1123 to gradually reduce a gain (vibration compensation gain) associated with the electronic vibration compensation operation. This reduces a feeling of strangeness when the electronic vibration compensation control is terminated.

As described above, in the ninth embodiment, which to apply (take into account), the lens supported state determination result or the camera supported state determination result, is determined according to the type of the lens unit L. More specifically, if the lens unit L is equipped with the vibration compensation function, the lens supported state determination result is applied. On the other hand, if the lens unit L is not equipped with the vibration compensation function, the camera supported state determination result is applied. This makes it possible to ensure consistency in the supported state between the camera body C and the lens unit L, and as a result, it is possible to avoid inconsistency of the vibration compensation control between the camera body and the lens unit.

Note that which to apply, the lens supported state determination result or the camera supported state determination result, may be determined by the lens unit L according to the type of the camera body C. In this case, if the camera body C is equipped with the vibration compensation function, the camera supported state determination result is applied, whereas, if the camera body C is not equipped with the vibration compensation function, the lens supported state determination result is applied.

Further, in the present embodiment, if both of the camera body C and the lens unit L are equipped with the vibration compensation function, the same processes as those in the eighth embodiment may be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2017-079687 filed Apr. 13, 2017 and Japanese Patent Application No. 2017-222895 filed Nov. 20, 2017, which are each hereby incorporated by reference herein in their entirety.

What is claimed is:

1. A first optical apparatus to which a second optical apparatus can be removably attached, comprising at least one processor that executes programs stored in a memory to function as:
   a communication unit configured to communicate with the second optical apparatus;
   a first image blur correction unit; and
   a setting unit configured to set an image blur correction mode of the first image blur correction unit,
   wherein the image blur correction mode includes at least a normal mode and a mode for a case where photographing is performed by fixing the first optical apparatus, and
   wherein in a case where the second optical apparatus that includes a second image blur correction unit is attached to the first optical apparatus, the setting unit sets the image blur correction mode of the first image blur correction unit according to whether an image blur correction mode of the second image blur correction unit is set to the mode for the case where photographing is performed by fixing the first optical apparatus.

2. The first optical apparatus according to claim 1, further comprising a first shake detection sensor, and
   wherein in a case where the second optical apparatus that does not include the second image blur correction unit is attached to the first optical apparatus, the setting unit sets the image blur correction mode of the first image blur correction unit based on a result of detection by the first shake detection sensor.

3. The first optical apparatus according to claim 1, wherein in a case where a second optical apparatus that includes a second shake detection sensor and the second image blur correction unit and is configured to set the image blur correction mode of the second image blur correction unit based on a result of detection by the second shake detection sensor is attached to the first optical apparatus, the setting unit changes the image blur correction mode of the first image blur correction unit according to the image blur correction mode of the second image blur correction unit.

4. The first optical apparatus according to claim 1, wherein in a case where a second optical apparatus that includes a second shake detection sensor and the second image blur correction unit and is configured to set the image blur correction mode of the second image blur correction unit based on a result of detection by the second shake detection sensor is attached to the first optical apparatus, the setting unit causes the image blur correction mode of the first image blur correction unit to coincide with the image blur correction mode of the second image blur correction unit.

5. The first optical apparatus according to claim 1, wherein the image blur correction mode includes a mode in which the image blur correction is not performed.

6. An first optical apparatus according to claim 1,
   wherein in a case where a second optical apparatus that includes the second image blur correction unit is attached to the first optical apparatus and the second optical apparatus is a master device for the image blur correction, the setting unit changes the image blur correction mode of the first image blur correction unit according to an image blur correction mode of the second image blur correction unit.

7. The first optical apparatus according to claim 6, further comprising a first shake detection sensor,
wherein in a case where a second optical apparatus that includes the second image blur correction unit is attached to the first optical apparatus, the setting unit changes the image blur correction mode of the first image blur correction unit according to the image blur correction mode of the second image blur correction unit in a case where the second optical apparatus is a master device for the image blur correction, and sets the image blur correction mode of the first image blur correction unit based on a result of detection by the first shake detection sensor in a case where the first optical apparatus is the master device for the image blur correction.

8. The first optical apparatus according to claim 7, wherein one of the first optical apparatus and the second optical apparatus that transmits a calculated image blur correction amount to the other is set as the master device.

9. The first optical apparatus according to claim 7, wherein one of the first optical apparatus and the second optical apparatus that performs the image blur correction in a pitch direction and a yaw direction is set as the master device.

10. The first optical apparatus according to claim 6, wherein the communication unit transmits, in a case where the second optical apparatus including the second image blur correction unit is attached to the first optical apparatus, information on the image blur correction mode of the first image blur correction unit to the second optical apparatus in a case where the first optical apparatus is the master device for the image blur correction.

11. The first optical apparatus according to claim 6, wherein one of the first optical apparatus and the second optical apparatus that transmits a calculated image blur correction amount to the other is set as the master device.

12. The first optical apparatus according to claim 6, wherein one of the first optical apparatus and the second optical apparatus that performs the image blur correction in a pitch direction and a yaw direction is set as the master device.

13. The first optical apparatus according to claim 1, further comprising a first shake detection sensor,
wherein in a case where a second optical apparatus that includes a second shake detection sensor and a second image blur correction unit is attached to the first optical apparatus and the second shake detection sensor is higher in reliability of a result of detection than the first shake detection sensor, the setting unit changes the image blur correction mode of the first image blur correction unit according to the image blur correction mode of the second image blur correction unit.

14. The first optical apparatus according to claim 1,
wherein the first optical apparatus is an image pickup apparatus and the second optical apparatus is a lens device,
the first image blur correction unit electronically or optically performs image blur correction, and
the second image blur correction unit optically performs image blur correction by driving a lens.

15. The first optical apparatus according to claim 1,
wherein the first optical apparatus is a lens device and the second optical apparatus is an image pickup apparatus,
the first image blur correction unit optically performs image blur correction by driving a lens, and
the second image blur correction unit electronically or optically performs image blur correction.

16. The first optical apparatus according to claim 1, wherein in a case where the mode for the case where photographing is performed by fixing the first optical apparatus is set as the image blur correction mode of the second image blur correction unit, the setting unit sets the image blur correction mode of the first image blur correction unit to the mode for the case where photographing is performed by fixing the first optical apparatus.

17. The first optical apparatus according to claim 1, wherein the communication unit receives information on the image blur correction mode of the second image blur correction unit from the second optical apparatus after an exposure timing.

* * * * *